(12) United States Patent
Metz et al.

(10) Patent No.: US 11,720,925 B2
(45) Date of Patent: Aug. 8, 2023

(54) PERSONALIZED ADVERTISEMENT AND CHECKOUT SYSTEM AND METHOD

(71) Applicant: PRIZEOUT CORP., New York, NY (US)

(72) Inventors: David Metz, New York, NY (US); Matthew Denham, New York, NY (US); Brendan Thompson Grove, Brooklyn, NY (US); Travis S. Lydon, Far Rockaway, NY (US); Julien Loutre, Richmond Hill (CA)

(73) Assignee: PRIZEOUT CORP., New York, NY (US)

( * ) Notice: Subject to any disclaimer, the term of this patent is extended or adjusted under 35 U.S.C. 154(b) by 0 days.

(21) Appl. No.: 17/052,188

(22) PCT Filed: Jun. 17, 2020

(86) PCT No.: PCT/US2020/038259
§ 371 (c)(1),
(2) Date: Nov. 1, 2020

(87) PCT Pub. No.: WO2021/025788
PCT Pub. Date: Feb. 11, 2021

(65) Prior Publication Data
US 2022/0270136 A1      Aug. 25, 2022

Related U.S. Application Data

(60) Provisional application No. 62/883,035, filed on Aug. 5, 2019.

(51) Int. Cl.
*G06Q 30/02*         (2023.01)
*G06Q 20/32*         (2012.01)
(Continued)

(52) U.S. Cl.
CPC ......... *G06Q 30/0268* (2013.01); *G06Q 20/10* (2013.01); *G06Q 20/3274* (2013.01);
(Continued)

(58) Field of Classification Search
None
See application file for complete search history.

(56) References Cited

U.S. PATENT DOCUMENTS

2007/0299700 A1*  12/2007  Gay ............... G06Q 40/08
                                                  705/4
2010/0049613 A1*  2/2010   Angles ........... G06Q 30/0255
                                                  705/14.69

(Continued)

OTHER PUBLICATIONS

Notification of Transmittal of the International Search Report and the Written Opinion of the International Searching Authority, or the Declaration, dated Sep. 3, 2020, which was issued by the International Searching Authority of WIPO in Applicant's corresponding international PCT application having Serial No. PCT/US2020/038259, filed on Jun. 17, 2020.

(Continued)

*Primary Examiner* — Jamie H Austin
(74) *Attorney, Agent, or Firm* — Bodner Law Group, PLLC; Christian P. Bodner; Gerald T. Bodner

(57) ABSTRACT

A personalized advertisement and checkout system and method for generating personalized merchant advertisements to specific device users includes a communications network, an advertisement system, at least one merchant administrator operable by a respective merchant user, at least one partner system and at least one user device operable by a respective device user. Each of the advertisement system, the merchant administrator, the partner system and the user device includes a processor and a memory in communication with the processor. Each of the merchant administrator and the user device includes a display and a (Continued)

user interface, the user interface of the merchant administrator receiving input from the respective merchant user and the user interface of the user device receiving input from the respective device user. The advertisement system ranks merchant campaigns entered by the merchant users and generates a list of merchant offer advertisements that is displayed on the user device.

20 Claims, 35 Drawing Sheets

(51) Int. Cl.

| | | |
|---|---|---|
| *G06Q 30/0251* | (2023.01) | |
| *G06Q 20/10* | (2012.01) | |
| *G06Q 30/0204* | (2023.01) | |
| *G06Q 30/08* | (2012.01) | |
| *G06Q 20/36* | (2012.01) | |
| *G06Q 30/0273* | (2023.01) | |
| *G06Q 30/0207* | (2023.01) | |
| *G06Q 30/0238* | (2023.01) | |
| *G06Q 30/0208* | (2023.01) | |

(52) U.S. Cl.
CPC ......... *G06Q 20/36* (2013.01); *G06Q 30/0205* (2013.01); *G06Q 30/0208* (2013.01); *G06Q 30/0215* (2013.01); *G06Q 30/0238* (2013.01); *G06Q 30/0251* (2013.01); *G06Q 30/0275* (2013.01); *G06Q 30/08* (2013.01)

(56) References Cited

U.S. PATENT DOCUMENTS

| | | | | |
|---|---|---|---|---|
| 2013/0191213 A1* | 7/2013 | Beck | ................. | G06Q 30/0207 705/14.64 |
| 2013/0218664 A1* | 8/2013 | Carlson | .............. | G06Q 30/0244 705/14.43 |
| 2013/0231999 A1* | 9/2013 | Emrich | .............. | G06Q 30/0271 705/14.43 |
| 2013/0246178 A1* | 9/2013 | Fischer | .............. | G06Q 30/0201 705/14.66 |
| 2014/0025470 A1* | 1/2014 | Berman | ............. | G06Q 30/0235 705/14.26 |
| 2014/0108123 A1* | 4/2014 | Russell | .............. | G06Q 30/0238 705/14.38 |
| 2015/0248664 A1* | 9/2015 | Makhdumi | ........ | G06Q 20/3274 235/380 |
| 2022/0270136 A1* | 8/2022 | Metz | ..................... | G06Q 20/36 |

OTHER PUBLICATIONS

Written Opinion of the International Searching Authority, dated Sep. 3, 2020, which was issued by the International Searching Authority of WIPO in Applicant's corresponding international PCT application having Serial No. PCT/US2020/038259, filed on Jun. 17, 2020.
International Search Report, dated Sep. 3, 2020, which was issued by the International Searching Authority of WIPO in Applicant's corresponding international PCT application having Serial No. PCT/US2020/038259, filed on Jun. 17, 2020.
Notification Concerning Transmittal of International Preliminary Report on Patentability (Chapter I of the Patent Cooperation Treaty), dated Feb. 17, 2022, which was issued by the International Bureau of WIPO in Applicant's corresponding international PCT application having Serial No. PCT/US2020/038259, filed on Jun. 17, 2020.
International Preliminary Report on Patentability (Chapter I of the Patent Cooperation Treaty), dated Feb. 8, 2022, which was issued by the International Bureau of WIPO in Applicant's corresponding international PCT application having Serial No. PCT/US2020/038259, filed on Jun. 17, 2020.
Supplementary European Search Report and Annex to the European Search Report, in English, dated Mar. 2, 2022, issued from the European Patent Office for Applicant's corresponding European Patent Application No. EP20842169.3, filed on Dec. 17, 2020.
Office Action, dated Feb. 17, 2023, issued by the Canadian Intellectual Property Office for Applicant's related Canadian Patent Application No. 3,096,214.
Examination Report, dated Mar. 8, 2023, issued by the Australian Patent Office for Applicant's related Australian Patent Application No. 2020256325.
Perez, Sarah, "*Target launches its own mobile payments system with debut of 'Wallet'*", Published Dec. 4, 2017; TechCrunch.com; https://techcrunch.com/2017/12/04/target-launches-its-own-mobile-payments-system-with-debut-of-wallet/ (last accessed on May 22, 2023).
Perez, Sarah, "*Target's personalized loyalty program launches nationwide next month*", Published Sep. 9, 2019; TechCrunch.com; https://techcrunch.com/2019/09/09/targets-personalized-loyalty-program-launches-nationwide-next-month/#:~:text=Target%20today%20announced%20its%20new.beta%20testing%20in%20select%20markets (last accessed on May 22, 2023).

* cited by examiner

PERSONALIZED ADVERTISEMENT AND CHECKOUT SYSTEM AND METHOD

CROSS-REFERENCE TO RELATED APPLICATIONS

This application is related to U.S. Provisional Patent Application Ser. No. 62/883,035, filed on Aug. 5, 2019, and entitled "Personalized Advertisement and Checkout System", the disclosure of which is hereby incorporated by reference and on which priority is hereby claimed.

BACKGROUND OF THE INVENTION

Field of the Invention

The present invention generally relates to electronic advertisement and transaction systems and methods, and more particularly relates to interactive personalized advertisement and checkout systems and methods.

Description of the Prior Art

Customer acquisition by merchants is costly, time consuming and often requires substantial expertise. Merchants often use advertisement platforms and systems such as Facebook® advertisements, Google® Adwords and Bing advertisements to attract customers to the merchant's website so as to ultimately acquire and convert the customer. However, it is difficult to optimize advertisements to specific users. As a result, advertisements typically target broad groups or classes of users and do not necessarily increase the acquisition or conversion rates of users (e.g., potential customers) to merchants.

Merchants also often partner with gaming providers (e.g., software-based game providers or cloud-based game providers) to target the gaming provider's user base. For example, gaming providers often display merchant advertisements in the peripheral or background spaces of the gaming provider's software application that a user interacts with. However, such advertisements have long been viewed by users as merely an annoyance since the user did not solicit such advertisements and has no incentive to explore or view the merchant that is the subject of the advertisement. Accordingly, such advertisements have relatively low user (e.g., customer) acquisition and conversion rates for the merchant.

The users of gaming providers are often provided with monetary rewards, typically in the form of currency or credits, through a specific user's interaction with the software application. For example, game-based software application users, such as trivia game users and sports game users, win monetary rewards during their interaction with the game. The user's monetary rewards are stored in the user's electronic funds account. When a user desires to withdraw the funds from his or her electronic funds account on the gaming provider's system, the gaming provider often is charged a fee by a third party (e.g., PayPal® or processing companies) to transfer the funds from the electronic funds account of the gaming provider's system to the user's bank account. During the withdrawal or "cash-out" process, the user is often directed to a new, third party application or website to complete the transaction, which is often confusing and interrupts the flow of the withdrawal process, as well as the user's enjoyment of the game. Accordingly, both users of gaming providers and the gaming providers are disincentivized from withdrawing funds by third party intermediaries, as there is no monetary benefit or incentive to either the user or the gaming provider during the cash-out process.

OBJECTS AND SUMMARY OF THE INVENTION

It is an object of the present invention to provide a personalized advertisement and checkout system that connects partner system users, device users and merchant users.

It is another object of the present invention to provide a personalized advertisement and checkout system that provides personalized merchant advertisements and offers to specific users, classes of users and groups of users.

It is still another object of the present invention to provide a personalized advertisement and checkout system that enables a user to directly transfer funds between a partner system and a merchant system.

It is yet another object of the present invention to provide a personalized advertisement and checkout system that enables a merchant to optimize advertisement campaigns in real time to target specific users, groups of users and classes of users.

It a further object of the present invention to provide a checkout system that enables a device user to make a purchase at a point of sale location.

It is a yet a further object of the present invention to provide a method for generating personalized advertisements with a checkout system which overcomes the disadvantages of conventional advertising methods.

In accordance with one form of the present invention, the personalized advertisement and checkout system formed in accordance with the present invention includes a partner system, a merchant administrator, an advertisement system and a user device, each of which is connected to a network that facilitates selective communication therebetween. The partner system includes a partner application host that communicates with a partner application operating on the user device. The advertisement system includes a checkout widget host that communicates with a checkout widget that is embedded in the partner application. The merchant system includes an interface through which a merchant user creates advertisement campaigns. The advertisement system includes a campaign database that receives merchant campaigns from the merchant administrator. The advertisement system processes and ranks merchant campaigns to target specific users, groups of users or classes of users of the partner application. The advertisement system generates customized ordered lists of merchant offer advertisements from the merchants that correspond to the merchants' campaigns to target specific users, groups of users or classes of users to optimize user exploration, acquisition and conversion. The user device includes a display on which the customized ordered lists of merchant offer advertisements are shown to the user. The user device further includes a user interface that allows the user to select a particular merchant offer advertisement from the ordered list of merchant offer advertisements shown on the display. The checkout widget communicates the selected merchant offer advertisement to the advertisement system. The advertisement system retrieves the merchant offer that corresponds to the selected merchant offer advertisement from a merchant offer inventory and transfers the merchant offer to the user via an e-mail host. The merchant offers are displayed on the display of the user device and selectable by the device user and, upon selection, an optical code is generated to that is readable by an optical reader at a point of sale location.

The present invention is also directed to a method for generating personalized advertisements with a checkout system. The checkout system comprises a communications network, an advertisement system, at least one merchant administrator operable by a respective merchant user, at least one partner system and at least one user device operable by a respective device user, the respective device user having user demographic elements, each of the advertisement system, the merchant administrator, the partner system and the user device being operably coupled to the communications network, the communications network facilitating communication between two or more of the advertisement system, the merchant administrator, the partner system and the user device, wherein each of the advertisement system, the merchant administrator, the partner system and the user device includes a processor and a memory in communication with the processor, wherein each of the merchant administrator and the user device includes a display and a user interface, the user interface of the merchant administrator receiving input from the respective merchant user and the user interface of the user device receiving input from the respective device user. The method includes the steps of entering at least one merchant campaign into the user interface of the merchant administrator, the at least one merchant campaign having a plurality of campaign elements, ranking by the processor of the advertisement system each merchant campaign for inclusion in at least one list of merchant offer advertisements, each merchant offer advertisement in the at least one list of merchant offer advertisements corresponding to a merchant offer from the respective merchant user set forth in the merchant campaign, generating by the processor of the advertisement system the at least one list of merchant offer advertisements based on the ranking of each merchant campaign, displaying the list of merchant offer advertisements on the display of the user device, receiving an input on the user interface of the user device from the respective device user corresponding to the device user's selection of one or more of the merchant offer advertisements on the displayed list of merchant offer advertisements and selectively communicating by the processor of the advertisement system the merchant offer corresponding to each selected merchant offer advertisement to the respective device user by displaying the merchant offer on the display of the user device, receiving input from the device user corresponding to the device user's selection of a merchant offer to utilize at a point of sale location, generating an optical code with transaction processing information in response to the device user's selection of a merchant offer and displaying the optical code on the display of the user device.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
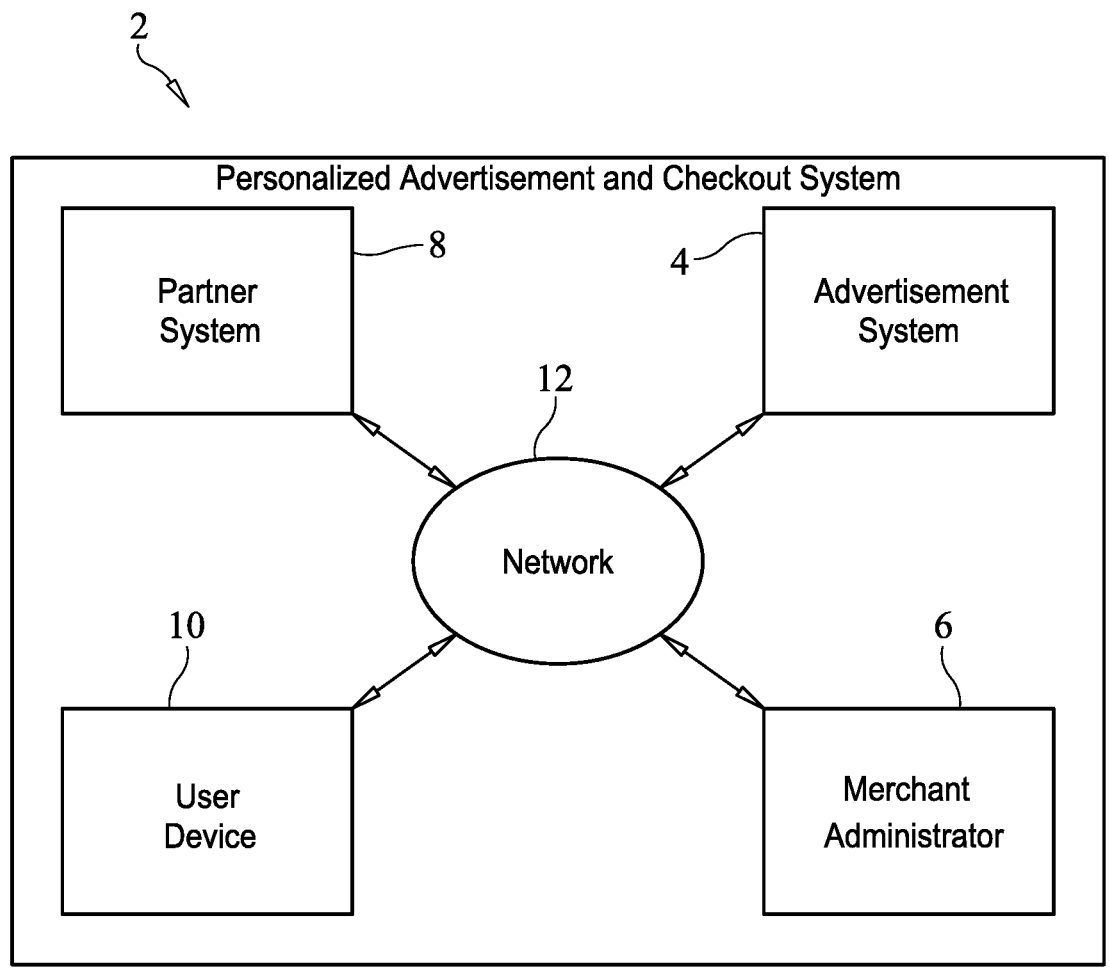
FIG. 1 is a schematic block diagram of the advertisement and checkout system formed in accordance with the present invention.

Reference should initially be made to FIG. 1 of the drawings where it can be seen that a personalized advertisement and checkout system 2 formed in accordance with the present invention includes at least one advertisement system 4, at least one merchant administrator 6, at least one partner system 8 and at least one user device 10. As will be described in greater detail in the forthcoming paragraphs, each of the advertisement system 4, the merchant administrator 6, the partner system 8 and the user device 10 is connected to a network 12 (e.g., a wired network, a wireless network, a cloud computing network, the internet, etc.) that enables communication therebetween. Each of the advertisement system 4, the merchant administrator 6 and the partner system 8 may comprise a plurality of clustered computer systems or servers.

Figure 4:
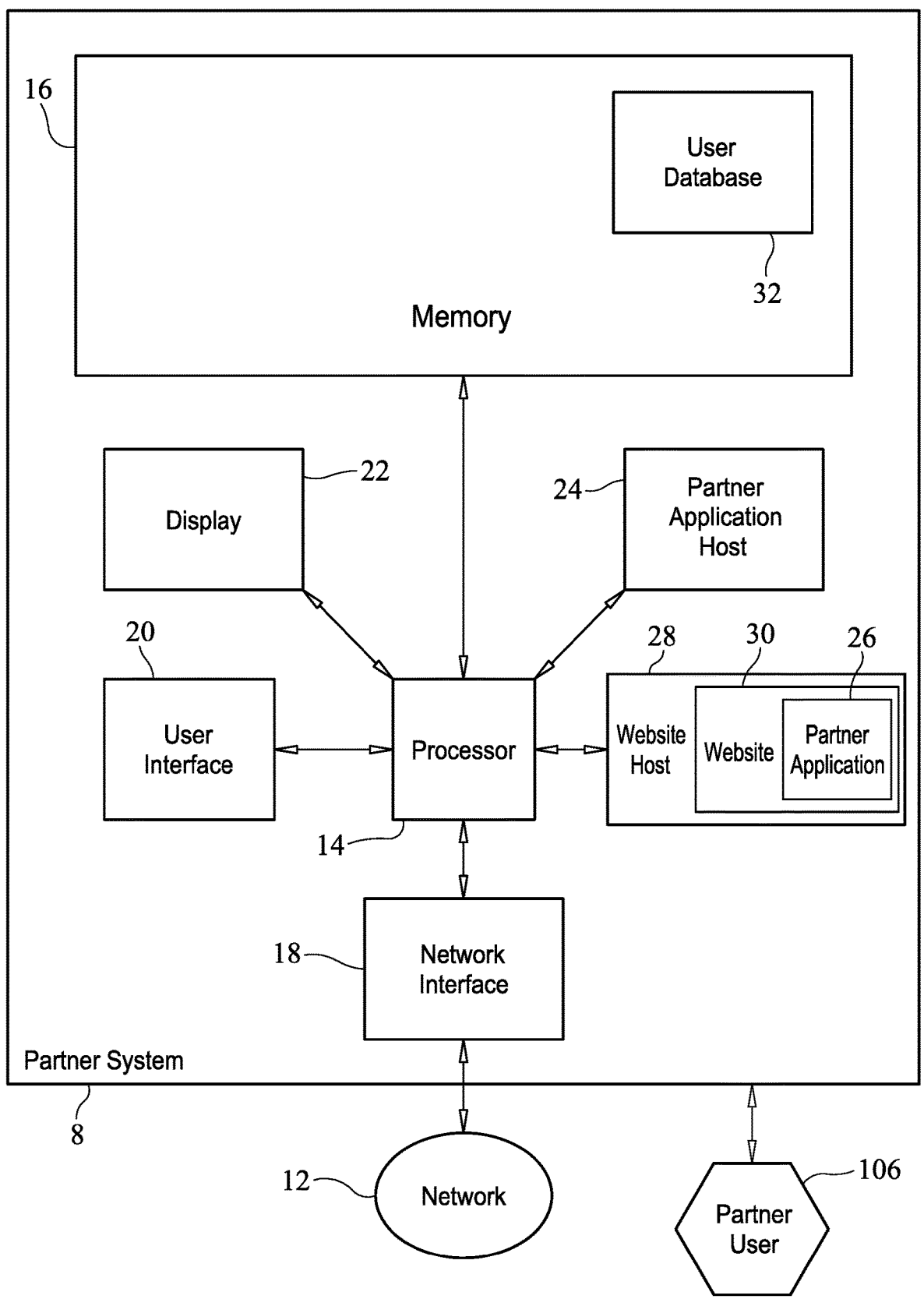
FIG. 4 is a schematic block diagram of the partner system of the advertisement and checkout system formed in accordance with the present invention.

As can be seen in FIG. 4 of the drawings, the partner system 8 includes a processor 14 and a memory 16, such as a non-transitory computer-readable storage medium. The non-transitory computer-readable storage medium may include at least one of a random access memory (RAM), a dynamic random access memory (DRAM), a digital storage disk and a read only memory (ROM). The processor 14 is in electrical communication with the memory 16 and reads program instructions stored therein, the program instructions causing the processor 14 to execute the operations described herein. The partner system 8 further includes a network interface 18. The network interface 18 of the partner system 8 is in electrical communication with the processor 14 and enables the partner system 8 to connect to the network 12. The partner system 8 may further include a user interface 20 and a display 22, each of the user interface 20 and the display 22 being in electrical communication with the processor 14. Of course, in one form, the display 22 may also function as the user interface 20.

The partner system 8 further includes a partner application host 24. As will be described in greater detail in the forthcoming paragraphs, a partner application 26, such as a game, that is in communication with the partner application host 24, may be executed on a user device 10, such as a computer, mobile phone, computerized-tablet or the like. For example, the partner application 26 may be a card game, a trivia game or sports game that a user interacts with on the user device 10. The partner system 8 may also include a website host 28 that hosts a website 30 having a web-based partner application 26 that a user may access via a web-browser 46 (see FIG. 3) on the user device 10. Similarly, the user may interact with the partner application (e.g., game) 26 via the web-browser 46 of the user device 10.

The partner system 8 may require the user 110 to enter certain user demographic information, such as the user's name, age, gender and geographic location. Additionally, the partner system 8 may passively collect user demographic information such as user purchasing habits and user interests, through the user's use of the partner application 26, for example by collecting browser data or storing transaction history. The partner application 26 may collect such user demographic information and communicate such information to the partner system 8 via the network 12. The partner system 8 receives the user demographic information through the network interface 18 of the partner system 8 and the processor 14 stores the user demographic information in a user database 32 in the memory 16.

As described previously, the partner application 26 may be a game that is played by a user. The user may be awarded monetary amounts or credits during his or her game play. The user's balance or awards (e.g., dollar amount) is stored in the user database 32 of the partner system 8. As the user utilizes the funds, either by withdrawing the funds or using the funds to make a purchase, the user's balance in the user database 32 of the partner system 8 is updated by the processor 14.

Figure 3:
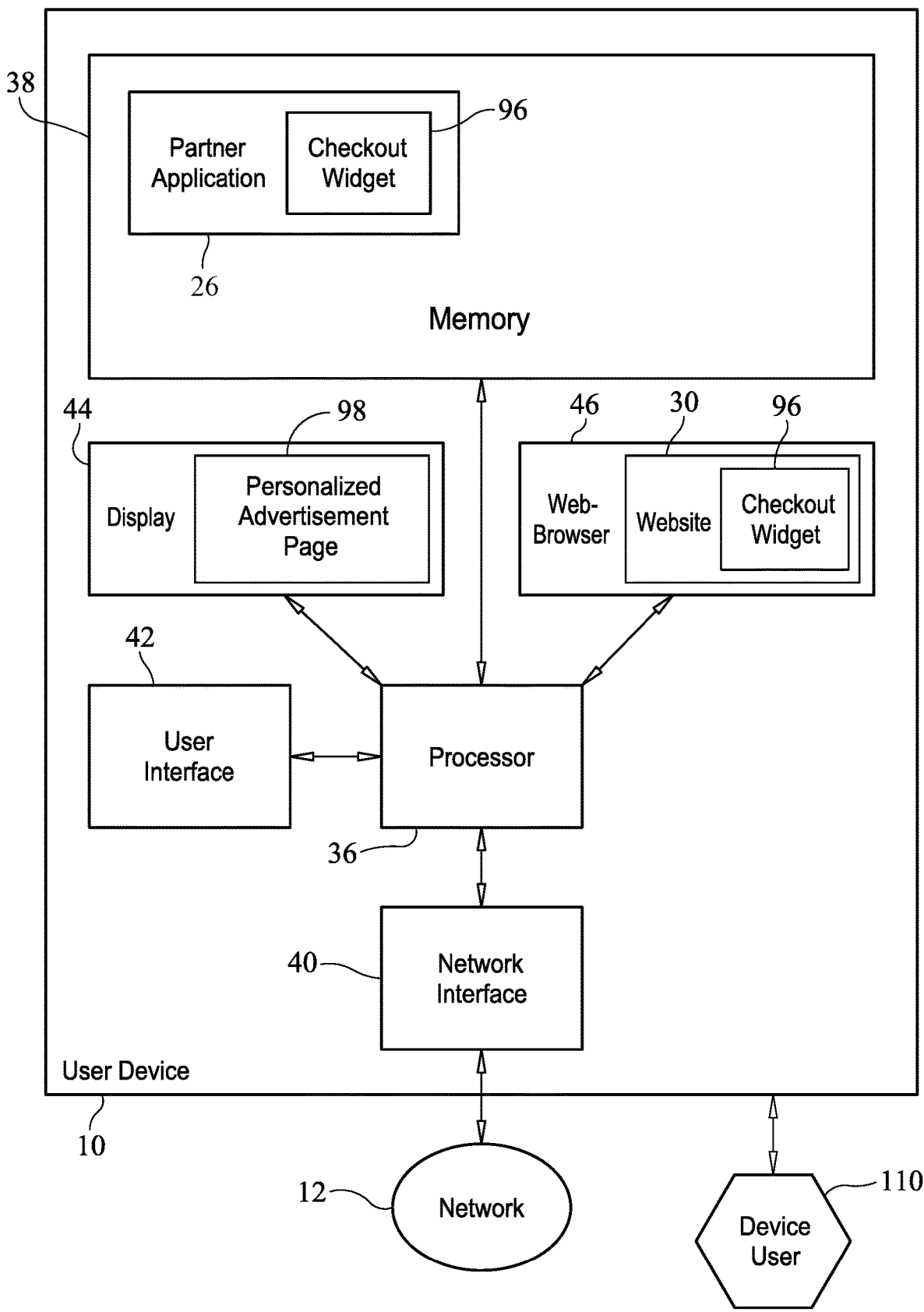
FIG. 3 is a schematic block diagram of the user device of the advertisement and checkout system formed in accordance with the present invention.

As can be seen in FIG. 3 of the drawings, the user device 10 includes a processor 36 and a memory 38, such as a non-transitory computer-readable storage medium. The non-transitory computer-readable storage medium may include at least one of a random access memory (RAM), a dynamic random access memory (DRAM), a digital storage disk and a read only memory (ROM). The processor 36 is in electrical communication with the memory 38 and reads program instructions stored therein, the program instructions causing the processor 36 to execute the operations described herein. The user device 10 further includes a network interface 40. The network interface 40 of the user device 10 is in electrical communication with the processor 36 and enables the user device 10 to connect to the network 12. The user device 10 further includes a user interface 42 and a display 44, each of the user interface 42 and the display 44 being in electrical communication with the processor 36. Of course, in one form, the display 44 may also function as the user interface 42.

As described previously, one or more partner applications 26 may be stored in the memory 38 of the user device 10. When the user desires to utilize a particular partner application 26, the processor 36 executes the partner application 26. The partner application 26 is presented to the device user 110 on the display 44 of the user device 10 and the device user 110 interacts with the partner application 26 with the user interface 42. The user device 10 may also include a web-browser 46 that allows the device user 110 to access particular webpages. As described previously, the website host 28 of the partner system 8 may host a website 30 that is accessible by the device user 110 via the web-browser 46 on the user device 10. The partner application 26 may be operable on the website 30 such that the device user 110 may interact with the partner application 26 by accessing the partner system website 30 via the web-browser 46 on the user device 10. The partner application 26 on the website 30 is shown on the display 44 of the user device 10 and the device user 110 may interact with the partner application 26 by utilizing the user interface 42. The network interface 40 of the user device 10 enables the partner application 26 on the user device 10 to communicate with the partner system 8.

Figure 2:
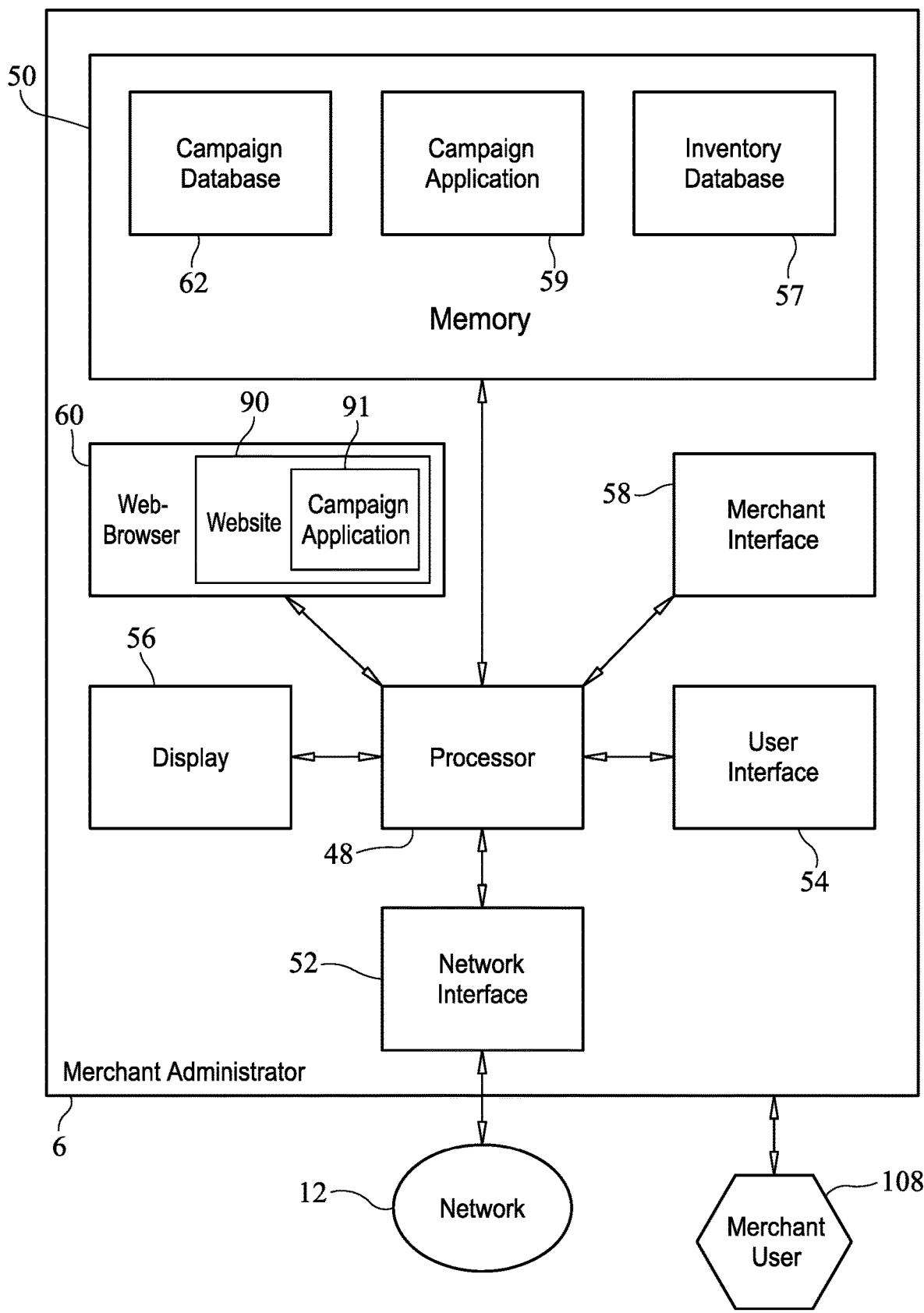
FIG. 2 is a schematic block diagram of the merchant administrator of the advertisement and checkout system formed in accordance with the present invention.

As can be seen in FIG. 2 of the drawings, the merchant administrator 6 includes a processor 48 and a memory 50, such as a non-transitory computer-readable storage medium. The non-transitory computer-readable storage medium may include at least one of a random access memory (RAM), a dynamic random access memory (DRAM), a digital storage disk and a read only memory (ROM). The processor 48 is in electrical communication with the memory 50 and reads program instructions stored therein, the program instructions causing the processor 48 to execute the operations described herein. The merchant administrator 6 further includes a network interface 52. The network interface 52 of the merchant administrator 6 is in electrical communication with the processor 48 and enables the merchant administrator 6 to connect to the network 12. The merchant administrator 6 further includes a user interface 54 and a display 56, each of the user interface 54 and the display 56 being in electrical communication with the processor 48. Of course, in one form, the display 56 may also function as the user interface 54.

The merchant administrator 6 further includes a merchant interface 58, such as an application program interface ("API") or a campaign application 59 that is stored in the memory 50 and executed by the processor 48. As will be described in greater detail in the forthcoming paragraphs, the merchant interface 58 enables merchant users 108 to create and modify advertisement campaigns (e.g., merchant campaigns) that are processed by the advertisement system 4 to target and convert users. The merchant interface 58 is presented to the merchant user 108 on the display 56 of the merchant administrator 6 and the merchant user 108 interacts with the merchant interface 58 by utilizing the user interface 54 of the merchant administrator 6 to create merchant advertisement campaigns.

The merchant administrator 6 may also include a web-browser 60 that allows the merchant user 108 to access particular webpages. As will be described in greater detail in the forthcoming paragraphs, the advertisement system 4 may host a website 90 that is accessible by the merchant user 108 via the web-browser 60 of the merchant administrator 6. A web-based campaign application 91 may be operable on the website 90 such that the merchant user 108 may interact with the campaign application 91 by accessing the advertisement system website 90 via the web-browser 60 of the merchant administrator 6. The campaign application 91 on the website 90 is shown on the display 56 of the merchant administrator 6 and the merchant user may interact with the campaign application 91 by utilizing the user interface 54. The network interface 52 of the merchant administrator 6 enables the merchant interface 58, such as the API and the campaign application 59, 91 on the merchant administrator 6 to communicate with the advertisement system 4.

The merchant administrator 6 further includes a campaign database 62 in the memory 50 thereof. The campaign database 62 stores campaign data for specific campaigns created by the merchant user 108. Campaigns may include one or more campaign elements, such as target user demographic information (e.g., age, gender, geographic location, account balance, purchasing habits and interests), the merchant user's cost per acquisition bid/budget amount ("CPA"), the merchant user's cost per retention bid/budget amount ("CPR"), the merchant user's cost per impression bid/budget amount ("CPI"), the merchant user's available merchant offer inventory for the campaign, the merchant user's available promotional merchant offer inventory and any creatives. The term "merchant offer" means any type of item offered by the merchant user 108, such as e-commerce items, advertisement revenue exchanges, products, monetary items, etc. The term "merchant offer advertisement" refers to advertisements displayed to a device user 110 that correspond to specific merchant offers in the merchant offer inventory, and may include information about the merchant offer including, purchase price, offer value, promotional amounts and information about the particular merchant. A creative refers to an image or a series of images aimed to entice a user to convert to a particular brand (e.g., the "ad" part). For example, many electronic advertisements on social media platforms are a mix of a creative or a series of creatives along with descriptions and a call to action (e.g., "Buy now"). This could be a single image, images stringed together, a gif/video, etc.

The merchant offer inventory includes data specific to each merchant offer in the merchant offer inventory, such as the unique merchant offer redemption code and the merchant offer amount. The promotional merchant offers in the promotional merchant offer inventory include promotional amounts or other value driven incentives (e.g., a merchant offer purchase price of $300 for $400 worth of purchases from the merchant user 108, 25% off or 50% off, etc.). The campaign data may further include a merchant user's total set budget amount for a particular campaign (e.g., maximum total CPI/CPA/CPR bid amounts for the campaign) such that the advertisement system 4 will continue to automatically run a particular campaign until the total budget amount is reached or the merchant user 108 modifies or cancels the campaign. As will be described in greater detail in the forthcoming paragraphs, the merchant campaigns in the campaign database 62 are communicated to the advertisement system 4 and are processed by the advertisement system 4 to target and convert specific device users 110, groups of device users or classes of device users.

Figure 6:
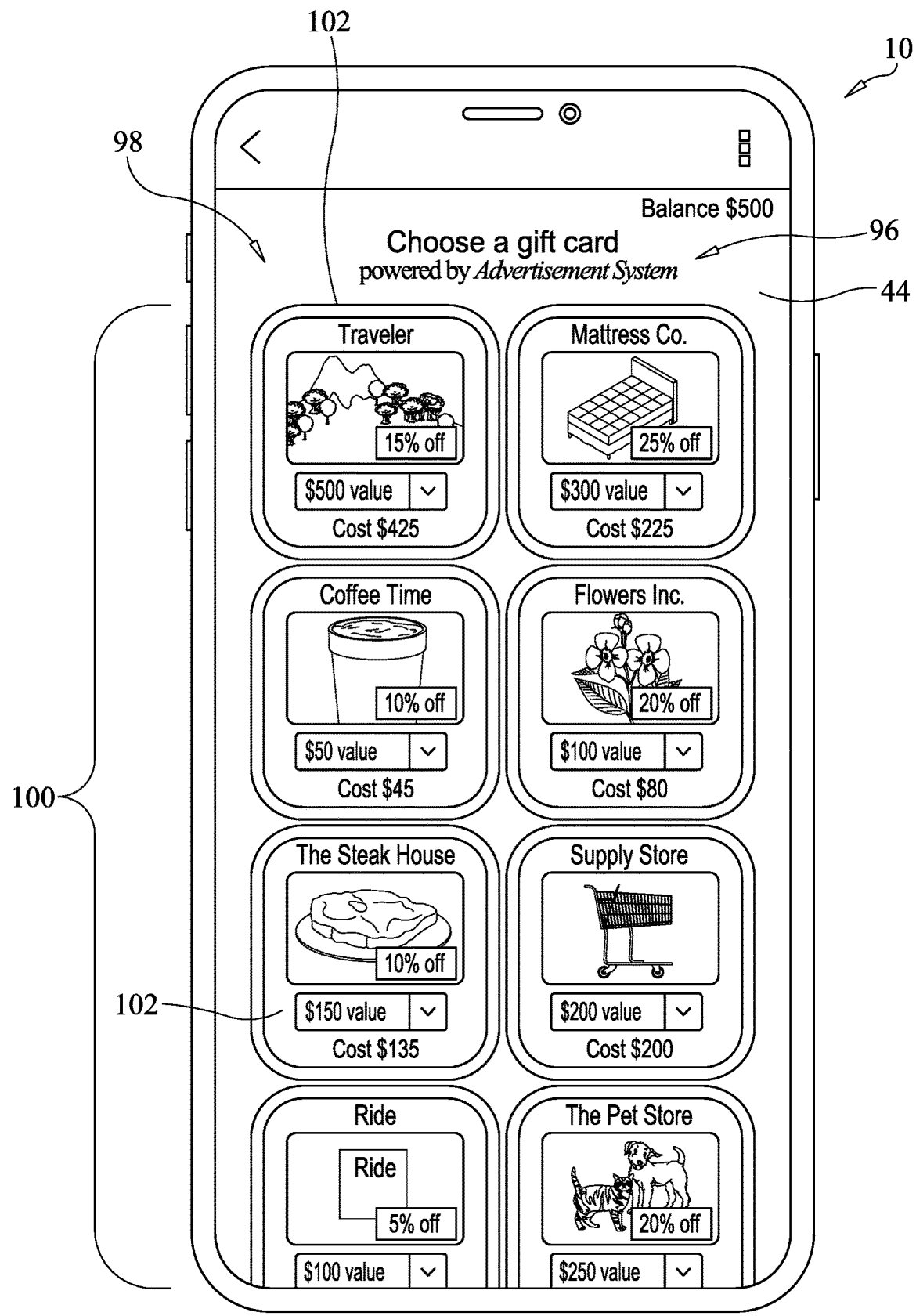
FIG. 6 is a front elevational view of the user device of the advertisement and checkout system formed in accordance with the present invention.
Figure 7:
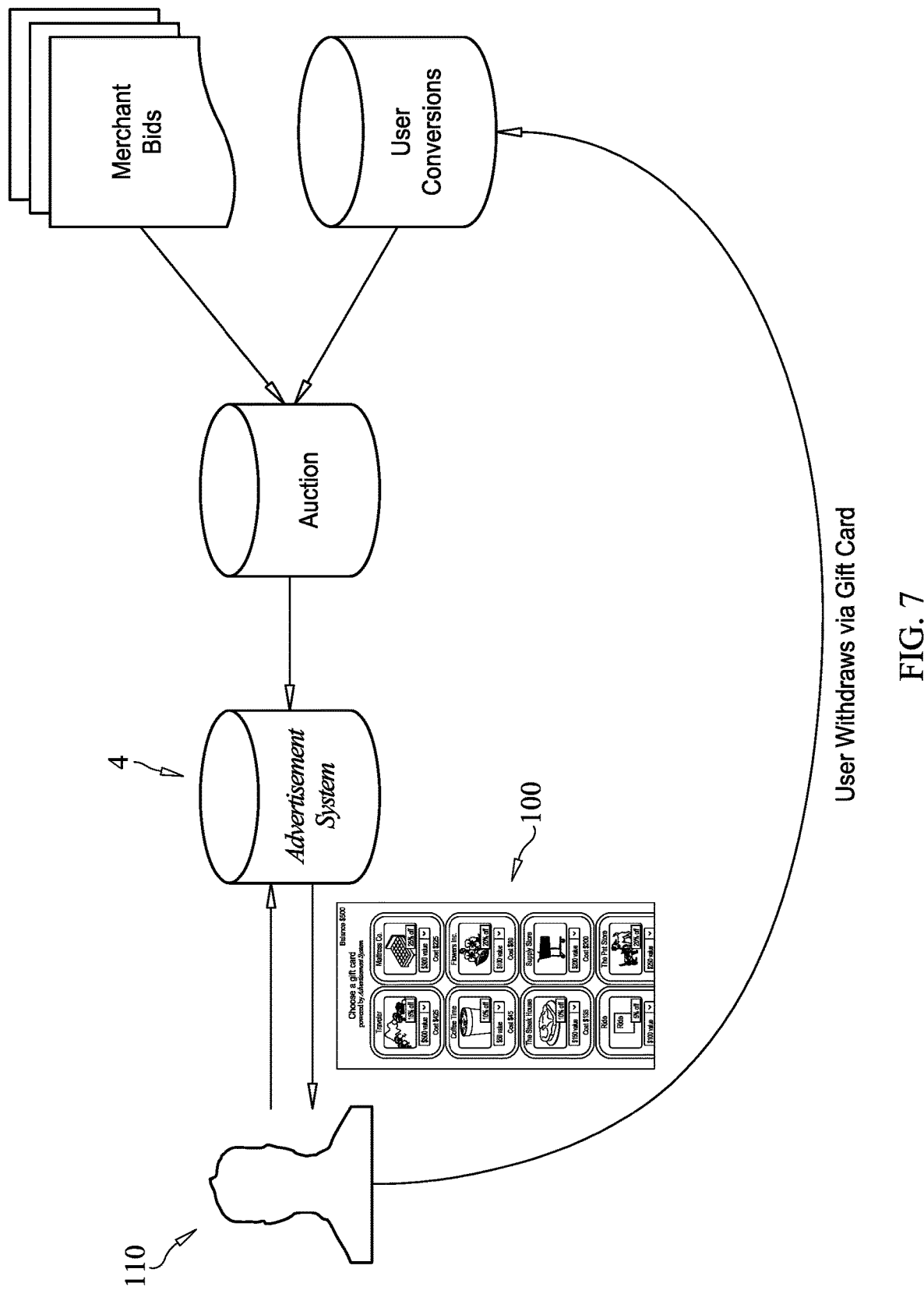
FIG. 7 is an operational flowchart with pictorial illustrations of the advertisement and checkout system formed in accordance with the present invention.
Figure 8:
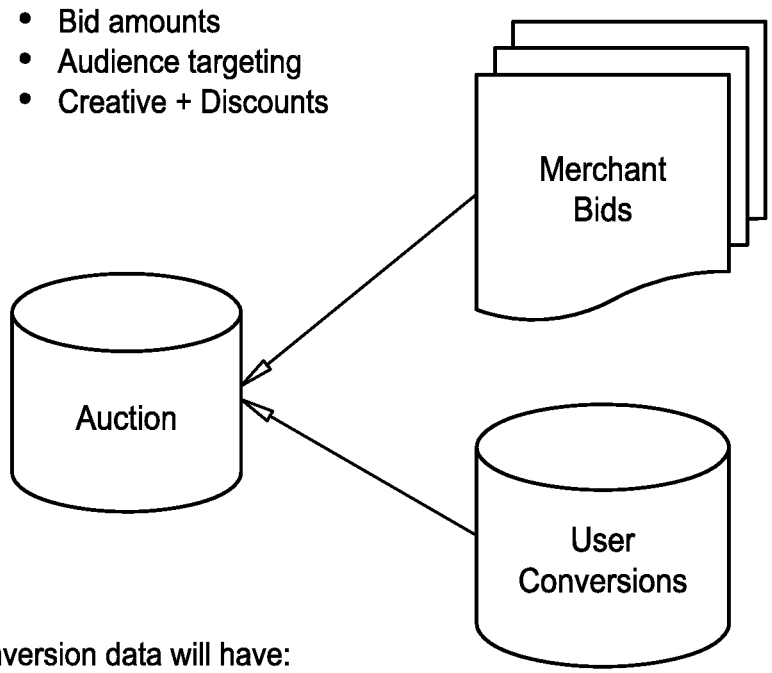
FIG. 8 is another operational flowchart with pictorial illustrations of the advertisement and checkout system formed in accordance with the present invention.
Figure 9:
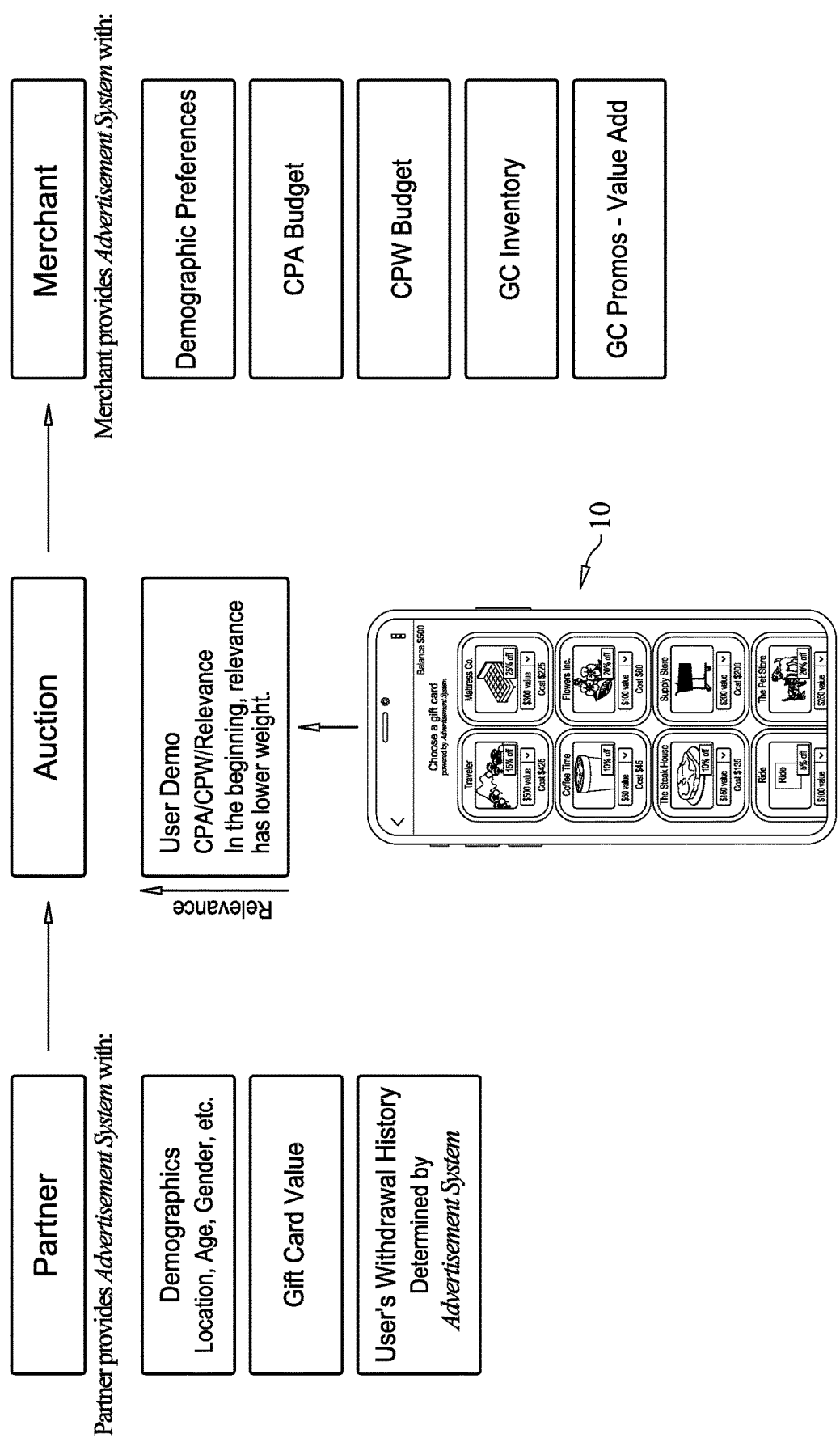
FIG. 9 is another operational flowchart with pictorial illustrations of the advertisement and checkout system formed in accordance with the present invention.
Figure 10:
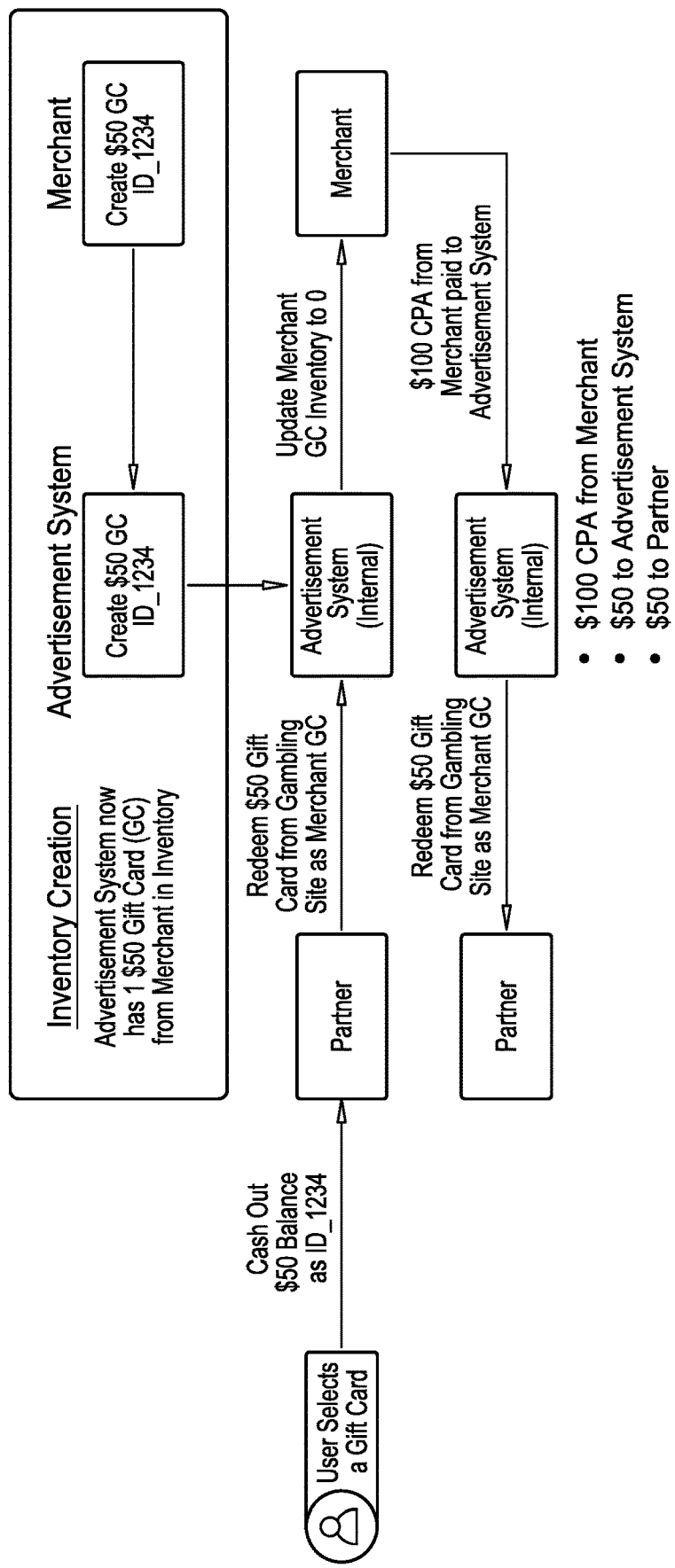
FIG. 10 is another operational flowchart with pictorial illustrations of the advertisement and checkout system formed in accordance with the present invention.
Figure 11A:
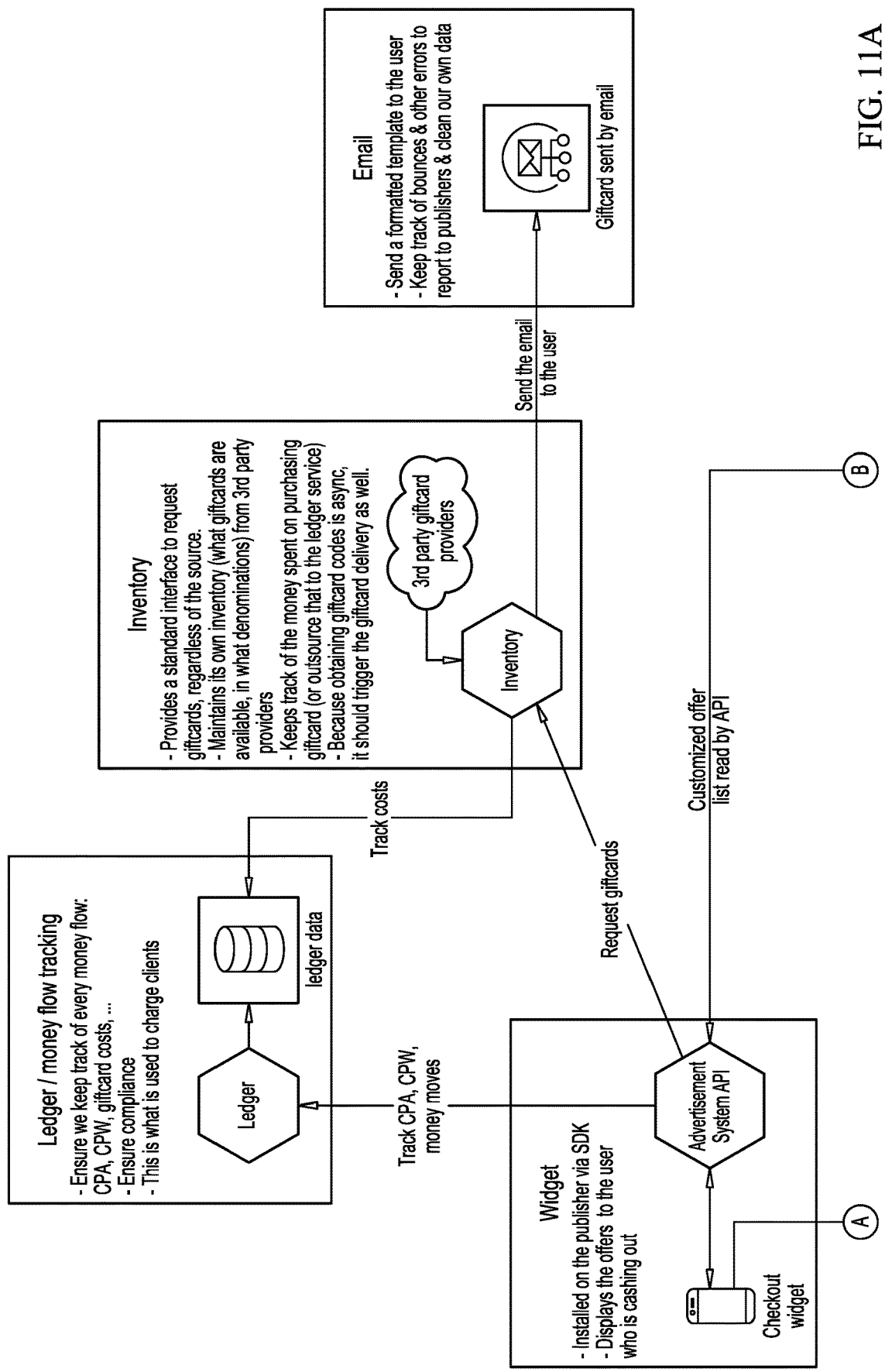
FIGS. 11A and 11B are portions of a detailed operational flowchart with pictorial illustrations of the advertisement and checkout system formed in accordance with the present invention.
Figure 11B:
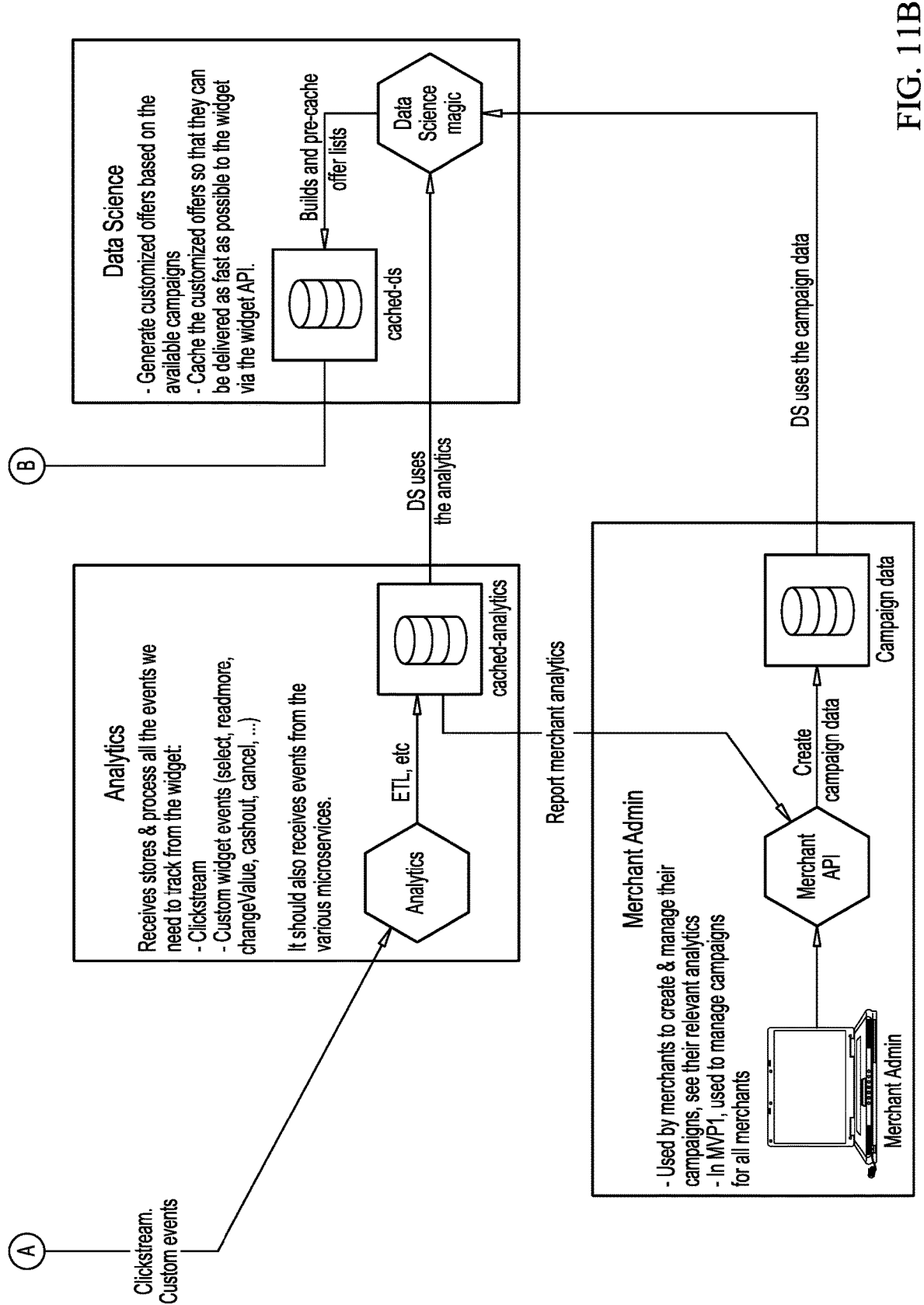
Figure 18:
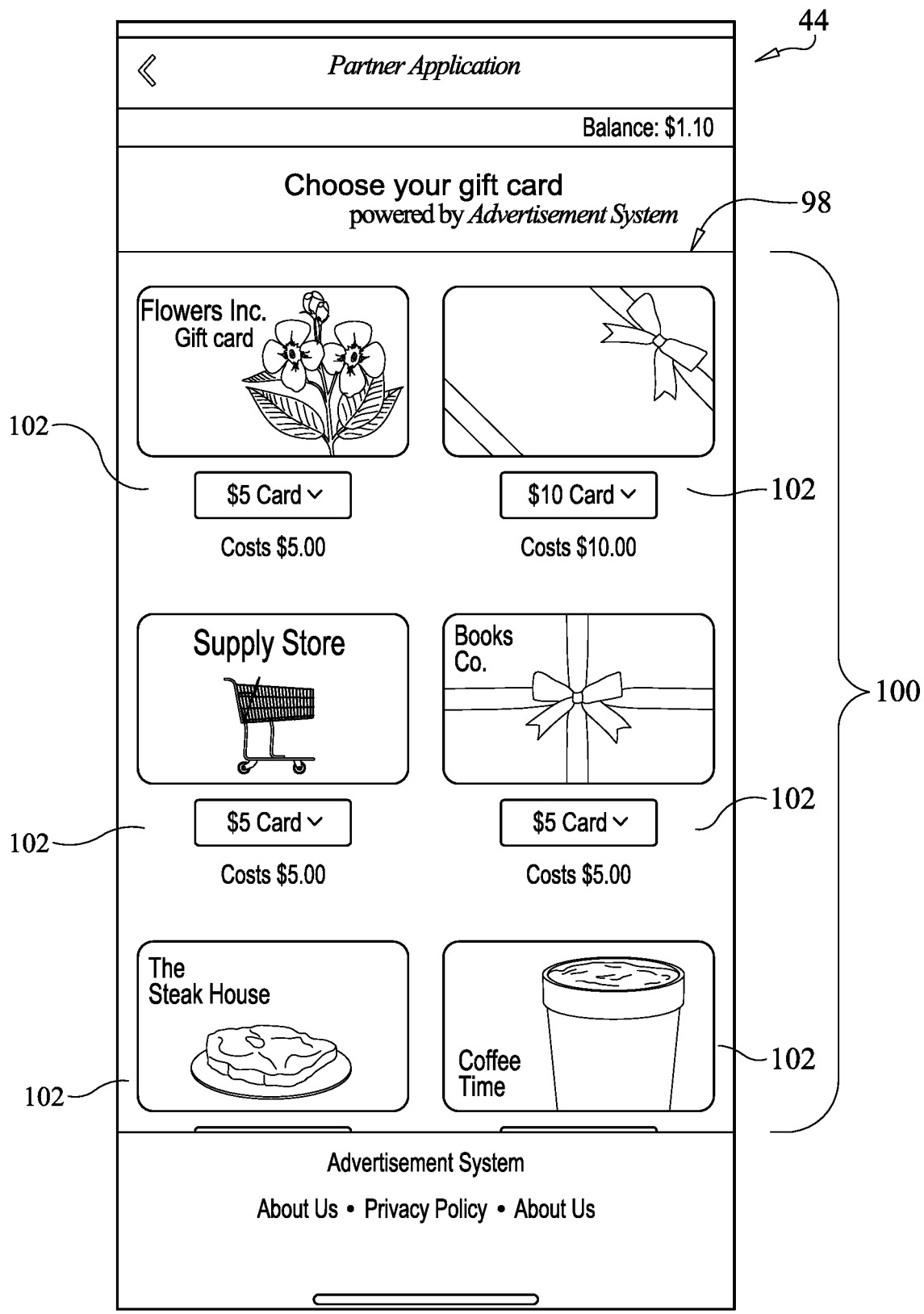
FIG. 18 is another screenshot of a partner application forming part of the advertisement and checkout system of the present invention.

In an exemplary form of the present invention, the merchant offer advertisement is an advertisement by the merchant user 108 that offers the sale of a gift card to the device user 110 (e.g., a "gift card offer"). More specifically, the electronic attributes of one or more gift cards that the merchant user 108 selectively offers to device users 110 through a particular advertisement campaign (e.g., merchant campaign) are electronically stored in the merchant offer inventory. The electronic attributes of the gift card may include the gift card's redemption code, purchase amount, gift card value amount and any promotional amounts; however, preferably, promotional amounts are set forth in the promotional merchant offer inventory as promotional merchant offers. As will be described in greater detail in the forthcoming paragraphs, the gift card offers of a particular merchant user 108 that correspond to specific gift cards in the merchant offer inventory are selectively displayed to the device user 110 in an ordered list 100 of gift card offers 102, as shown in FIGS. 6 and 18 of the drawings. The device user 110 may purchase one or more of the gift cards in the merchant offer inventory by selecting one or more of the gift card offers (e.g., merchant offer advertisements) set forth on the list 100. After the device user 110, selects a particular gift card offer, the advertisement system 4 formed in accordance with the present invention retrieves the corresponding gift card from the merchant offer inventory and transfers (e.g., communicates) the gift card to the device user 110.

The advertisement campaign of a particular merchant user 108 is created by the merchant interface 58 and represents the merchant user's monetary bid to target and convert specific device users 110, groups of device users or classes of device users. More specifically, the merchant user 108 selects specific user demographics corresponding to a specific device user 110, group of device users or class of device users that the merchant user 108 wants to target for acquisition. As described previously, exemplary user demographics include age, gender, geographic location, account balance, purchasing habits and interests. The merchant user 108 then enters one or more monetary bid amounts that it will to pay to target and convert device users 110 having similar demographics to the demographics selected by the merchant user 108 in the advertisement campaign. For example, the merchant user 108 enters a cost per acquisition bid/budget amount ("CPA"), a cost per retention bid/budget amount ("CPR") and/or a cost per impression bid/budget amount ("CPI"). The CPA represents the monetary amount that the merchant user 108 will pay to the operator 104 of the advertisement system 4 for each new customer (e.g., device user 110) that it acquires through its advertisement campaign. Merchant users 108 could also pay CPA for retaining customer (e.g., device user 110) if they wish (e.g. the merchant users 108 pay a flat fee per device user 110 merchant offer purchase that is separate from the merchant offer amount). Generally, the CPA is the merchant user's cost per device user 110 who purchases a merchant offer. The CPR represents the monetary amount, for example, a percentage of the transaction amount (e.g., cost as a percentage of the merchant offer value purchased), that the merchant user 108 will pay to the operator 104 of the advertisement system 4 for each transaction that an existing customer 110 of the merchant user 108 completes through the merchant's advertisement campaign. The CPI represents the monetary amount that the merchant user 108 will pay to the operator 104 of the advertisement system 4 for each unique impression of the advertisement (e.g., cost per device user 110 who sees the merchant offer advertisement/merchant offer option). For example, for each unique user session for the device user 110 (e.g., every time the device user 110 utilizes the advertisement system 4 to view a list of merchant offer advertisements 100, a "user session"), the advertisement system 4 generates the list of merchant offer advertisements 100 and could charge merchant users 108 for that impression. If a device user 110 clicks around the widget and sees the homescreen multiple times, the advertisement system 4 would still only charge the merchant user 108 once.

Figure 5:
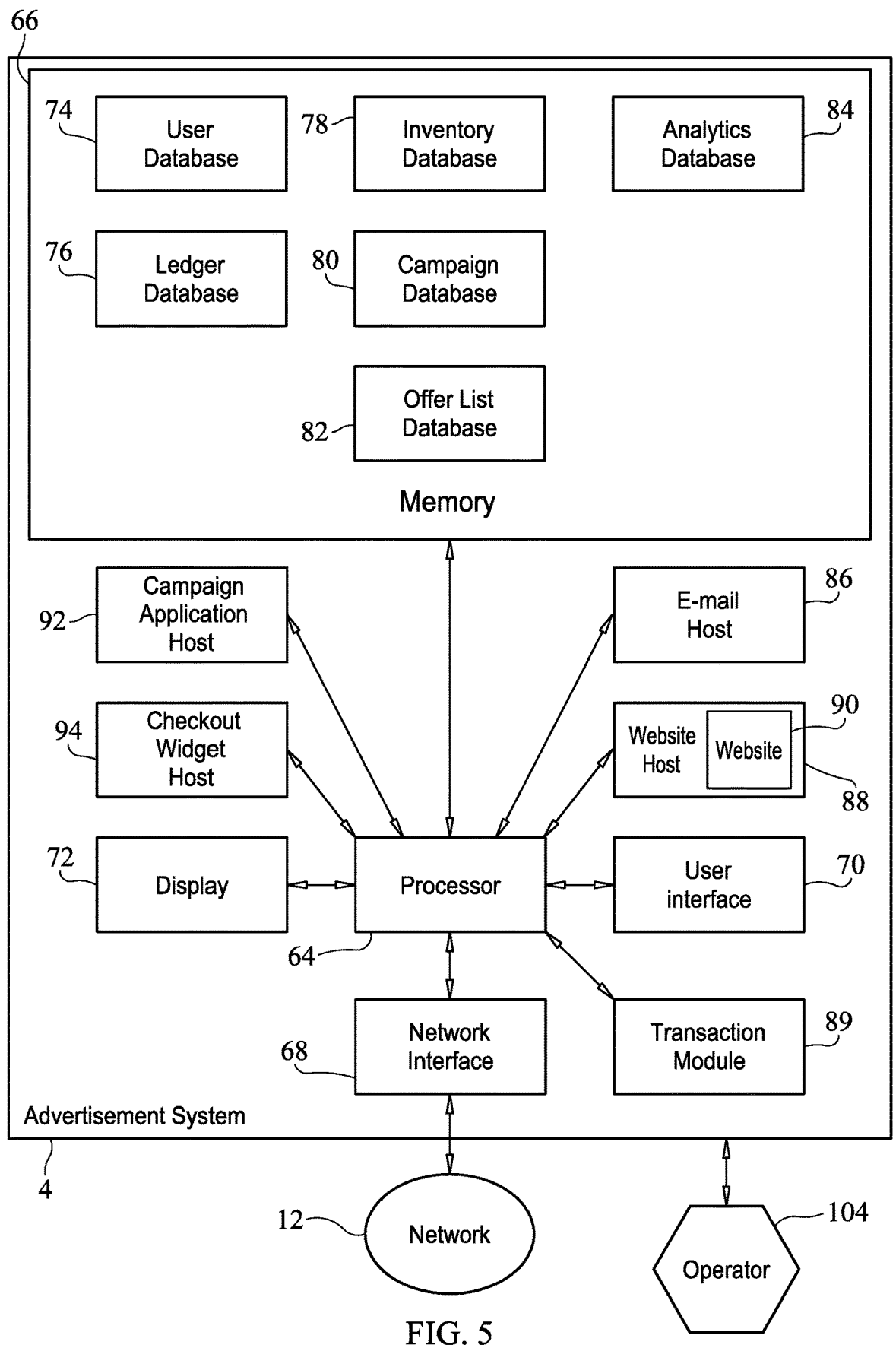
FIG. 5 is a schematic block diagram of the advertisement system of the advertisement and checkout system formed in accordance with the present invention.

As can be seen in FIG. 5 of the drawings, the advertisement system 4 includes a processor 64 and a memory 66, such as a non-transitory computer-readable storage medium. The non-transitory computer-readable storage medium may include at least one of a random access memory (RAM), a dynamic random access memory (DRAM), a digital storage disk and a read only memory (ROM). The processor 64 is in electrical communication with the memory 66 and reads program instructions stored therein, the program instructions causing the processor 64 to execute the operations described herein. The advertisement system 4 further includes a network interface 68. The network interface 68 of the advertisement system 4 is in electrical communication with the processor 64 and enables the advertisement system 4 to connect to the network 12. The advertisement system 4 may further include a user interface 70 and a display 72, each of the user interface 70 and the display 72 being in electrical communication with the processor 64. Of course, in one form, the display 72 may also function as the user interface 70.

The advertisement system 4 further includes one or more of a user database 74, a ledger database 76, an inventory database 78, a campaign database 80, an offer list database 82 and an analytics database 84 stored in the memory 66 thereof. The ledger database 76 and ledger data therein provide money flow tracking and are used to charge and transfer funds between users 104, 106, 108, 110, as well as ensure compliance. Additionally, the advertisement system 4 may include an e-mail host 86, a checkout widget host 94, a website host 88 and a campaign application host 92.

As described previously, the advertisement system website host 88 may host a website 90 on which the campaign application 91 may run. The merchant user 108 may utilize the web-browser 60 of the merchant administrator 6 to interact with the campaign application 91 and create, modify or view advertisement campaigns. The advertisement campaigns, including the campaign elements thereof, such as target user demographic information (e.g., the user's age, gender, geographic location, account balance, purchasing habits and interests), the merchant user's cost per acquisition bid/budget amount ("CPA"), the merchant user's cost per impression bid/budget amount ("CPI"), the merchant user's cost per retention bid/budget amount ("CPR"), the merchant user's available merchant offer inventory for the campaign and the merchant user's available promotional merchant offer inventory selected or entered by the merchant user 108, are stored in the campaign database 80 in the memory 66 of the advertisement system 4.

Similarly, the campaign application 59 stored in the memory 50 of the merchant administrator 6 and executed by the processor 48 of the merchant administrator 6 may communicate with the campaign application host 92 of the advertisement system 4 to send advertisement campaigns from the campaign database 62 in the merchant administrator 6 to the campaign database 80 in the advertisement system 4. As will be explained in greater detail in the forthcoming paragraphs, the advertisement system 4 processes the merchant advertisement campaigns maintained in the campaign database 80 to target and convert users 110. Furthermore, the merchant API may communicate advertisement campaigns from the campaign database 62 of the merchant administrator 6 to the campaign database 80 in the advertisement system 4.

For example, the processor 48 of the merchant administrator 6 can retrieve advertisement campaigns from the campaign database 62 in the memory 50 thereof and communicate such campaigns through the network interface 52 of the merchant administrator 6 over the network 12 to the network interface 68 of the advertisement system 4. The processor 64 of the advertisement system 4 stores the campaigns communicated from the merchant administrator 6 in the campaign database 80 of the advertisement system 4. Additionally, when the merchant user 108 utilizes the campaign application 91 operating on the advertisement system website 90, the processor 64 retrieves the campaign from the website host 88 and stores the campaign in the campaign database 80 of the advertisement system 4. Furthermore, when the merchant user 108 utilizes the campaign application 59 stored in the memory 50 of the merchant administrator 6 to create and modify advertisement campaigns, the campaign application 59 communicates the advertisement campaign to the campaign host 92 of the advertisement system 4. The processor 64 of the advertisement system 4 retrieves the campaign from the campaign application host 92 and stores the campaign in the campaign database 80 of the advertisement system 4.

Figure 16:
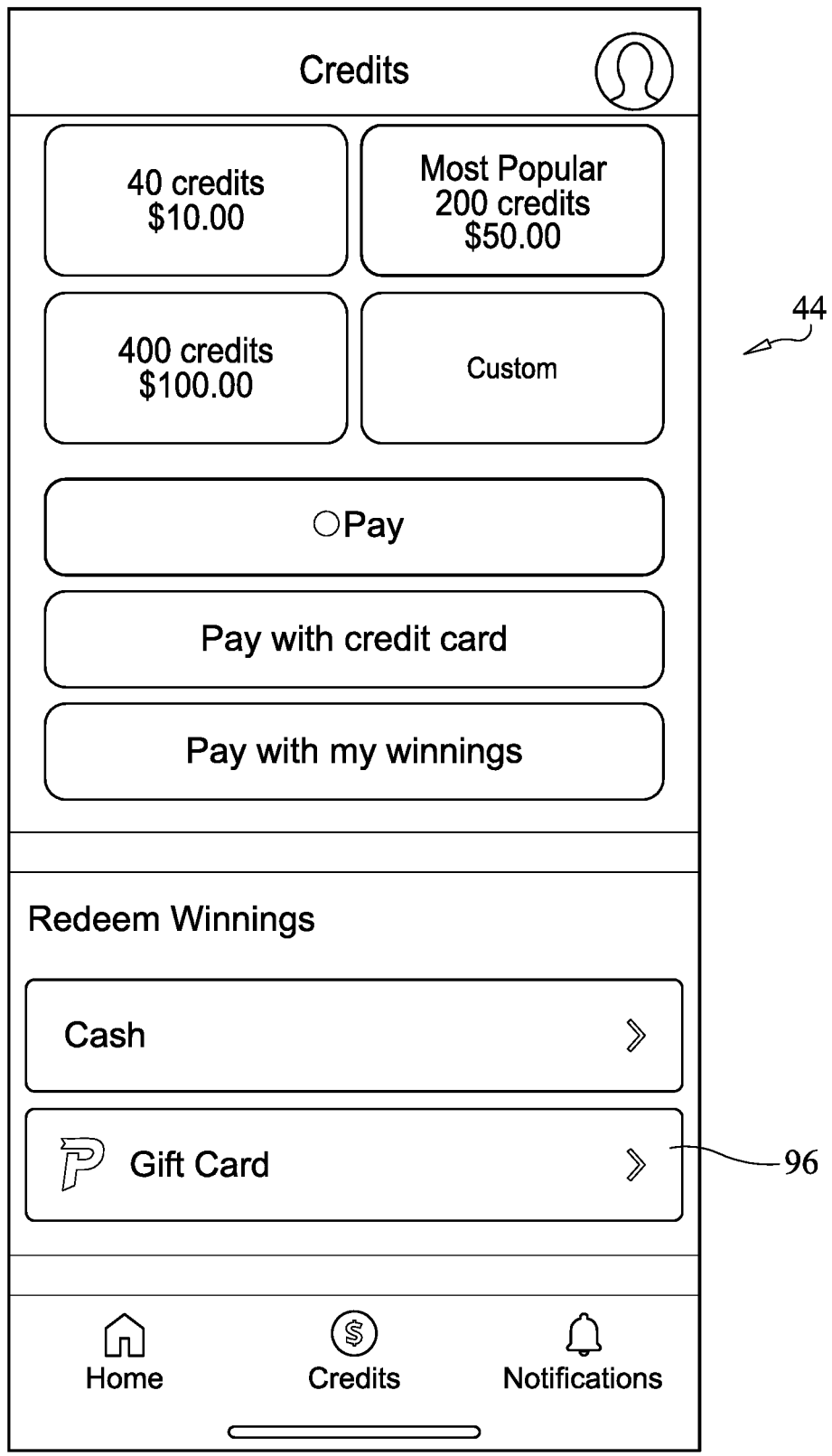
FIG. 16 is a screenshot of a partner application forming part of the advertisement and checkout system of the present invention.
Figure 17:
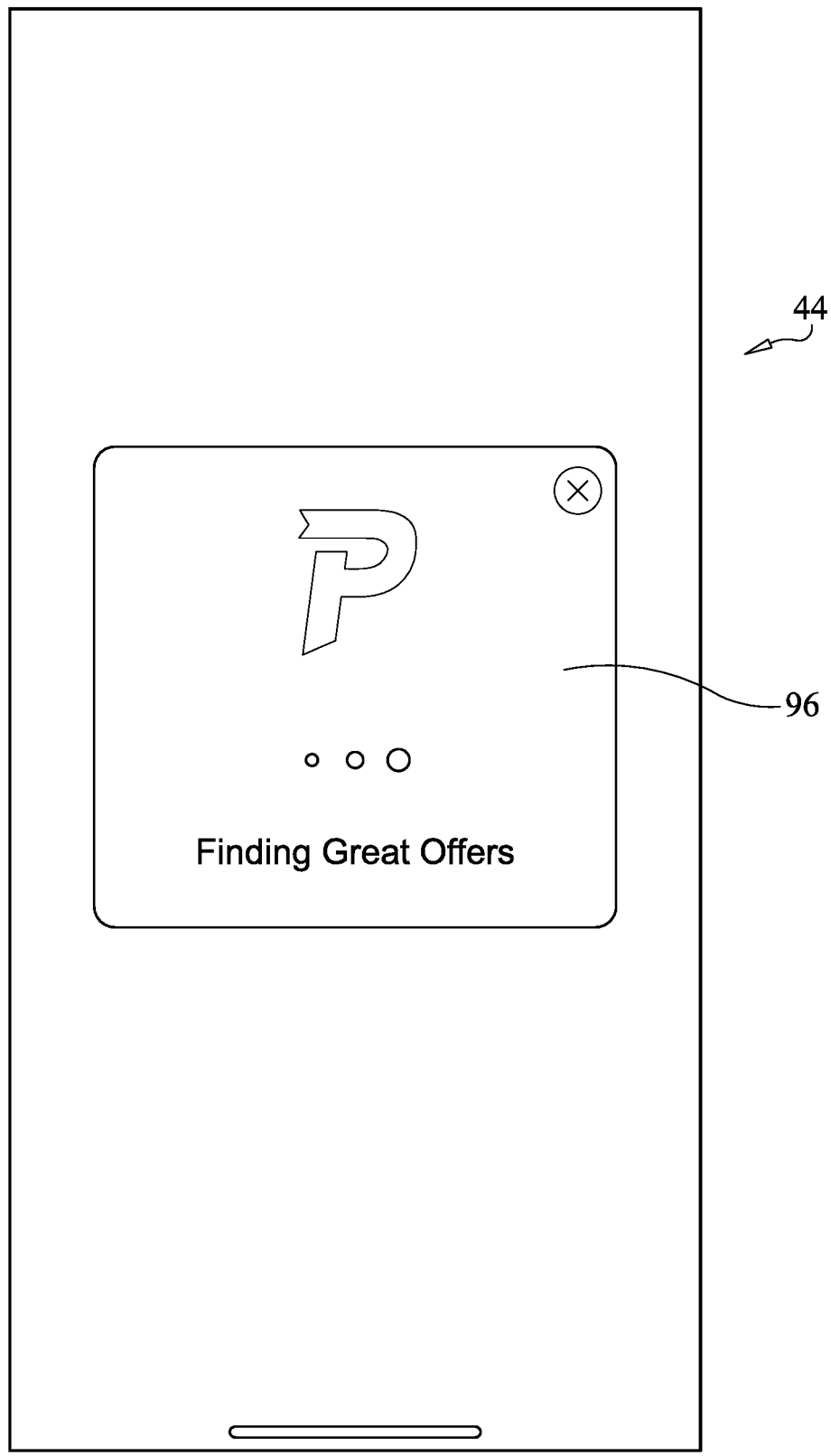
FIG. 17 is another screenshot of a partner application forming part of the advertisement and checkout system of the present invention.

The partner application 26 and partner website 30 include a checkout widget 96 embedded therein, as shown in FIGS. 16 and 17 of the drawings. For example, the checkout widget 96 may be installed on the partner application (e.g., publisher) 26 via a software development kit ("SDK"). The checkout widget 96 is in communication with the checkout widget host 94 of the advertisement system 4 and the partner system 8, and enables the device user 110 to utilize funds from his or her account balance on the partner system 8 to purchase the merchant offers of the merchant users 108, rather than merely transferring funds to a bank account by a third-party intermediary such as PayPal®, which often has associated fees and minimal incentives, as well as redirects users 110 to a new page for transfer completion. However, users 110 may also transfer funds to their accounts by declining to utilize the checkout widget 96.

As will be described in greater detail in the forthcoming paragraphs, when the device user 110 elects on the partner application 26 to withdraw funds from his or her account balance on the partner system 8, the checkout widget 96 displays a personalized advertisement page 98 within the partner application 26 that shows a list 100 of merchant offer advertisements 102 from merchant users 108, as shown in FIGS. 6 and 18 of the drawings. The device user 110 may select one or more merchant offer advertisements 102 from various merchant users 108 and utilize funds from his or her account balance on the partner system 8 to purchase the corresponding merchant offers set forth in the merchant offer advertisements 102. Accordingly, in one form, the checkout widget 96 allows the user 110 to directly purchase merchant offers that correspond to the merchant offer advertisements 102 from different merchant users 108 without leaving the partner application 26 or being redirected to another application or website, thereby increasing system performance by saving processing time and resources; however, in another form, the checkout widget 96 may direct the device user 110 to other applications or websites.

The list 100 of merchant offer advertisements 102 from merchant users 108 is determined by the advertisement system 4. More specifically, the advertisement system 4 processes merchant campaigns from the campaign database 80 in an auction-like manner and ranks the merchant campaigns such that the merchant offer advertisements 102 are displayed in a specific order (e.g., arranged) on the list 100 of merchant offer advertisements 102 that is displayed to the device user 110. The process for generating and displaying merchant offer advertisement lists 100 based on merchant campaigns varies depending on whether the device user 110 is a new user (e.g., a user 110 that has not previously been acquired by a merchant user) or a previously acquired user (e.g., a user 110 that has previously purchased a merchant offer through the checkout widget 96).

When the checkout widget 96 is activated on the partner application 26 by a device user's 110 election to withdraw funds from his or her account balance on the partner system 8, the partner system 8 communicates the device user's 110 demographics to the advertisement system 4. The processor 64 of the advertisement system 4 compares the user demographics of the device user 110 to the user demographics stored in the user database 74 of the advertisement system 4 to determine whether the particular device user 110 is a new user or a previously acquired user.

If the advertisement system 4 determines that the device user 110 is a new user, the advertisement system 4 processes merchant campaigns from the campaign database 80 in an auction-like manner and ranks the merchant campaigns for display on the list 100 of merchant offer advertisements 102. More specifically, merchant campaigns are processed and ranked by weighing factors such as campaign relevance, merchant CPA, merchant CPR and merchant CPI. The degree of campaign relevance is determined by comparing the device user's demographic information to the targeted user demographic information elements set forth in the campaigns in the campaign database 80. For example, if the device user 110 is a 35 year old male living in New York, merchant campaigns targeting males between the ages of 30 and 40 living in New York would be considered to be highly relevant. In contrast, campaigns directed to females between the ages of 70-80 living in California would be considered to be of low relevance.

By determining the relevancy of a particular advertisement campaign to a specific device user 110, the advertisement system 4 increases the likelihood of a device user 110 conversion and user acquisition by the merchant user 108 (e.g., the likelihood that a device user 110 will select a particular merchant offer advertisement 102 and purchase the merchant offer that corresponds thereto utilizing funds from the device user's account on the partner system 8). For example, advertisement campaigns target specific users 110 that are predicted to be interested in such advertisements, in particular, the goods/services of the merchant user 108 such that the likelihood of conversion increases. Generally, campaigns with higher relevancy to a particular user 110 will be ranked higher on the list 100 of merchant offer advertisements 102 than campaigns with lower relevancy to the device user 110.

Other campaign elements that are utilized by the advertisement system 4 to rank merchant campaigns are the merchant user's 108 CPA, CPR and CPI for a particular campaign. Generally, merchant campaigns with higher CPA, CPR and CPI values will be ranked higher on the list 100 of merchant offer advertisements 102 than campaigns with lower CPA, CPR and CPI values.

During the ranking processes, the advertisement system 4 may assign different weights to the factors affecting ranking (e.g., campaign relevancy, CPA value, CPR value and CPI value, etc.) to determine the overall ranking of the campaigns and the order that the merchant offer advertisements 102 are displayed on the list 100 of merchant offer advertisements 102. For example, the advertisement system 4 may utilize data science, predicted conversion and spend for merchant campaigns in differing orders based on previous conversion data. These predictions are based on recommender systems principles, feature reduction, clustering and bayesian statistics, among other methods and techniques. The advertisement system 4 utilizes these predictions, real time bid amounts, multiarm bandit principles, past specific user 110 behavior to create an order of campaigns (e.g., the ranking of the campaigns). The merchant offer advertisement 102 of a higher ranking campaign is displayed relatively higher on the list 100 of merchant offer advertisements 102 than lower ranking campaigns, such that the merchant offer advertisements 102 of higher ranking campaigns are presented more prominently (e.g., higher) on the list 100 of merchant offer advertisements 102 so that the device user 110 visualizes the merchant offer advertisements 102 of the higher ranked campaigns before the merchant offer advertisements 102 of the lower ranked campaigns.

The advertisement system 4 may also asynchronously generate and store lists 100 of merchant offer advertisements 102 that can be retrieved and displayed to new users. In this regard, rather than generate lists 100 of merchant offer advertisements 102 synchronously (e.g., upon the activation of the checkout widget 96 by a new user), the advertisement system 4 continuously generates predetermined lists 100 of merchant offer advertisements 102 for target user demographic groups. The target user demographic groups are created by the advertisement and include user demographic information elements, such as age, sex and location, etc. For example, one target user demographic group may comprise males between the ages of 20 and 30 years located in New York. Another target user demographic group may be females between the ages of 50 and 55 located in Florida, Georgia or South Carolina. Yet another target user demographic could be males or females between the ages of 20 and 25 residing in Texas, New York and California. Essentially, the advertisement system 4 creates target user demographic groups that may encompass the demographic information of a new user, and may also include purchasing habits of similar users.

The advertisement system 4 processes and ranks merchant campaigns, as described in the previous paragraphs, in a continuous manner and generates lists 100 of merchant offer advertisements 102 for each target user demographic group. The lists 100 of merchant offer advertisements 102 are stored (e.g., cached or maintained) in the offer list database 82 on the advertisement system 4. When the advertisement system 4 determines that the device user 110 is a new user, the advertisement system 4 compares the demographic information of the new user 110 to the target user demographic groups to determine which group encompasses the user. Thereafter, the advertisement system 4 selects a predetermined list 100 of merchant offer advertisements 102 for the particular target user demographic group from the offer list database 82 and communicates the list 100 of merchant offer advertisements 102 to the checkout widget 96 on the partner application 26 such that the list 100 is displayed to the user 110 on the display 44 of the user device 10.

The cache of the lists 100 allows the lists 100 to be delivered to the checkout widget 96 extremely quickly. Additionally, the use of target user demographic groups increases the relevancy of the merchant offer advertisements 102 displayed on the list 100 so that user conversion is increased. The advertisement system 4 may continuously modify the number of target user demographic groups as well as the user demographic information elements in each group to increase the likelihood that a new user will be encompassed by one of the target user demographic groups, as well as to focus the group on the conversion patterns of particular demographic groups of users. The advertisement system 4 may utilize analytics data from the analytics database 84 or the user database 74 to modify the target user demographic group. The modification of the target user demographic groups may be modified autonomously, through the use of artificial intelligence (AI), or manually through the use of the user interface 70. Furthermore, the ordered lists 100 of the merchant offer advertisements may be continuously updated in view of the analytics data stored in the analytics database 84 or user database 74.

The advertisement system may also generate an aggregate or "fail safe" user demographic group for situations when the demographics of the new user are not encompassed by any current target user demographic group. As with the generation of the ordered lists 100 for the target user demographic groups, the advertisement system 4 continuously generates ordered lists 100 for the fail safe user demographic group and stores such lists in the offer list database 82. The ordered lists 100 of merchant offer advertisements 102 may also be continuously updated in view of the analytics data stored in the analytics database or user database 74. Again, when the advertisement system 4 determines that the user 110 is a new user and the demographic information of the new user is not encompassed by one of the current target user demographic groups, the advertisement system selects an ordered list 100 of merchant offer advertisements for the fail safe user demographic group from the offer list database 82 and communicates the list 100 of merchant offer advertisements 102 to the checkout widget 96 on the partner application 26 such that the list 100 is displayed to the user 110 on the display 44 of the user device 10.

If the advertisement system 4 determines that the device user 110 is a previously acquired user, the advertisement system 4 selects a predetermined list 100 of merchant offer advertisements 102 (e.g., a "cached list") from the offer list database 82 that is communicated to the checkout widget 96 on the partner application 26. More specifically, after a device user 110 has been acquired, the advertisement system 4 generates lists 100 of merchant offer advertisements 102 for the particular user 110 based on currently available merchant campaigns in the campaign database 80 in anticipation that the previously acquired user 110 will again use the checkout widget 96 on the partner application 26 at some point. The lists 100 of merchant offer advertisements 102 for a particular user are stored (e.g., cached or maintained) in the offer list database 82 on the advertisement system 4. When the previously acquired user 110 subsequently utilizes the checkout widget 96, the advertisement system 4 identifies the previously acquired user 110 by comparing the user demographics communicated by the partner system 8 to the user database 74 in the advertisement system 4, selects a predetermined list 100 of merchant offer advertisements 102 for the particular user from the offer list database 82 and communicates the list 100 of merchant offer advertisements 102 to the checkout widget 96 on the partner application 26 such that the list 100 is displayed to the user 110 on the display 44 of the user device 10. The cache of the lists 100 allows the lists 100 to be delivered to the checkout widget 96 extremely quickly. The selection of the specific predetermined list 100 may be made by the advertisement system 4 based on a specific metric that is determined to be most important at the given time for the given user 110 for the overall advertisement ecosystem.

The process of creating the lists 100 of merchant offer advertisements 102 for previously acquired users 110 is similar to creating the list 100 of merchant offer advertisements 102 for new users 110; however, additional factors may be utilized to optimize conversion. More specifically, as will be explained in greater detail in the forthcoming paragraphs, the transaction history (e.g., conversion history) and analytics data of a previously acquired user 110 is maintained in either the user database 74 or the analytics database 84 of the advertisement system 4, or both. The transaction history and analytics data for a particular user 110 may include data related to the user's prior merchant offer advertisement 102 selections, declined merchant offer advertisements 102 and/or merchant offers (e.g., the merchant offer advertisements and/or merchant offers that were passed up by the device user 110), purchased merchant offers, clickstream data, all data/events relating to purchase made through the checkout widget 96, custom widget events (select, readmore, changeValue, cashout, cancel, etc.), as well as events from various microservices. Accordingly, the process of ranking the merchant campaigns for display on the list 100 of merchant offer advertisements 102 may also include data from the analytics database 84 or the user database 74 for the particular user 110.

Again, the advertisement system 4 may utilize data science, predicted conversion and spend for merchant campaigns in differing orders based on previous conversion data. These predictions are based on recommender systems principles, feature reduction, clustering and bayesian statistics, among other methods and techniques. The advertisement system 4 utilizes these predictions, real time bid amounts, multiarm bandit principles, past specific user 110 behavior to create an order of campaigns (e.g., the ranking of the campaigns). This is done by coming up with many ordered lists 100 of merchant offer advertisements 102 for each user based on different weightings. For example, one that focuses on new campaigns, one that focuses on spend, one that focuses on overall conversion rate and one that is purely random, etc. Then, through testing and personalization, the advertisement system 4 can stitch them together to show the user 110 one cohesive and personalized experience focused on driving whatever metric is determined to be most important at this given time for this given user 110 for the overall advertisement ecosystem.

The advertisement system 4 also uses conversion data (e.g., views, clicks and conversions, etc.) to decide on the specific creative and discounted offer within the campaign through iterative AB testing by the merchant and automatic bandit algorithms, as well as user 110 behavior and withdrawable balance to select the possible merchant offer denominations for that user 110.

It is also envisioned to be within the scope of the present invention to utilize analytics data relating to the relative success of particular merchant offer advertisements 102 from various merchant users 108 when ranking merchant campaigns for the ordered lists 100 of merchant offer advertisements 102 for both new users 110 and previously acquired users 110. Accordingly, the customized order list 100 for a particular user may balance or factor in revenue driving offers, exploratory offers and high converting offers. Additionally, it is envisioned to be within the scope of the present invention to include one or more of the databases referenced herein in a single, unitary, database.

After the advertisement system 4 determines the list 100 of merchant offer advertisements 102 that is customized and specific to a device user 110, the list 100 of merchant offer advertisements 102 is communicated to the checkout widget 96 on the partner application 26, for example by the checkout widget host 94 or an advertisement system API, and displayed to the device user 110 on the display 44 of the user device 10. The device user 110 may select one or more merchant offer advertisements 102 from the list 100 of merchant offer advertisements 102 by utilizing the user interface 42 of the user device 10 and clicking on the merchant offer advertisement 102. In this regard, when the device user 110 selects a merchant offer advertisement 102 to purchase the corresponding merchant offer, the partner system 8 withdraws funds from the device user's account equal to the purchase price of the merchant offer advertisement 102. Preferably, the advertisement system 4 operates as an intermediary such that the partner system 8 transfers the funds for the purchase price of the merchant offer set forth in the merchant offer advertisement 102 to the advertisement system 4 which, in turn, transfers the funds to the merchant administrator 6 or to the merchant user 108.

In another form, the partner system 8 may prefund an account that the advertisement system 4 holds and debits for device user withdrawals. Therefore, instead of withdrawing money from the individual bank account of the particular partner user 106 or the respective partner system 8 thereof every time a transaction occurs, funds are held in the prefunded bank account so that the advertisement system 4 can insure that funds are available to cover the withdrawals (e.g., transactions), as well as speed up the withdrawal process since withdrawals can be made from the prefunded account instantly, instead of waiting several days (e.g., three days) if the advertisement system 4 were to withdraw funds from the individual bank account of the particular partner user 106 or the respective partner system 8. For example, the advertisement system 4 can open an account for a particular partner user 106 of the partner system 8, or for a plurality of partner users, at a bank. The respective partner system 8 or the particular partner user 106 thereof funds the bank account with $1,000. When the device user 110 withdraws $100 from their account via the advertisement system 4 (e.g., by selecting a merchant offer advertisement 102 corresponding to a particular merchant offer), the advertisement system 4 will withdraw $100 from the bank account opened for the particular partner user 106 or the respective partner system 8 thereof, which the particular partner user 106 or respective partner system 8 thereof has already prefunded, rather requesting a withdrawal from the individual bank account of the particular partner user 106 or the respective partner system 8 thereof, which can take several days.

As described previously, the merchant offer inventory includes data specific to each merchant offer in the merchant offer inventory, such as the unique merchant offer redemption code, the merchant offer amounts and denominations. The promotional merchant offers in the promotional merchant offer inventory include promotional amounts or other value driven incentives (e.g., a merchant offer purchase price of $300 for $400 worth of purchases from the merchant user 108, 25% off or 50% off, etc.). The merchant offer inventory and promotional merchant offer inventory may be maintained in the inventory database 78 on the advertisement system 4, the campaign database 80 on the advertisement system 4 or in the merchant offer inventory database 57 on the merchant administrator 6. When the device user 110 selects a merchant offer advertisement 102 from the list 100 of merchant offer advertisements 102 to purchase a merchant offer, the corresponding merchant offer is retrieved from the database where it is stored and communicated to the user 110.

For example, if the merchant offer inventory is maintained in the inventory database 78 of the advertisement system 4, after the device user 110 purchases a merchant offer (e.g., by selecting the merchant offer advertisement 102 from the list 100 shown on the display 44 by utilizing the user interface 42), the advertisement system 4 retrieves the corresponding merchant offer, including the merchant offer redemption code, and the other data specific to the merchant offer, from the inventory database 78 and communicates the merchant offer to the device user 110 via the e-mail host 86. Similarly, if the merchant offer inventory is maintained in the merchant offer inventory database 57 of the merchant administrator 6, the advertisement system 4 may further include an interface that requests that the specific merchant offer and corresponding data be transferred from the merchant offer inventory database 57 of the merchant administrator 6 to the merchant offer inventory database 78 of the advertisement system 4. After the merchant offer has been transferred to the merchant offer inventory database 78 of the advertisement system 4, the advertisement system 4 communicates the merchant offer to the device user 110 via the e-mail host 86. Because obtaining merchant offer codes is asynchronous, it could trigger the merchant offer delivery via the e-mail host 86.

After the merchant offer has been communicated to the device user 110, the merchant offer inventory database where the merchant offer was maintained is updated by the processor and the merchant offer is removed therefrom. A transaction module 89 in the advertisement system 4 collects the CPA, CPR and/or CPI funds set forth in the particular campaign from the merchant user 108 of the merchant offer that was purchased by the device user 110. In one form, the transaction module 89 may be a credit card processor. The transaction module 89 sends some or all of the collected CPA, CPR and/or CPI funds to the accounts of the advertisement system 4 and the accounts of the partner system 8. The processor 64 of the advertisement system 4 then updates the ledger database 76 to include ledger data indicative of the collection, retention and transfer of CPA, CPR and/or CPI funds, as well as the funds from the partner system 8 utilized to purchase the merchant offers corresponding to the merchant offer advertisements 102 selected by the device user 110. The user demographic information is also entered into the user database 74 of the advertisement system 4 so that the device user 110 is subsequently recognized by the advertisement system 4 as a previously acquired user 110.

The checkout widget 96 collects analytics data from each checkout transaction and communicates the analytics data to the analytics database 84 or the user database 74 of the advertisement system 4. Analytics data may include data related to the user's prior merchant offer advertisement 102 selections, declined merchant offer advertisements 102 and/or merchant offers (e.g., the merchant offer advertisements and/or merchant offers that were passed up by the device user 110), purchased merchant offers, clickstream data, all data/events relating to purchase made through the checkout widget 96, custom widget events (select, readmore, changeValue, cashout, cancel, etc.), as well as events from various microservices. The analytics data may be cached and communicated to the merchant administrator 6 to modify a particular advertisement campaign. The analytics data may also be utilized as factors for the creation of the list 100 of merchant offer advertisements 102 displayed to previously acquired users, as well as for the ordering/ranking of the campaigns therein.

Accordingly, to increase user acquisition and conversion, the personalized advertisement and checkout system 2 formed in accordance with the present invention utilizes three general system operations: bid optimization, offer optimization and user personalization. With bid optimization, merchant users 108 bid in a first-place auction type process (e.g., first price auction) to drive user views within user demographic segments such as gender, age location and withdrawal balance. However, a second-place auction type process (e.g., second price auction) can also be utilized. With offer optimization, merchant users 108 have the ability to test offers (e.g., advertisements) and creative incentives to drive conversion through more lucrative offers and higher quality creativeness. With user personalization, the device users 110 who utilize the checkout widget 96 will be shown a personalized advertisement page 98 comprising a list 100 of merchant offer advertisements 102 that balances revenue driving offers, exploratory offers and high converting offers.

Device users (e.g., customers) 110 are provided additional value by merchant users 108 in the form of discounts and earning even more value for their cash-outs than they would have received if they merely transferred funds to a bank account. Partner users 106 profit by monetizing cash-outs that have been otherwise costly exchanges (e.g., partner users 106 previously paid fees associated with players cashing out winnings via third party providers, such as PayPal® and check cashiers, etc.). The advertisement system operator 104 receives portions of the acquisition costs (e.g., CPA), along with the partner user 106, and earns a percentage on transactions where the customer (e.g., the user 110) is retained to an existing merchant user 108. Merchant users 108 benefit by acquiring users (e.g., customers) 110 in an incentivized manner as the device user 110 has a monetary incentive to transact with the merchant user 108, which is not the case with advertisement methods that do not utilize incentives (e.g., Facebook® advertisements, Google® Adword campaigns, etc.).

The personalized advertisement and checkout system 2 formed in accordance with the present invention assists merchant users 108 optimize offers (e.g., creative and discounts) to increase device user (e.g., customer) 110 conversion, as well as assists merchant users 108 in optimizing bid amounts to increase views. This is accomplished, in part, by presenting advertisement campaigns to users 110 that area relevant and interesting to the user 110. Accordingly, the system 2 provides a means to connect device users 110 to merchant users 108, wherein device users 110 who are there to transact (withdraw funds) explore new merchant users 108 and are converted and retained by merchant users 108. The customized lists 100 of merchant offer advertisements 102 allow the users (e.g., customers) 110 to easily find what they are looking for and discover new great companies (e.g., merchant users 108).

The personalized advertisement and checkout 2 system formed in accordance with the present invention provides a novel system and method for merchant users 108 to advertise to users 110 by acquiring users 110 with funds. This can be marketing to existing users 110 or attracting new users 110. The campaign ranking process (e.g., auction process) balances these goals elegantly and automatically. The personalized advertisement and checkout system 2 formed in accordance with the present invention also monetizes partner companies' (e.g., partner users' 106) outflow of withdrawals by connecting them with merchant users 108 who are looking for acquisition.

In accordance with the present invention, multiple merchant users 108 create advertisement campaign to target the users 110 of the partner applications 26 of partner users 106. The advertisement system 4 ranks the advertisement campaigns of the merchant users 108 and presents the advertisement campaigns to the device users 110 in an ordered list 100 of merchant offer advertisements 102, which may comprise offers from different merchant users 108 on the same list 100.

A method for creating, selecting and displaying personalized advertisements to users (e.g., potential customers) is also provided herewith. In a first step, a device user 110 activates the checkout widget 96 by pressing or activating an icon or similar activating link displayed on the display 44 of the user device 10 by the partner application 26 utilizing the user interface 42 thereof. In a second step, the processor 14 of the partner system 8 retrieves the specific user's 110 demographic information from the user database 32 in the partner system 8 and communicates the device user's 110 demographic information to the advertisement system 4 via the network interface 18. In a third step, the processor 64 of the advertisement system 4 determines whether the device user 110 is a new user or a previously acquired user by comparing the device user's 110 demographic information to demographic information stored in the user database 74 in the advertisement system 4.

If the processor 64 of the advertisement system 4 determines that the device user 110 is a new user, the advertisement system 4 processes and generates a list 100 of merchant offer advertisements 102. The step of generating the list 100 of merchant offer advertisements 102 comprises the sub-steps of: a) comparing the advertisement campaigns stored in the database 80 of the advertisement system 4 to the demographics of the device user 110 communicated from the processor 14 of the partner system 8, b) ranking the advertisement campaigns based on factors such as relevancy, CPA, CPR, CPI and data analytics and c) generating a list 100 of merchant offer advertisements 102. If the processor 64 of the advertisement system 4 determines that the device user 110 is a previously acquired user, the advertisement system 4 selects and retrieves a predetermined list 100 of merchant offer advertisements 102 for the specific user 110 from the offer list database 82.

In a fourth step, the advertisement system 4 communicates the list 100 of merchant offer advertisements 102 to the checkout widget 96. In a fifth step, the checkout widget 96 displays the list 100 of merchant offer advertisements 102 on the display 44 of the user device 10. In a sixth step, the device user 110 purchases one or more merchant offers by actuating the user interface 42 of the user device 10 and selecting one or more of the merchant offer advertisements 102 from the list 100. In a seventh step, the advertisement system 4 retrieves the merchant offers from the merchant offer inventory that correspond to the merchant offer advertisements 102 selected by the user 110. In an eighth step, the advertisement system 4 transfers the merchant offers to the device user 110 utilizing the e-mail host 86. In a ninth step, the advertisement system 4 initiates the transferring of funds.

The step of transferring funds comprises one or more of the sub-steps of: a) either the partner system 8 withdrawing funds from the device user's 110 account on the partner system 8 equal to the purchase price of the merchant offer set forth in the selected merchant offer advertisements 102 and transferring the funds to the merchant administrator 6 or the advertisement system 4 withdrawing funds from the device user's 110 account on the partner system 8 equal to the purchase price of the merchant offer set forth in the selected merchant offer advertisements 102 and transferring the funds to the merchant administrator 6, b) collecting the CPI, CPA and/or CPR from the merchant administrator 6 by the advertisement system 4, c) transferring the CPI, CPA and/or CPR to the accounts of the partner system 8 and/or advertisement system 4, d) causing the processor 14 of the partner system 8 to update the account balance of the device user 110, e) causing the processor 64 of the advertisement system 4 to update the ledger database 76 to record the transactions, f) causing the processor 64 of the advertisement system 4 to update the user database 74, g) updating the inventory database where the merchant offers corresponding to the selected merchant offer advertisements 102 are maintained to remove the merchant offers that correspond to the selected merchant offer advertisements 102, and h) storing analytics data relating the merchant offer advertisement 102 selection and/or merchant offer purchasing in the analytics database 84 on the advertisement system 4.

The method for creating one or more merchant advertising campaigns comprises one or more of the steps of a) the merchant user 108 selecting target user demographics by entering such target user demographics into the merchant interface 58 and, optionally, viewing analytics data from the analytics database 84, b) the merchant user 108 entering CPI, CPA and/or CPR bid amounts, merchant offer inventory and, optionally, total campaign budget amounts and promotional merchant offer inventory, c) storing the advertising campaign in the campaign database 62 of the merchant administrator 6, d) communicating the campaign from the campaign database 62 of the merchant administrator 6 to the advertisement system 4 and e) storing the campaign in the campaign database 80 of the advertisement system 4.

The method for creating the predetermined lists 100 of merchant offer advertisements 102 comprises one or more of the steps of: a) comparing the advertisement campaigns stored in the campaign database 80 of the advertisement system 4 to the demographics information of the device user 110 in the user database 74, b) comparing the advertisement campaigns stored in the campaign database 80 of the advertisement system 4 to the device user's 110 data analytics in the analytics database 84; c) ranking the advertisement campaigns based on factors such as relevancy, CPI, CPA, CPR and data analytics, d) generating a list 100 of merchant offer advertisements 102 and e) storing the list 100 of merchant offer advertisements 102 in the offer list database 82.

Figure 12:
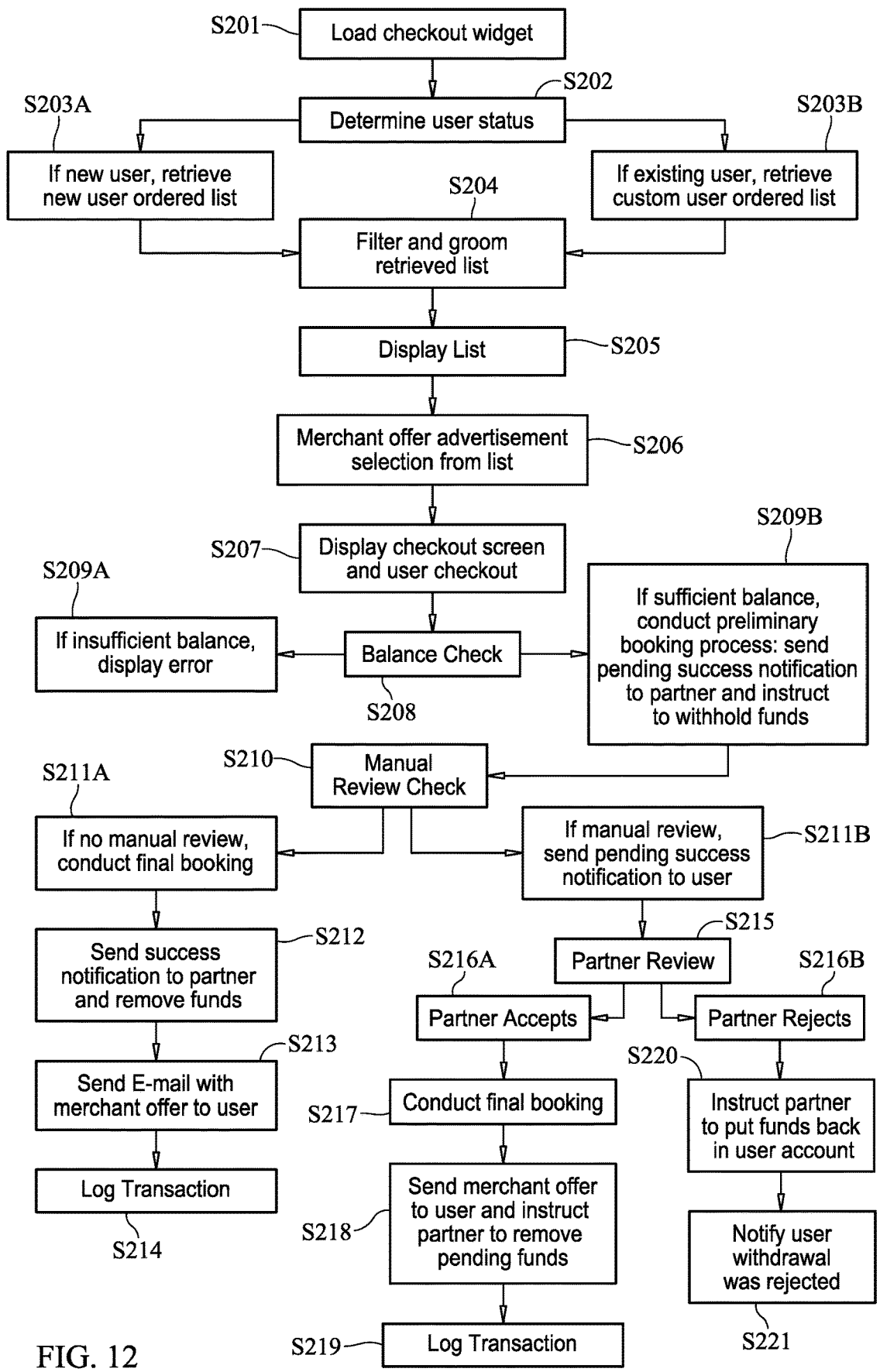
FIG. 12 is an operational flowchart of a preferred embodiment of the advertisement and checkout system formed in accordance with the present invention.

A preferred method for creating, selecting and displaying personalized advertisements to users (e.g., potential customers) is also provided herewith and illustrated in the flow-charts shown in FIGS. 12-15 of the drawings. As shown in FIG. 12 of the drawings, in Step S201, a device user 110 activates the checkout widget 96 by pressing or activating an icon or similar activating link displayed on the display 44 of the user device 10 by the partner application 26 utilizing the user interface 42 thereof. As described previously, the partner application 26 may also be accessed via the web-browser 46.

In Step S202, the processor 64 of the advertisement system 4 determines whether the device user 110 is a new user or a previously acquired user. More specifically, in Step S202, the processor 14 of the partner system 8 retrieves the specific user's 110 demographic information from the user database 32 in the partner system 8 and communicates the device user's 110 demographic information to the advertisement system 4 via the network interface 18. Thereafter, the processor 64 of the advertisement system 4 determines whether the device user 110 is a new user or a previously acquired user by comparing the device user's 110 demographic information to demographic information stored in the user database 74 in the advertisement system 4.

If during Step S202 the processor 64 of the advertisement system 4 determines that the device user 110 is a new user, in 5203A the advertisement system 4 selects and retrieves a list 100 of merchant offer advertisements 102 from the offer list database 82. More specifically, during Step S202, the advertisement system compares the device user's 110 demographic information to the target user demographic groups created by the advertisement system 4. Thereafter, the advertisement system 4 selects and retrieves an ordered list 100 of merchant advertisement offers 102 for the target user demographic group that encompasses at least some of the demographics of the new device user 110. As described previously, if the demographics of the new user 110 are not encompassed by any current target user demographic group, the advertisement system 4 selects and retrieves an ordered list 100 of merchant offer advertisements 102 for the fail safe user group from the offer list database 82. If during Step S202 the processor 64 of the advertisement system 4 determines that the device user 110 is a previously acquired user, in S203B the advertisement system 4 selects and retrieves a predetermined list 100 of merchant offer advertisements 102 for the specific user 110 from the offer list database 82.

In Step S204, the retrieved ordered list 100 of merchant offer advertisements are filtered and groomed. More specifically, during the filtering and grooming processes that, preferably, occurs in real-time, the advertisement system 4 filters out ineligible campaigns, removes any duplicate merchant offer advertisements (e.g., the same merchant offer advertisements or multiple merchant offer advertisements from the same merchant), and adds a degree of randomness.

In Step S205, the advertisement system 4 communicates the list 100 of merchant offer advertisements 102 to the checkout widget 96 and displays the list 100 of merchant offer advertisements 102 on the display 44 of the user device 10. Additionally, the advertisement system 4 logs the merchant offer advertisements 102 shown to the user 110 in the analytics database 84 or the user database 74.

In Step S206, the device user 110 selects one or more merchant offers by actuating the user interface 42 of the user device 10 and selecting one or more of the merchant offer advertisements 102 from the list 100. Alternatively, if the user 110 does not want to select a merchant offer advertisement 102 from the list 100, the user may exit the checkout widget 96.

Figure 19:
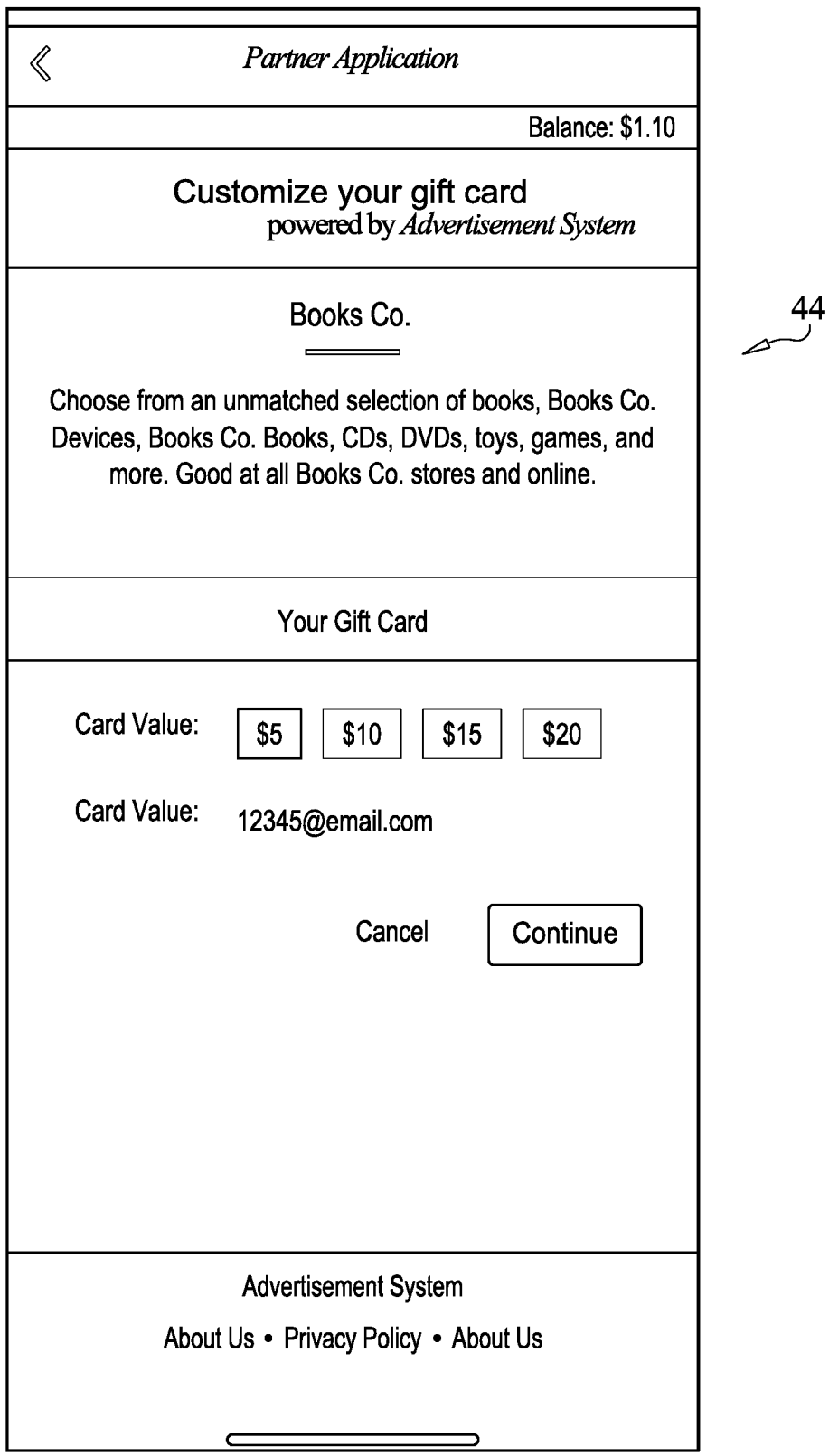
FIG. 19 is another screenshot of a partner application forming part of the advertisement and checkout system of the present invention.
Figure 20:
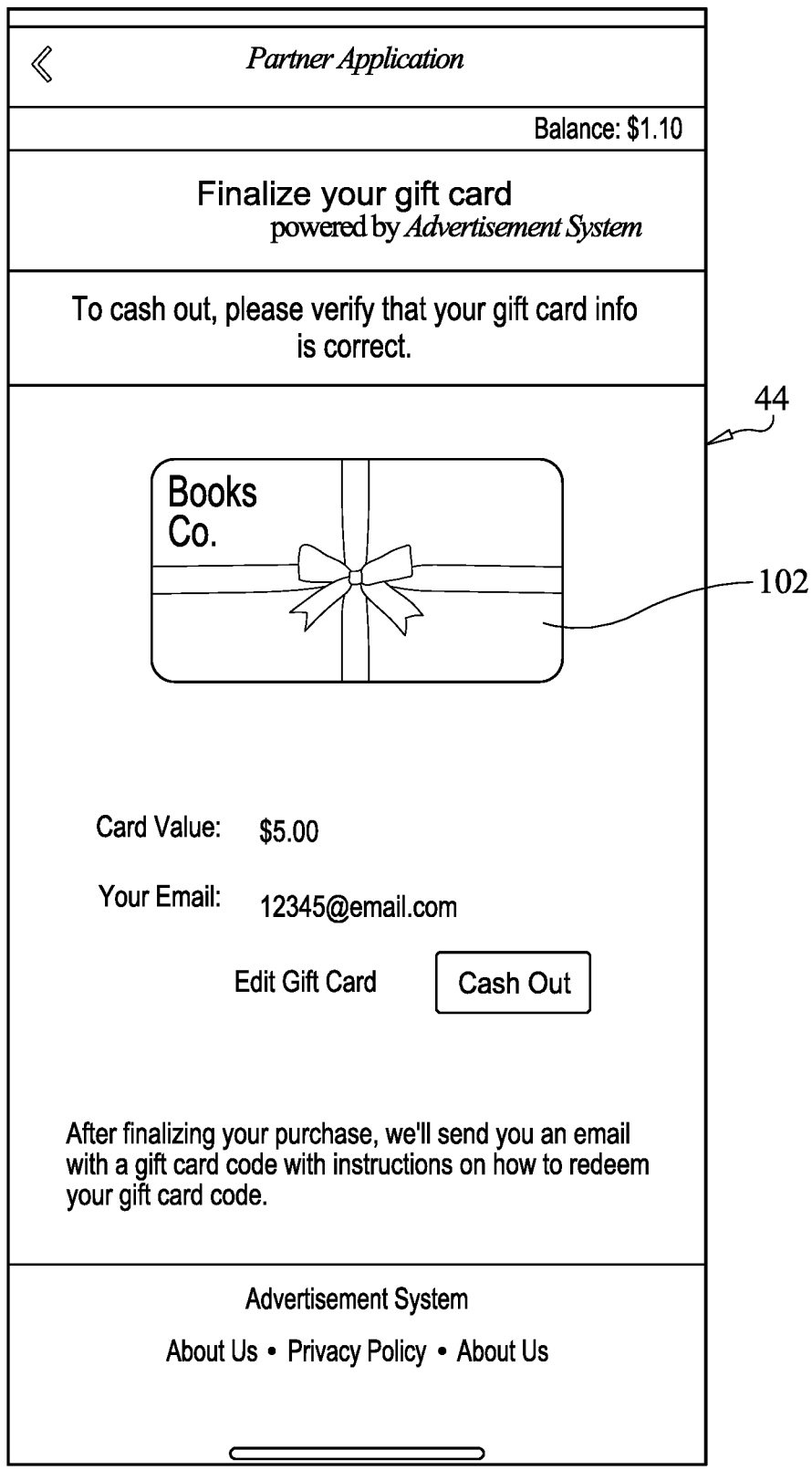
FIG. 20 is another screenshot of a partner application forming part of the advertisement and checkout system of the present invention.

In Step S207, the advertisement system 4 logs the merchant offer advertisement selected by the user 110 in the analytics database 84 or the user database 74, and initiates a checkout process. During the checkout process, a checkout screen is presented to the user 110 on the display 44 of the user device 10, as shown in FIG. 20 of the drawings. During the checkout process, the merchant offer advertisement 102 selected by the user 110 is displayed to the user and the user 110 is prompted to enter his or her e-mail address. The user 110 is also prompted to confirm the purchase of the selected merchant offer advertisement 102. In certain situations, the user 110 may also adjust the value of the merchant offer advertisement 102 during the checkout process, as shown in FIG. 19 of the drawings.

In Step S208, a balance check process is conducted by the advertisement system 4. More specifically, during the balance check process, the advertisement system 4 compares the purchase value of the selected merchant offer advertisement 102 to the user's 110 account balance. To check the user's 110 account balance on the partner system 8, the advertisement system 4 may either query the partner system 8 to communicate the user's 110 account balance to the advertisement system 4 or the advertisement system 4 may check the user's 110 account balance in the demographic information stored in the user database 74.

In Step S209A, if the advertisement system 4 determines that the user 110 does not have a sufficient account balance to purchase the merchant offer set forth in the merchant offer advertisement 102, the advertisement system causes an error message and/or screen to be displayed on the display 44 and the user 110 may return to the previously displayed list 100 of merchant offer advertisements 102 so that the user can select a different merchant offer advertisement 102. In Step S209B, if the advertisement system 4 determines that the user 110 has a sufficient account balance to purchase the merchant offer set forth in the selected merchant offer advertisement 102, the advertisement system 4 conducts a preliminary booking process. During the preliminary booking process, the advertisement system 4 communicates a "pending success" notification to the partner system 8 and instructs the partner system 8 to withhold funds from the device user's account balance/funds account corresponding to the purchase price of the merchant offer set forth in the selected merchant offer advertisement 102.

In Step S210, the advertisement system 4 checks with the partner system 8 to determine whether the partner system 8 requires a manual review process to be conducted before the purchase of the merchant offer corresponding to the selected merchant offer advertisement 102 is finalized. The manual review process ensures that the partner system 8 can verify the eligibility of a device user 110 to purchase the merchant offer corresponding to the selected merchant offer advertisement 102 through the use of the device user's funds in the device user's account balance/funds account on the partner system 8. The manual review process provides quality control and security to the partner user 106. The partner user 106 may require manual review of certain purchase transactions, for example, for certain user's 110 or for certain purchase amounts. The partner system 8 may communicate any manual review requirements of the partner user 106 to the advertisement system 4 at the time of the balance check process set forth in Step S208 or during the preliminary booking process set forth in Step S209B. The partner system 8 may also communicate specific manual review requirements at any time. For example, the partner system 8 may always require manual review of any purchases over $300 and such a requirement may be communicated to the advertisement system 4 asynchronously from the selection of a merchant offer advertisement 102 by a user 110 (e.g., daily, weekly, monthly). The partner user 106 can update or modify the purchase transactions that require manual review at any time.

The partner system 8 may also communicate a "Yes or No" signal to the advertisement system 4 with respect to the requirement for manual review. More specifically, the partner system 8 may synchronously or asynchronously communicate a signal to notify the advertisement system 4 that manual review is either required or not required for all transactions. In Step S210, the advertisement system 4 checks whether it has received such a notification from the partner system 8 (e.g., the notification can be stored in the memory 16 of the partner system, which can be queried by the advertisement system 4 during Step S210). The partner user 106 may configure the partner system 8 to autonomously review and approve certain transactions if certain conditions are met (e.g., a transaction amount is less than $300, a user 110 is in good standing, etc.). The partner user 106 may also require that certain transactions be reviewed by the partner user 106 itself.

If manual review of a particular purchase is required in Step S210, in Step S211B the e-mail host 86 of the advertisement system 4 sends a "pending success" notification to the device user 110. Thereafter, in Step S215, the partner system 8 and/or partner user 106 conducts the manual review of the purchase transaction.

If the partner system 8 and/or partner user 106 accepts/approves the purchase transaction in Step S216A, such approval is communicated by the partner system 8 to the advertisement system 4. Thereafter, in Step S217, the advertisement system 4 conducts a final booking process. During the final booking process, the advertisement system 4 retrieves the merchant offers from the merchant offer inventory that correspond to the merchant offer advertisements 102 selected by the user 110. In Step S218, the advertisement system 4 transfers the merchant offer(s) to the device user 110 utilizing the e-mail host 86 or by displaying the offer on the display 44 of the user device 10. Additionally, the advertisement system 4 instructs the partner system 8 to remove the withheld funds from the device user's 110 funds account/account balance. In Step S219, the advertisement system 4 logs the transaction. It is envisioned to be within the scope of the present invention to also perform Steps S216A, S217, S218 and S219 simultaneously or in different orders.

If the partner system 8 and/or partner user 106 rejects the purchase transaction in Step S216B, such rejection is communicated by the partner system 8 to the advertisement system 4. Thereafter, in Step S220, the advertisement system 4 instructions the partner system 8 to return the funds held in a "holding state" in Step S209B to the device user's 110 account on the partner system 8. In Step S221, the advertisement system 4, utilizing the e-mail host 86 thereof, notifies the device user 110 that the purchase transaction was rejected. It is envisioned to be within the scope of the present invention to also perform Steps S216B, S220 and S221 simultaneously or in different orders.

If the advertisement system 4 determines that manual review of a particular purchase is not required in Step S210, in Step S211A the advertisement system 4 conducts a final booking process. During the final booking process, the advertisement system 4 retrieves the merchant offers from the merchant offer inventory that correspond to the merchant offer advertisements 102 selected by the user 110. In Step S212, the advertisement system 4 communicates a "success" notification to the partner system 8 and instructs the partner system 8 to remove the withheld funds from the device user's 110 account balance/funds account. In Step S213 the advertisement system 4 transfers the merchant offer(s) to the device user 110 utilizing the e-mail host 86 or by displaying the offer on the display 44 of the user device 10. In Step S214, the advertisement system 4 logs the transaction. It is envisioned to be within the scope of the present invention to also perform Steps S211A, S212, S213 and S214 simultaneously or in different orders.

Figure 14:
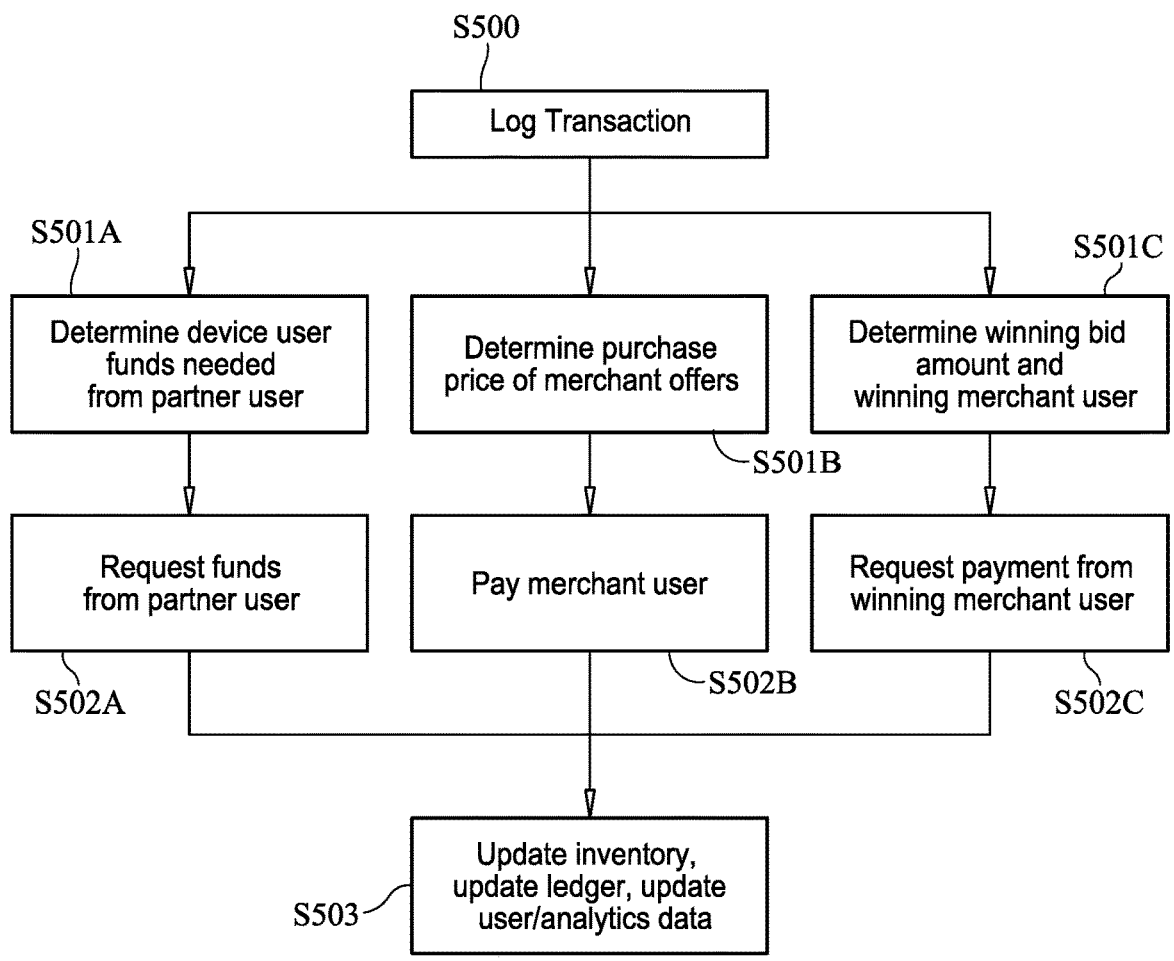
FIG. 14 is another operational flowchart of a preferred embodiment of the advertisement and checkout system formed in accordance with the present invention, showing the operational steps for logging transactions.

The logging of the transaction set forth in Steps S214 and S219 is further detailed in FIG. 14 of the drawings and starts with Step S500. In Step S501A, the advertisement system 4 determines the amount of funds to be withdrawn from the device user's 110 account balance/funds account on the partner system 8. This amount corresponds to the total amount of merchant offers purchased by the device user 110. In this regard, the device user 110 may select one or more merchant offers from the merchant offer advertisements on the ordered list 100. The merchant offers may be from the same merchant user 108 or different merchant users 108. Generally, the amount corresponds to the amounts held in Step S209B as well as the amounts removed in Steps S212 and S218.

In Step S502A, the advertisement system 4 requests the partner system 8 to transfer the withdrawn funds from the device user's 110 account on the partner system (8). In response to the request from the advertisement system 4, the partner system 8 transfers the funds removed from the device user's 110 account on the partner system 8 (e.g., the amount equal to the purchase price of the merchant offer set forth in the selected merchant offer advertisements 102) to the advertisement system 4 or the bank accounts thereof. The advertisement system 4 may request funds from the partner system 8 synchronously (e.g., contemporaneously with each merchant offer purchase) or asynchronously (e.g., at certain time intervals such as daily, weekly or monthly). Furthermore, the advertisement system 4 may request funds in bulk from a plurality of device user's 110.

In Step S501B, the advertisement system 4 determines the purchase price of each specific merchant offer purchased by the device user 110 and the corresponding merchant user merchant administrator 6. In Step S502B, the advertisement system 4 transfers funds corresponding to the total purchase price of the merchant offer to the corresponding merchant administrator 6 or the bank accounts thereof. The advertisement system 4 may transfer funds to the merchant administrator 6 synchronously (e.g., contemporaneously with each merchant offer purchase) or asynchronously (e.g., at certain time intervals such as daily, weekly or monthly). Furthermore, the advertisement system 4 may transfer funds in bulk to the merchant administrator 6 (e.g. purchases of the merchant offers from the particular merchant administrator 6 made by a plurality of device users 110).

In Step S501C, the advertisement system 4 determines the CPA, CPR and/or CPI from the merchant campaign corresponding to the purchased merchant offers. Thereafter, in Step S502C, the advertisement system 5 requests payment of the CPA, CPR and/or CPI from the merchant administrator 6 and collects the transferred CPA, CPR and/or CPI transferred from the merchant administrator 6 in response thereto. The advertisement system 4 also, depending on contractual arrangements between the advertisement system operator 104 and the partner users 106, transfers certain portions of the collected CPA, CPR and/or CPI funds to partner systems 8 or the bank accounts/funds accounts thereof.

In Step S503, the advertisement system updates the merchant offer inventory database 57, updates the ledger database 76 and updates the user database 74 and/or analytics database 84.

Figure 15:
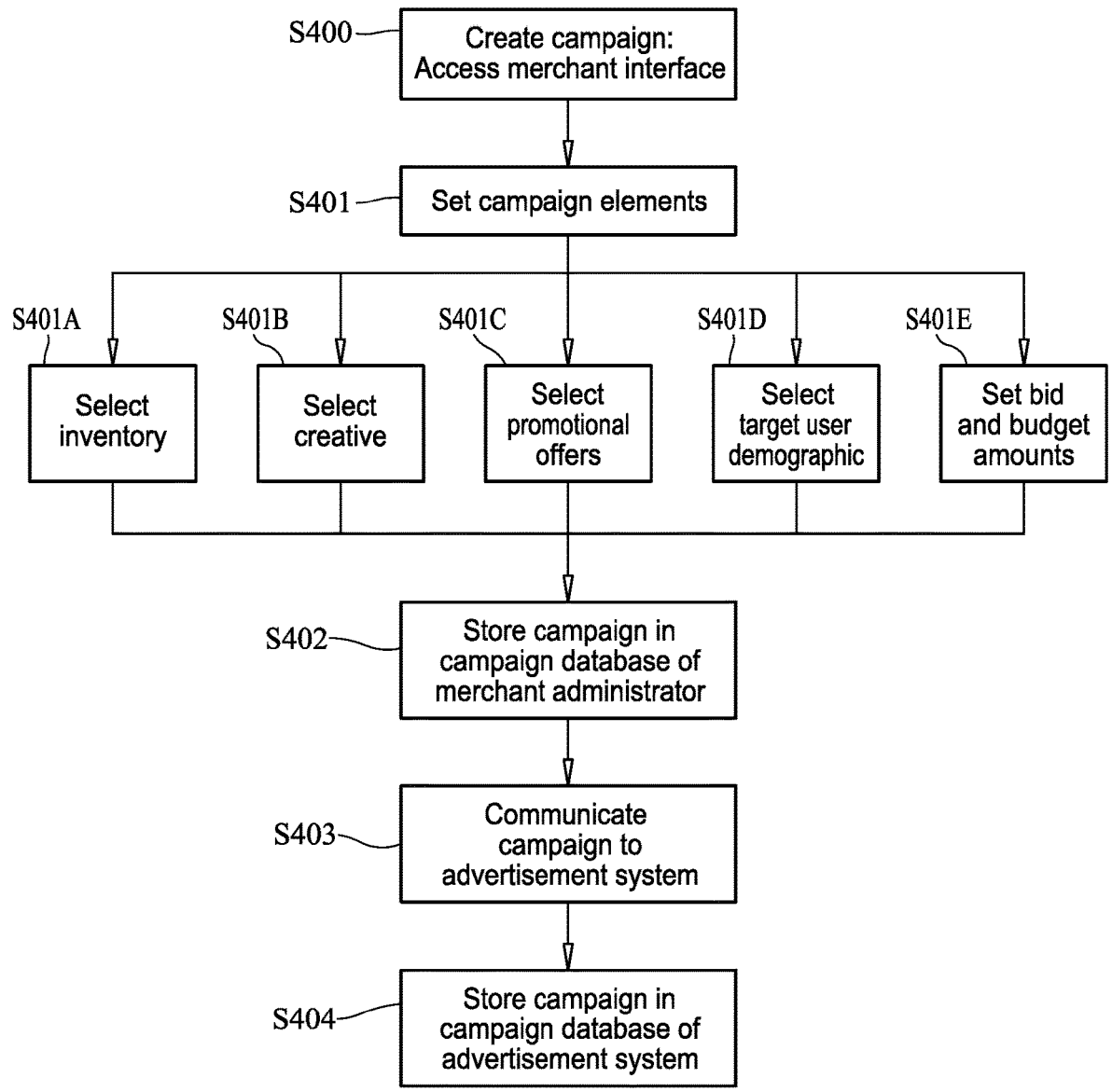
FIG. 15 is another operational flowchart of a preferred embodiment of the advertisement and checkout system formed in accordance with the present invention, showing the operational steps for creating merchant campaigns.

A preferred method for creating advertisement campaigns is illustrated in the flow-chart shown in FIG. 15 of the drawings. More specifically, in Step S400, the merchant user 108 accesses the merchant interface 58 to create an advertisement campaign. In Step S401, the merchant user 108 sets one or more campaign elements of the advertisement campaign (e.g., merchant campaign) by entering/selecting such campaign elements into the merchant interface 58 and, optionally, viewing analytics data from the analytics database 84. For example, in Step S401A, the merchant user 108 enters/selects the merchant offer inventory for the campaign. In Step S401B, the merchant user 108 uploads/selects the creative(s) for the advertisement campaign. In Step S401C, the merchant user 108 enters/selects the promotional merchant offer inventory for the advertisement campaign. In Step S401D, the merchant user selects the target user demographics for the advertisement campaign. In Step S401E, the merchant user enters/selects the CPA, CPR and/or CPI amounts and the budget amounts for the advertisement campaign. In Step S402, the campaign advertisement comprising the campaign elements are stored in the campaign database 62 of the merchant administrator 6. In Step S403, the campaign advertisement is communicated from the campaign database 62 of the merchant administrator 6 to the advertisement system 4. In Step S404, the advertisement campaign is stored in the campaign database 80 of the advertisement system 4.

Figure 13:
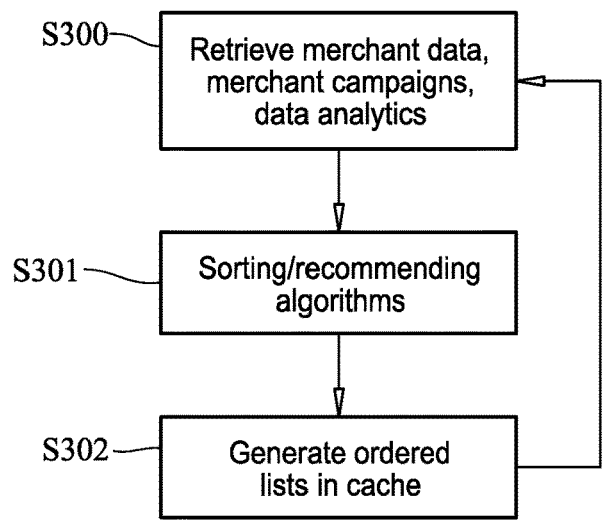
FIG. 13 is another operational flowchart of a preferred embodiment of the advertisement and checkout system formed in accordance with the present invention, showing the operational steps for generating lists of merchant offer advertisements.

A preferred method for generating lists 100 of merchant offer advertisements 102 is shown in flowchart illustrated in FIG. 13 of the drawings. As described previously, the advertisement system 4 may asynchronously and continuously generate lists 100 of merchant offer advertisements 102 for new users and previously acquired users and store such lists 100 in the offer list database 82. As shown in FIG. 13 of the drawings, in Step S300, the advertisement system 4 compares the currently available merchant advertisement campaigns stored in the campaign database 80 to the user demographics of each device user 110 stored in the user database 74 and to the demographic elements of each target user demographic group (in the failsafe group, there are limited or no demographic elements to compare). In Step S301, the advertisement system ranks the merchant advertisement campaigns for each specific device user 110 and target user demographic group based on factors such as relevancy, CPA, CPR, CPI and data analytics. The ranking of merchant advertisement campaigns for the target user demographic groups may take into consideration the purchasing habits of device users 110 having demographic information that is encompassed by the specific target user demographic group. In Step S302, the advertisement system 4 generates lists 100 of merchant offer advertisements 102 for each device user 110 and each target user demographic group. In Step S303, the advertisement system 4 stores the generated lists 100 of merchant offer advertisements 102 in the offer list database 82. Thereafter, the process returns to Step S300 and the generated lists 100 of merchant offer advertisements 102 stored in the offer list database 82 are continuously updated in view of updated data analytics stored in the data analytics database 84, updated information in the user database 74 and merchant data provided by the merchant administrator 6 and/or merchant user 108.

As described previously and as shown in FIG. 12 of the drawings, the advertisement system 4 retrieves an ordered list 100 of merchant offer advertisements from the offer list database 82 in Steps S203A (in the case of a new user) and 5203B (in the case of a previously acquired user), grooms and filters the list in Step S204 and displays the list 100 to the device user 110 in Step S205.

Although the personalized advertisement and checkout system 2 formed in accordance with the present invention and described above may be utilized with gift cards offered by merchant users 108, it is also envisioned to be within the scope of the present invention to utilize the same system 2 with different aspects of e-commerce items, advertisement revenue exchanges, etc. Generally, partner system users 106 include any industry or business where a user holds a balance that has a monetary value and such balance could be withdrawn for personal use. Examples of such include gaming reward sites, peer-to-peer payments, peer-to-peer e-commerce companies, employers and insurance companies.

More specifically, an employer may be a partner user 106 and utilize the personalized advertisement and checkout system 2 to pay employees and/or independent contractors. Employers often have computer/software applications (e.g., web-based software applications or portable electronic device based "apps") that are utilized by their employees and/or independent contractors, especially in the livery cab industry (e.g., Uber$^{SM}$, Lyft$^{SM}$ and Via$^{SM}$, etc.). The employer can use the partner system 8 of the personalized advertisement and checkout system 2 as a partner user 106. As described previously the partner application 26 of the employer's partner system 8 operates on the user device 10 of the employee (e.g., the device user 110). As an employee accumulates wages, the wages are reflected as the device user's balance in the user database 32 of the partner system 8. As also described previously, the device user 110 (e.g., the employee) may utilize his or her accumulated wages, which are reflected as the employee's balance on the partner system 8, to purchase one or more merchant offers from the displayed merchant offer advertisements 102.

An insurance company may also be a partner user 106 and utilize the personalized advertisement and checkout system 2 to pay claimants (e.g., persons or business with insurance claims). Insurance companies often have computer/software applications (e.g., web-based software applications or portable electronic device based "apps") that are utilized by their customers/claimants, for example, to submit insurance claims and documentation. The insurance company can use the partner system 8 of the personalized advertisement and checkout system 2 as a partner user 106. As described previously the partner application 26 of the insurance company's partner system 8 operates on the user device 10 of the claimant (e.g., the device user 110). When a claimant receives one or more claim payments from the insurance company, the claim payment value(s) are reflected as the device user's balance in the user database 32 of the partner system 8. As also described previously, the device user 110 (e.g., the claimant) may utilize his or her accumulated claim payments, which are reflected as the claimant's balance on the partner system 8, to purchase one or more merchant offers from the displayed merchant offer advertisements 102.

The advertisement system operator may also be a partner user 106. More specifically, the advertisement system operator may utilize a partner system 8 and host a partner application 26 that is operable on a user device 10. The device user 110 may be awarded monetary amounts, credits or reward points through his or her use of the advertisement system 4 (e.g., by purchasing merchant offers). The user's balance of awards (e.g., the dollar amount) is stored in the user database 32 of the partner system 8. As will be described in greater detail in the forthcoming paragraphs, the device user 110 can increase his or her balance by adding funds, for example, from his or her bank account, credit card, rewards account or with a digital currency (e.g., Bitcoin, Ethereum, etc.). As will also be described in greater detail in the forthcoming paragraphs, the device user 110 can utilize his or her balance on the partner system 8 to purchase one or more merchant offers, to add value to existing merchant offers possessed by the device user 110 and to pay for purchases at a point of sale ("POS") location 611, the POS location 611 having one or more computer systems/processors 613 and at least one point of sale funds account, each of which are preferably in network communication with one or more of the partner system 8, the advertisement system 4, the merchant administrator 6 and the user device 10.

As shown in FIGS. 21-25 of the drawings, the partner application 26 may further comprise a merchant offer wallet 600 that is electronically activatable and actuatable by the device user 110 through the use of the user interface 42 of the user device 10. Alternatively, the merchant offer wallet 600 may be embodied as an independent partner application 26, as a widget embedded in the partner application 26. In yet another form, the merchant offer wallet 600 may be embodied as an independent application that is stored in the memory 38 of the user device 10 and is executable by the processor 36 of the user device 10. When formed as an independent application, the merchant offer wallet 600 is operable by the device user 110 in substantially the same manner as described with respect to the partner application 26 (e.g., through the use of the user interface 42 and display 44, etc.). Furthermore, when formed as an independent application, the merchant offer wallet 600 may communicate with one more of the partner system 8, the merchant administrator 6, the advertisement system 4 and third-party entities (e.g., banks, third-party vendors, third-party processors and currency exchanges, etc.) via the network interface 40 of the user device 10.

Upon activation by a device user 110, the merchant offer wallet 600 displays the merchant offers (e.g., gift cards) 602 purchased by the device user 110 on the display 44 of the user device 10. The merchant offer wallet 600 may be operable by the user device 10 independently of the advertisement system 4 and partner system 8, or in combination with one or more of the advertisement system 4 and partner system 8, for example, as a widget within the partner application 26.

More specifically, as described previously, when a device user 110 purchases one or more merchant offers from the displayed list 100 of merchant offer advertisements 102, the purchased merchant offer(s) are retrieved from the database where they are stored (e.g., the inventory database 78 of the advertisement system 4, the campaign database 80 of the advertisement system 4 and/or the merchant offer inventory database 57 of the merchant administrator 6). The electronic attributes of the retrieved merchant offer (e.g., the redemption code, purchase amount, merchant offer value amount and/or any promotional amounts) are transferred to one or more of the memory 16 of the partner system 8, the memory 66 of the advertisement system 4 and the memory 38 of the user device 10. For example, the merchant offer purchased by the device user 110, in particular, the electronic attributes thereof, may be retrieved and stored in the user database 74 of the advertisement system 4 and/or in the user database 32 of the partner system 8. Preferably, copies of the electronic attributes of the merchant offer are also stored in the memory 38 of the user device 10 so that the merchant offers may be utilized for purchases when internet connectivity is not available.

Figure 21:
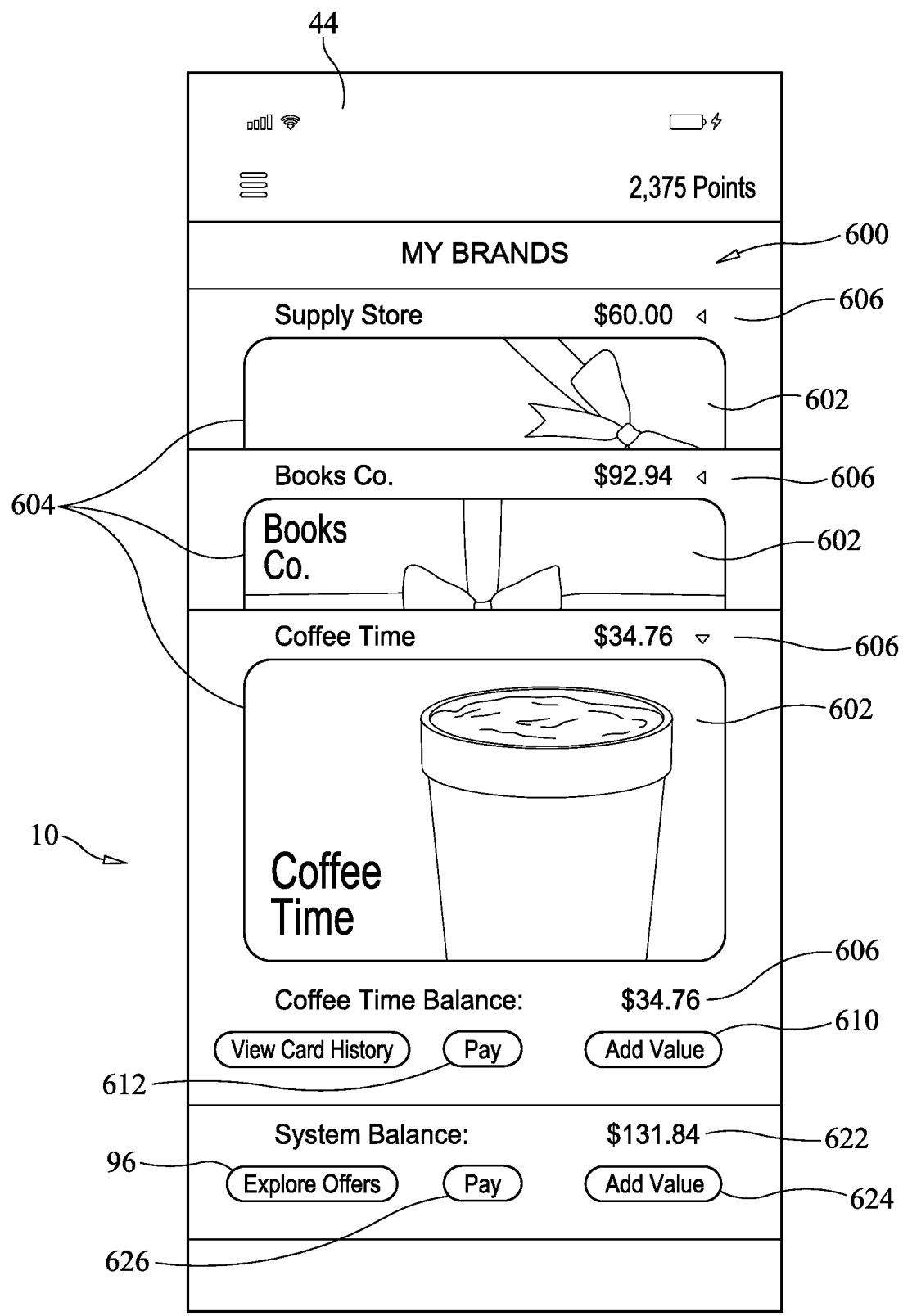
FIG. 21 is a screenshot of the merchant offer wallet forming part of the advertisement and checkout system of the present invention.

As can be seen in FIG. 21 of the drawings, when the merchant offer wallet 600 is activated by the device user 110, the merchant offer(s) 602 purchased by the device user 110 are retrieved from the memory location where they are stored (e.g., the user database 74 of the advertisement system 4, the user database 32 of the partner system 8 and/or in the memory 38 of the user device 10) and displayed to the user 110 on the display 44 of the user device 10 in a list of merchant offers 604. For example, if the purchased merchant offer(s) 602 are stored in the user database 74 of the advertisement system 4, the processor 64 of the advertisement system 4 retrieves the purchased merchant offer(s) 602 therefrom and communicates them to the partner system 8 or directly to the user device 10. Similarly, if the purchased merchant offer(s) 602 are stored in the user database 32 of the partner system 8, the processor 14 of the partner system 8 retrieves the purchased merchant offer(s) 602 therefrom and communicates them to the user device 10 through the operation of the partner application 26. Furthermore, if the purchased merchant offer(s) 602 are stored in the memory 38 of the user device 10, the processor 36 of the user device 10 retrieves the purchased merchant offer(s) 602 therefrom. One or more of the electronic attributes of each of the purchased merchant offers 602 may also be displayed on the display 44 of the user device 10. For example, as shown in FIG. 21 of the drawings, the remaining balance of each purchased merchant offer 602 is preferably displayed in a remaining balance field 606 on the display 44 of the user device 10.

The device user 110 can actuate the user interface 42 of the user device 10 to select a particular merchant offer 602 for use at a POS location. More specifically, as can also be seen in FIG. 21 of the drawings, the device user 110 may select a merchant offer 602 displayed on the display 44 by actuating the merchant offer 602 itself through the use of the user interface 42 or by actuating a pay button 612 displayed on the display in proximity to the merchant offer 602. When the device user 110 actuates the merchant offer 602 or pay button 612, the user interface 42 generates a signal that causes one of the processor 36 of the user device 10 and the processor 14 of the partner system 8 to generate an optical code 608, such as a barcode or a quick response code ("QR code"), containing information for processing the transaction, such as at least some of the electronic attributes of the selected merchant offer 602. Alternatively, the processor 64 of the advertisement system 4 may generate the optical code 608 if, for example, the merchant offer wallet 600 is embodied as a widget within the partner application 26. The optical code 608 is displayed on the display 44 of the user device 10. The displayed optical code 608 on the user device 10 is read by an optical reader 609 at the POS location 611, such as a bar code scanner or a smartphone, to process the purchase.

The purchases made with each merchant offer(s) 602 are monitored by the respective processor of one or more of the advertisement system 4, the partner system 8 and the merchant administrator 6 to update the balance remaining on each merchant offer 602 in the database where they are stored. Additionally, particularly in the case that the merchant offer is a prepaid credit card (e.g., an "open loop card"), a third party, such as a bank or a fund manager may also monitor the purchases made with the merchant offer(s) 602 to determine the balance remaining thereon. Furthermore, the advertisement system 4 and/or the partner system 8 may verify the balance remaining on each merchant offer 602 in the merchant offer wallet 600 by communicating a query to the respective merchant system and/or the third party bank or fund manager, and updating the remaining balance on the merchant offer 602 in view of the respective merchant system's 4 and/or third party bank's response thereto.

Figure 22:
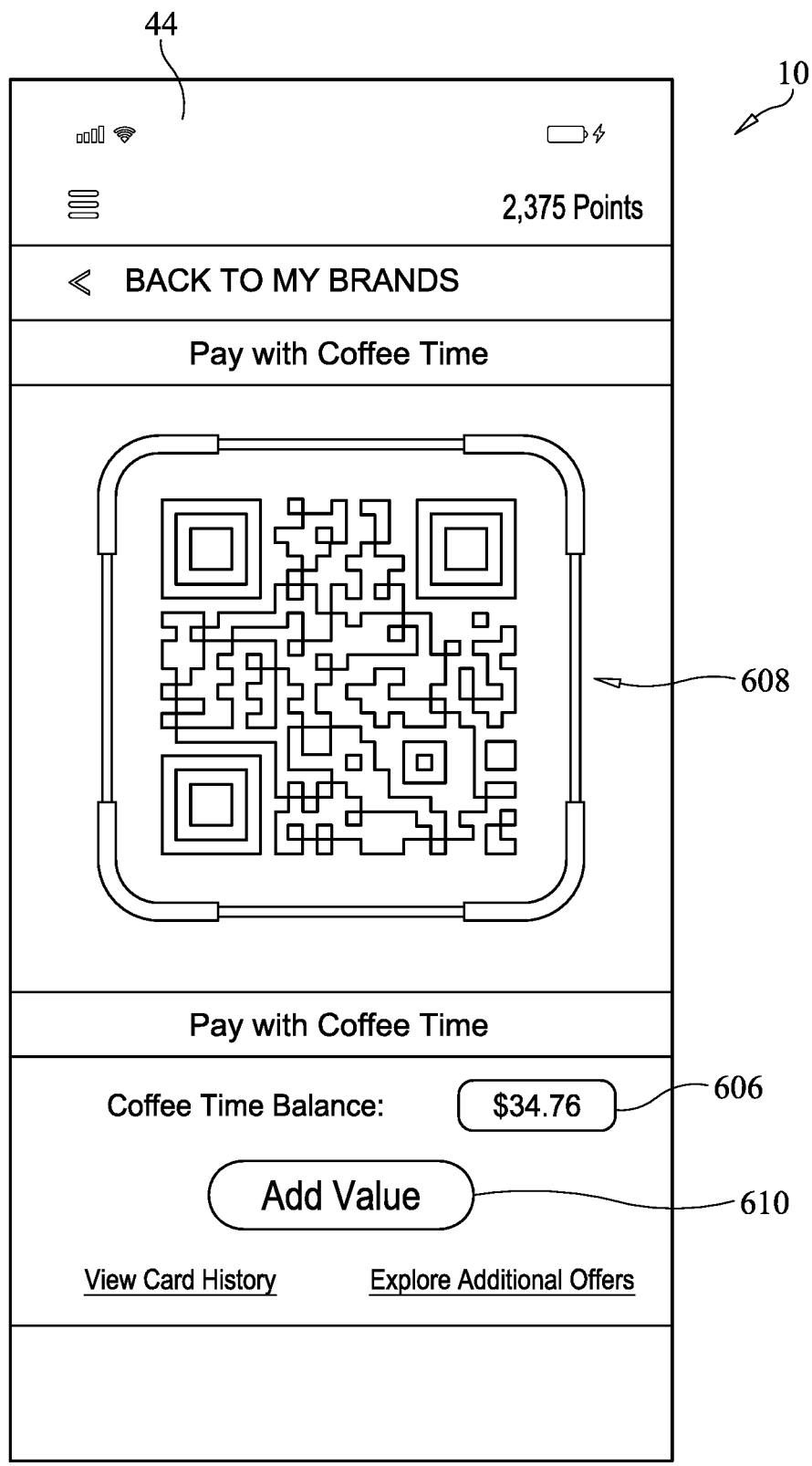
FIG. 22 is another screenshot of the merchant offer wallet forming part of the advertisement and checkout system of the present invention, showing the displayed optical code.

The merchant offer wallet 600 further comprises one or more add value buttons 610 that are displayed on the display 44 of the user device 10. The one or more add value buttons 610 are selectively actuatable by the device user 110 to add value to a merchant offer 602. More specifically, as can be seen in FIGS. 21 and 22 of the drawings, when the add value button 610 is actuated by the device user 110 through the use of the user interface 42, the user interface 42 generates a signal that causes the processor 36 of the user device 10, the processor 14 of the partner system 8 or the processor 64 of the advertisement system 4 to initiate an add value process.

Figure 24:
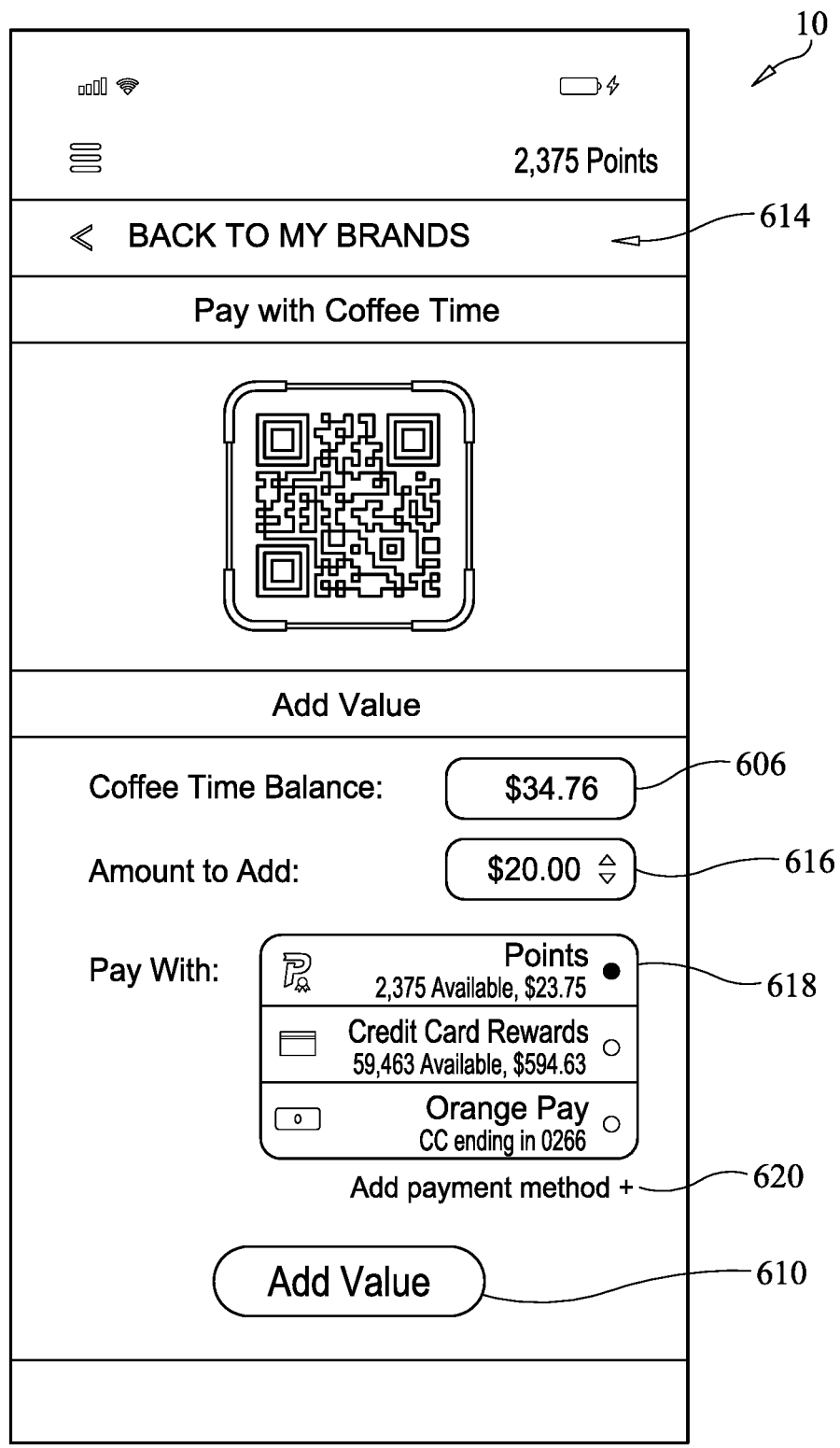
FIG. 24 is another screenshot of the merchant offer wallet forming part of the advertisement and checkout system of the present invention, showing the add value prompt displayed.

As can be seen in FIG. 24 of the drawings, when the add value process is initiated, an add value prompt 614 is displayed on the display 44 of the user device 10. The add value prompt 614 preferably includes a remaining balance field 606, an amount to add input field 616, a payment source input field 618 and a add value button 610. The balance remaining on the selected merchant offer 602 is displayed in the remaining balance field 606. The amount to add input field 616 is selectively actuatable by the device user 110 through the use of the user interface 42, for example, by scrolling or by entering a numeric value, to specify a particular amount of funds to be added to the selected merchant offer 602. The payment source input field 618 is selectively actuatable by the device user 110 through the use of the user interface 42 to specify the source of the funds to be added (e.g., bank account, credit card, rewards/loyalty account, digital currency account, partner system balance, etc.). As can be seen in FIG. 24 of the drawings, the payment source input field 618 may display one or more payment sources previously entered by the device user 110 such that the device user 110 can quickly select the previously entered payment source to add value to the merchant offer 602. The payment source input field 618 further includes an add new payment source field 620 that receives an input from the device user 110 through the use of the user interface 42 to enter the new payment source information (e.g., accounting number, routing number, credit card number and/or rewards account number).

After the device user 110 selects the amount of funds to be added and the source of such funds, the device user 110 again actuates the add value button 610 to initiate the transfer of funds. More specifically, in response to the device user's actuation of the add value button 610, the user interface 412 generates a signal that causes the processor 36 of the user device 10, the processor 14 of the partner system 8 or the processor 64 of the advertisement system 4 to initiate a funds transfer process. Generally, the funds transfer process is performed by a payment processor such as a third-party credit card processing company (e.g., Stripe), a bank or a digital currency exchange (e.g., Coinbase). As will be described in greater detail in the forthcoming paragraphs, the third-party processor transfers the funds to the bank account of the partner system 8. Once the funds have been transferred, the partner system 8 utilizes the funds to increase the remaining balance on the selected merchant offer 602.

During the funds transfer process, the partner system 8 "calls" (e.g., communicates) an automated clearing house ("ACH") or credit card processor (e.g., Stripe). The ACH or credit card processor's system then calls the device user's bank or credit card merchant's system and confirms the funds. Once the funds are confirmed, the ACH system or credit card system "sends" (e.g., electronically transfers) the funds to the bank account of the partner system 8 and communicates a transfer completion signal to the partner system 8 that such funds have been sent. Upon receiving the transfer completion signal, the partner system 8 registers the deposit. The funds are stored in the bank account of the partner system 8 and allocated to the device user's account therein. The process is generally the same for adding value from a rewards account/system (e.g., rewards account, rewards wallet, loyalty program, etc.) or a crypto account system (e.g., crypto account or crypto wallet, etc.); however, the partner system 8 can communicate directly with the rewards/loyalty account system or crypto wallet without a third-party processor.

After the funds have been received and the deposit has been registered, the partner system 8 may add the funds to the selected merchant offer 602 by utilizing a variety of processes. More specifically, in a simple form, the partner system 8 adds the funds to the selected merchant offer 602 by purchasing another merchant offer from the particular merchant user or a third party vendor for the amount specified by the device user 110 in the amount to add input field 616 of the add value prompt 614. Several merchant offers may be purchased, the combined value thereof being greater or equal to the amount specified by the device user 110 in the amount to add input field 616. The remaining balance on the selected merchant offer 602 is then increased by the balance of the newly purchased merchant offer(s).

In another form, the partner system 8 may transfer at least a portion of the funds added by the device user 110 to the bank account of the advertisement system 4 and the advertisement system 4 purchases a new merchant offer from the particular merchant user that issued the selected merchant offer 602; however, the advertisement system 4 may also purchase an existing merchant offer from the merchant offer inventory to increase the balance of the selected merchant offer 602.

In yet another form, the advertisement system 4 or the partner system 8 may pre-purchase a plurality of merchant offers in various amounts/denominations from various merchant users 108 and store such merchant offers in one of the databases in the memory 16 of the partner system 8 or the memory 66 of the advertisement system 4. When a device user 110 elects to add value to the selected merchant offer 602, the advertisement system 4 or the partner system 8 retrieves the appropriate pre-purchased merchant offer(s), the sum of which is substantially equivalent to the funds added by the device user 110, from the memory 66 of the advertisement system 4 (e.g., from the inventory database 78) or from a similar database in the partner system 8 to quickly increase the balance of the selected merchant offer 602 (e.g., without purchasing a new merchant offer from the merchant user 108 or a third party vendor in response to the device user's request to add value).

In another form, the partner system 8 may utilize an API to communicate directly with the merchant administrator 6 that issued the selected merchant offer 602 and pass at least a portion of the funds added by the device user 110 to the bank account of the merchant user 108. The partner system 8 may also pass a portion of the device user's unallocated system balance on the partner system 8 to the merchant administrator 6. After the funds have been received, the merchant administrator 6 increases the remaining balance of the selected merchant offer 602. Additionally, if the device user 110 has linked his or her particular merchant account with the partner system 8, the partner system 8 may pass at least a portion of the funds added to the merchant or at least a portion of the device user's unallocated system balance on the partner system 8 to add to the particular user's merchant account.

Generally, the device user's balance on the partner system 8, which is preferably stored in the user database 32 thereof, includes allocated funds and unallocated funds. Allocated funds are funds that are allocated to specific merchant offers 602 possessed by the device user 110. Unallocated funds are the funds of the device user 110 that are not yet allocated to any specific merchant offer 602. As will be described in greater detail in the forthcoming paragraphs, the device user 110 may also use unallocated funds to make a purchase at a POS location 611, for example, if the device user 110 does not currently have a merchant offer from the merchant at the particular POS location 611.

Figure 23:
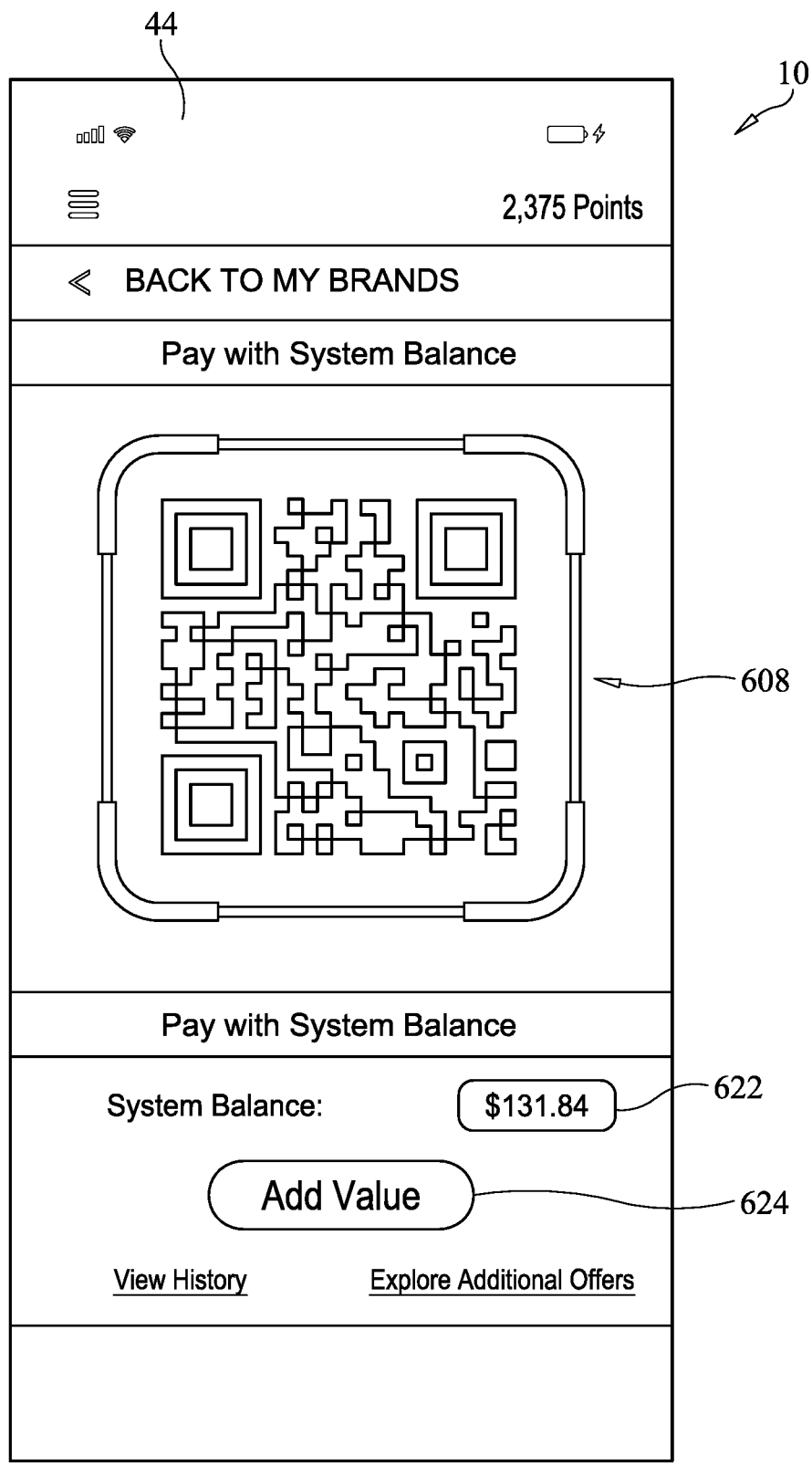
FIG. 23 is another screenshot of the merchant offer wallet forming part of the advertisement and checkout system of the present invention, showing the displayed optical code.

More specifically, as can be seen in FIG. 21 of the drawings, the merchant offer wallet 600 further includes a remaining system balance field 622, a pay with system balance button 626 and a add system value button 624, each of which is displayed on the display 44 of the user device 10. The device user's unallocated system balance is displayed in the remaining system balance field 622 on the display 44 of the user device 10. The pay with system balance button 626 is selectively actuatable by the device user 110 through the use of the user interface 42. To make at purchase at a POS location 611 utilizing the device user's remaining system balance, the device user 110 actuates the pay with system balance button 626. In response to the actuation of the pay with system balance button 626, the user interface 42 generates a signal that causes one of the processor 36 of the user device 10 and the processor 14 of the partner system 8 to generate an optical code 608 containing data for processing the transaction, such as identifying information specific to the partner system 8 and device user 110. Alternatively, the processor 64 of the advertisement system 4 may generate the optical code 608 if, for example, the merchant offer wallet 600 is embodied as a widget within the partner application 26. As can be seen in FIG. 23 of the drawings, the optical code 608 is displayed on the display 44 of the user device 10 and is readable by an optical reader 609 at the POS location 611.

When the optical code 608 is read by the optical reader 609 at the POS location 611, the POS location computer system/processor 613 communicates transaction information (e.g., purchase amount, merchant brand, merchant account information, etc.) to the partner system 8. When the partner system 8 receives the transaction information from the POS location computer system/processor 613, the partner system 8 sends the funds required to complete the transaction at the POS location 611 from the bank account of the partner system 8 to the bank account of the POS merchant. The transaction is complete when the POS merchant receives confirmation that the required funds have been deposited/passed to its bank account. Thereafter, the partner system 8 updates the remaining system balance of the device user 110.

Alternatively, upon receiving the transaction information from the POS location computer system/processor 613, the partner system 8 may purchase a merchant offer from the particular merchant user, a third-party vendor or the advertisement system 4 and return the electronic attributes of the purchased merchant offer to the POS location computer systems/processor 613 to complete the transaction. More specifically, when the partner system 8 receives the transaction information from the POS location computer system/processor 613, the partner system 8 may purchase one or more merchant offers from the particular merchant that corresponds to the POS location merchant, a third-party vendor or the advertisement system 4 with the unallocated funds of the device user 110 on the partner system 8 in a denomination approximate to the amount necessary to complete the transaction at the POS location 611. The partner system 8 returns the electronic attributes of the newly purchased merchant offer to the POS location computer systems/processor 613. Any balance remaining on merchant offers utilized to complete the transaction are added as a merchant offers 602 in the merchant offer wallet 600.

Figure 25:
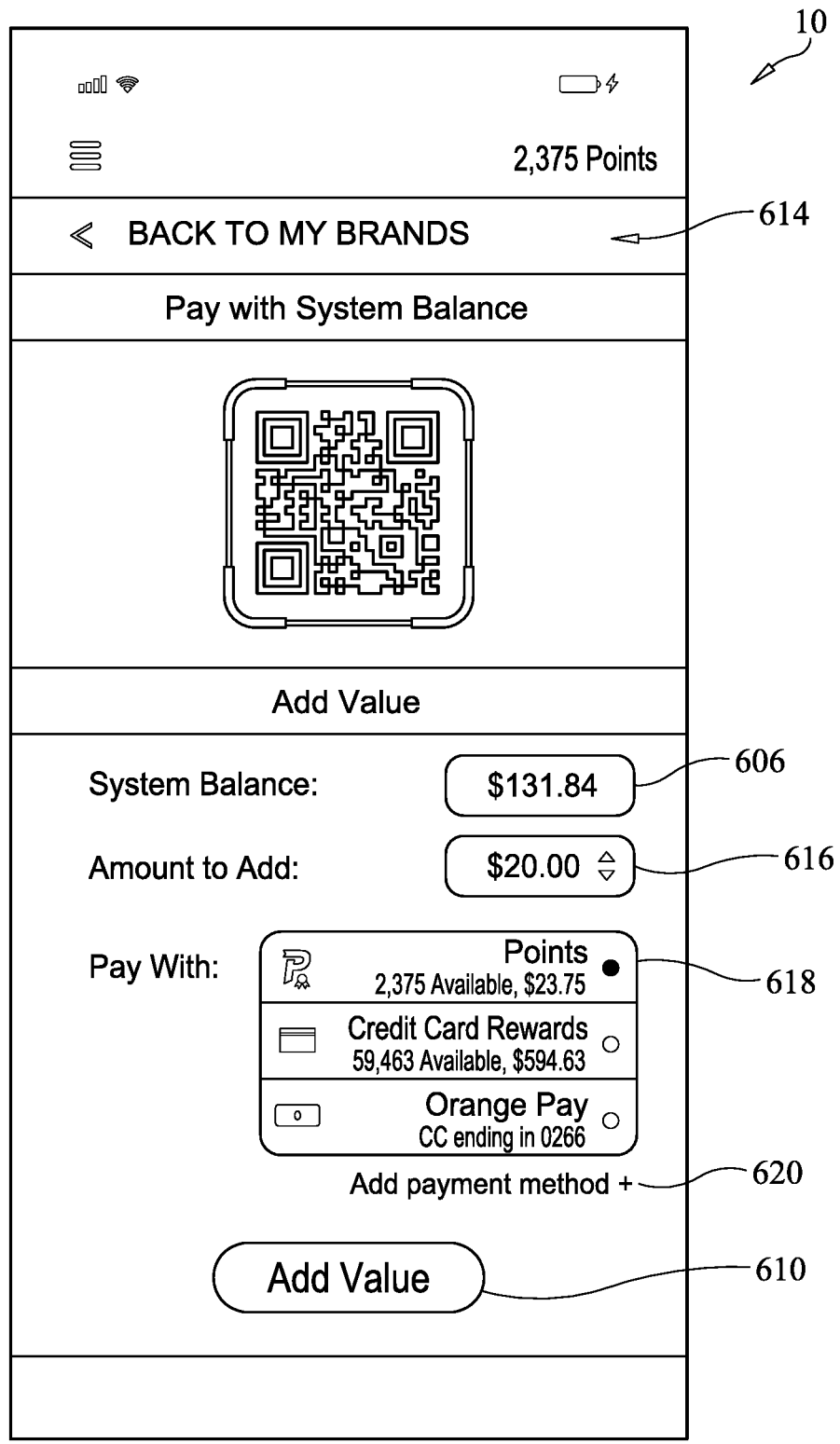
FIG. 25 is another screenshot of the merchant offer wallet forming part of the advertisement and checkout system of the present invention, showing the add value prompt displayed.

A device user 110 can increase his or her unallocated funds balance in substantially the same manner as that specified with respect to adding funds to selected merchant offers 602. More specifically, the device user 110 can actuate the add system value button 624 to increase the device user's unallocated remaining balance on the partner system 8. When the add system value button 624 is actuated by the device user 110 through the use of the user interface 42, the user interface 42 generates a signal that causes the processor 36 of the user device 10 or the processor 14 of the partner system 8 to initiate an add value process. As can be seen in FIG. 25 of the drawings, when the add value process is initiated, an add value prompt 614 is displayed on the display 44 of the user device 10. The functionality and components of the add value prompt 614, as well as the funds transfer process, are substantially the same as previously described. The funds transferred by the device user (e.g., by ACH, credit card, etc.) are deposited in the bank account of the partner system 8. Upon receiving the transfer completion signal that the funds have been deposited in the bank account of the partner system 8, the partner system 8 registers the deposit and updates the device user's remaining unallocated fund balance on the partner system 8.

Since foreign currency and digital currency cannot readily be utilized to make a purchase at a POS location 611, the device user 110 can utilize the merchant offer wallet 600 to transfer such currency into his or her unallocated funds balance on the partner system 8. If a digital or foreign currency is the source of the funds to be added, the third party processor converts the current value of the currency to a predefined standard (e.g., USD) specified by the partner system 8 and transfers the funds to the bank account of the partner system 8. Upon receipt of the deposit of such funds, the partner system 8 updates the device user' remaining unallocated fund balance on the partner system 8.

The merchant wallet 600 may also include a checkout widget 96 button (shown in FIG. 21 by the button titled "Explore Offers" and shown in FIGS. 22 and 23 by the button titled "Explore Additional Offers") that is actuatable by the device user 110 to generate a list of merchant offer advertisements, as described previously, As also described previously, the device user 110 may use his or her fund balance, in particular, his or her unallocated fund balance, to purchase one or more merchant offers by selecting one or more merchant offer advertisements 102 that correspond thereto.

Figure 26:
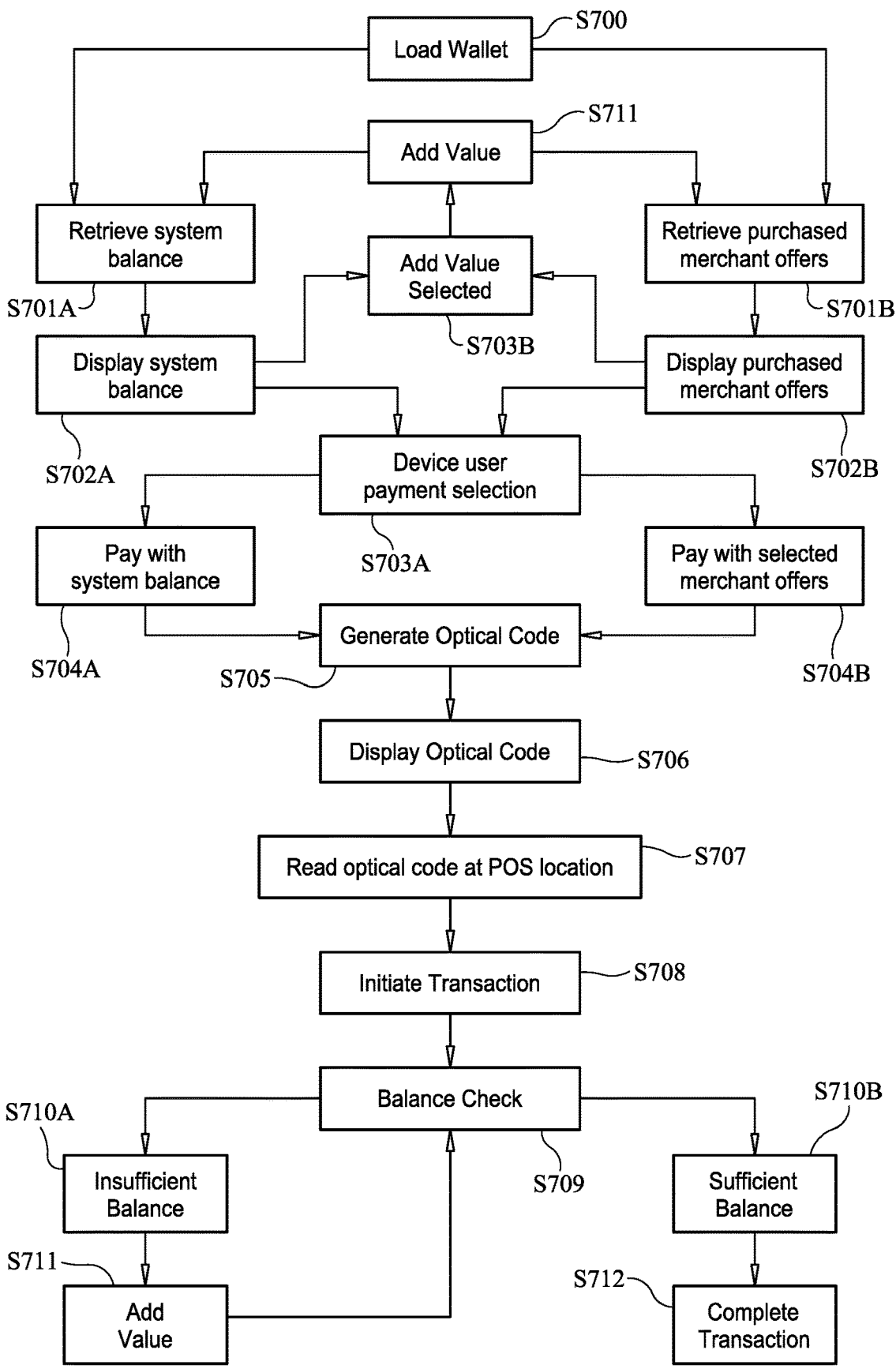
FIG. 26 is an operational flowchart of a preferred embodiment of the merchant offer wallet of the advertisement and checkout system formed in accordance with the present invention.

A method for processing a point of sale transaction using the merchant offer wallet is also provided herewith and illustrated in the operational flowcharts shown in FIGS. 26-34 of the drawings. As shown in FIG. 26 of the drawings, in Step S700, a device user 110 activates the merchant offer wallet 600 by actuating an icon or similar activating link displayed on the display 44 of the user device 10. In Step S701B, the merchant offer(s) 602 purchased by the device user 110 are retrieved from the memory location where they are stored (e.g., the user database 74 of the advertisement system 4, the user database 32 of the partner system 8 and/or in the memory 38 of the user device 10). In Step S702B, the retrieved merchant offer(s) 602 purchased by the device user 110 are displayed on the display 44 of the user device 10 in a list of merchant offers 604.

In Step S701A, the device user's remaining system balance (e.g., unallocated system balance) on the partner system 8 is retrieved from the user database 32 of the partner system 8. In Step S702A, the device user's unallocated balance is displayed in a remaining system balance field 622 on the display 44 of the user device 10.

If the device user 110 actuates the add value button 624 to add funds to the device user's remaining system balance or the add value button 610 to add funds to a particular merchant offer 602 through the use of the user interface 42 (Step S703B), the user interface 42 generates a signal that causes the processor 36 of the user device 10, the processor 14 of the partner system 8 or the processor 64 of the advertisement system 4 to initiate an add value process in Step S711.

In Step S703A, the device user 110 selects a payment method. More specifically, the device user 110 may select a merchant offer 602 displayed on the display 44 by actuating the merchant offer 602 itself through the use of the user interface 42 or by actuating a pay button 612 displayed on the display in proximity to the merchant offer 602. To make a purchase at a POS location 611 utilizing the device user's remaining system balance, the device user 110 actuates the pay with system balance button 626.

In Step S705, in response to either the device user's actuation of the pay button 612, the device user's selection of a merchant offer 602 or the device user's actuation of the pay with system balance button 626, the user interface 42 generates a signal that causes one of the processor 36 of the user device 10 and the processor 14 of the partner system 8 to generate an optical code 608 containing information for processing the transaction, such as identifying information specific to the partner system 8 and device user 110. Alternatively, as described previously, the processor 64 of the advertisement system 4 may generate the optical code 608. In Step S706, the generated optical code 608 is displayed on the display 44 of the user device 10. In Step S707, the optical code 608 is read by the optical reader 609 at the POS location 611. In Step S708, the POS location computer system/processor 613 initiates a transaction and communicates transaction information (e.g., purchase amount, merchant brand, merchant account information, etc.) to the partner system 8.

In Step S709, a balance check process is initiated during which one or more of the processor 36 of the user device 10, the processor 14 of the partner system 8, the processor 64 of the advertisement system 4 and the POS location computer systems/processor 613 compares the transaction purchase amount to the remaining balance on the selected merchant offer 602 or to the device user's remaining system balance, depending on the mode of payment selected. If the respective processor determines that the balance is insufficient in Step S710A, an add value process is initiated in Step S711. For example, if after scanning the optical code 608 the POS location computer system/processor 613 determines that the selected merchant offer 602 does not have sufficient remaining balance to complete the transaction, it communicates a signal to one or more of the processor 36 of the user device 10, the processor 14 of the partner system 8 and the processor 64 of the advertisement system 4 that indicates that the remaining balance is insufficient. If the respective processor determines that the balance is sufficient to complete the transaction in Step S710B, the transaction is completed in Step S712 and, depending on the mode of payment selected, the partner system 8 "sends" (e.g., electronically transfers) the funds required to complete the transaction at the POS location from the bank account of the partner system 8 to the bank account of the POS merchant or the transaction is paid for utilizing the remaining balance on the selected merchant offer 602 and the balance remaining on the selected merchant offer 602 is updated.

Figure 27:
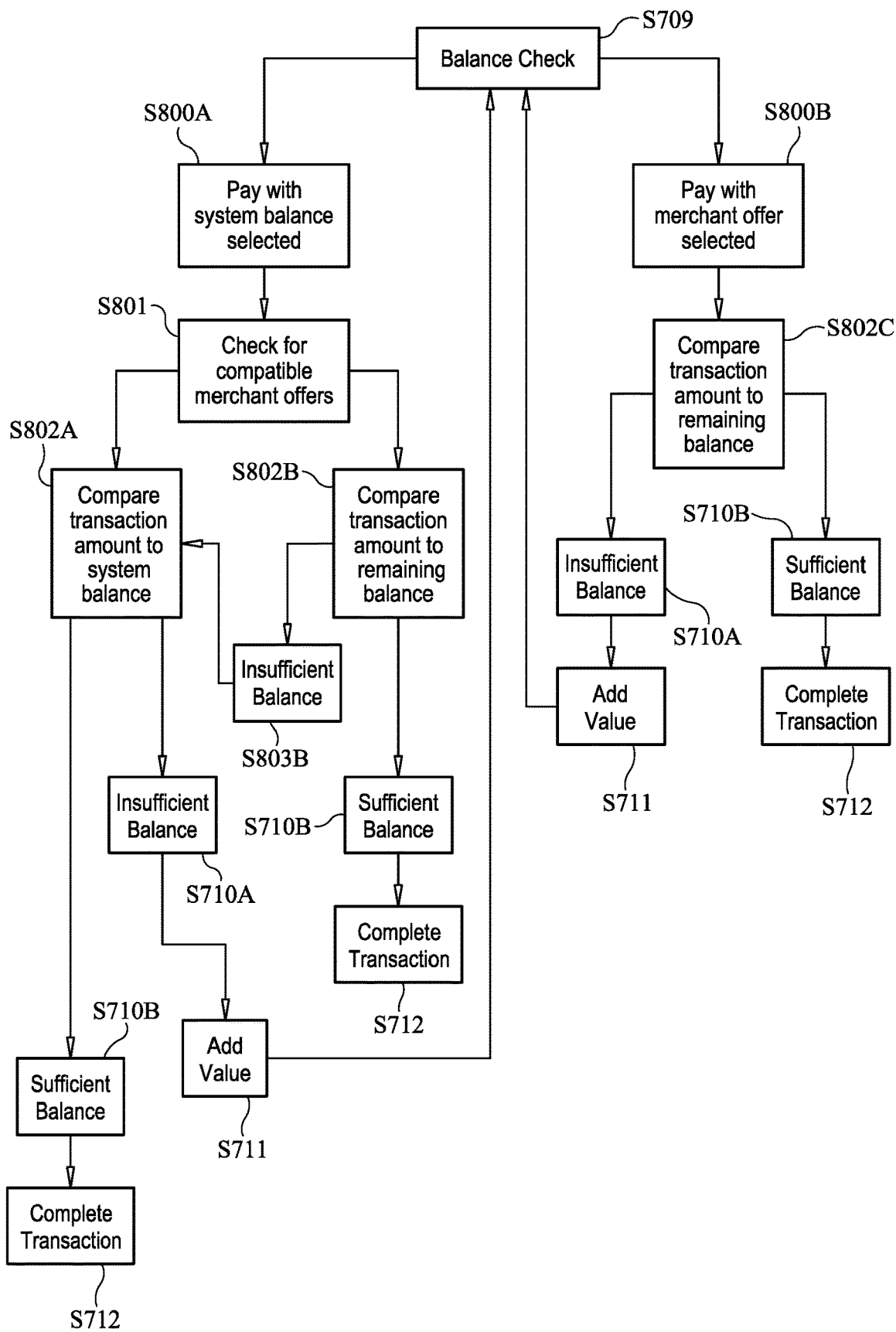
FIG. 27 is another operational flowchart of a preferred embodiment of the merchant offer wallet of the checkout system formed in accordance with the present invention.

As can be seen in the operational flowchart shown in FIG. 27 of the drawings, after the balance check has been initiated in Step S709, if one or more of the processor 36 of the user device 10, the processor 14 of the partner system 8 and the processor 64 of the advertisement system 4 determines that the device user 110 selected to pay for the transaction utilizing his or her system balance in Step S800A, for example, by actuating the pay with system balance button 626, in Step S801, one or more of the processor 36 of the user device 10, the processor 14 of the partner system 8 and the processor 64 of the advertisement system 4 checks the merchant offer(s) 602 purchased by the device user 110 in the memory location where they are stored (e.g., the user database 74 of the advertisement system 4, the user database 32 of the partner system 8 and/or in the memory 38 of the user device 10) to determine if one or more of such merchant offers 602 are usable/compatible with the POS location computer system/processor 613.

If the respective processor finds a compatible merchant offer 602 in Step S801, in Step S802B one or more of the processor 36 of the user device 10, the processor 14 of the partner system 8, the processor 64 of the advertisement system 4 and the POS location computer systems/processor 613 compares the transaction purchase amount to the remaining balance on the selected merchant offer 602. If the respective processor determines that the remaining balance on the selected merchant offer 602 is sufficient to complete the transaction (e.g., the remaining balance is greater than or equal to the purchase price) in Step S710B, the transaction is completed in Step S712. If the respective processor determines that the remaining balance on the selected merchant offer 602 is insufficient to complete the transaction in Step S803B, one or more of the processor 36 of the user device 10, the processor 14 of the partner system 8 and the processor 64 of the advertisement system 4 compares the transaction purchase amount to the device user's remaining system balance in Step S802A to determine if the device user 110 has sufficient unallocated funds to complete the transaction. Again, if the respective processor determines that the device user's remaining system balance is sufficient to complete the transaction (e.g., the remaining system balance is greater than or equal to the purchase price) in Step S710B, the transaction is completed in Step S712. If the respective processor determines that the device user's remaining system balance is insufficient to complete the transaction in Step S710A, an add value process is initiated in Step S711.

If after the balance check has been initiated in Step S709 one or more of the processor 36 of the user device 10, the processor 14 of the partner system 8 and the processor 64 of the advertisement system 4 determines that the device user 110 selected a merchant offer 602 to pay for the transaction in Step S800B, for example, by actuating the merchant offer 602 itself through the use of the user interface 42 or by actuating a pay button 612 displayed on the display 44 in proximity to the merchant offer 602, in Step S802C one or more of the processor 36 of the user device 10, the processor 14 of the partner system 8, the processor 64 of the advertisement system 4 and the POS location computer systems/processor 613 compares the transaction purchase amount to the remaining balance on the selected merchant offer 602. If the respective processor determines that the remaining balance on the selected merchant offer 602 is sufficient to complete the transaction (e.g., the remaining balance is greater than or equal to the purchase price) in Step S710B, the transaction is completed in Step S712. If the respective processor determines that the remaining balance on the selected merchant offer 602 is insufficient to complete the transaction in Step S710A, an add value process is initiated in Step S711.

Figure 28:
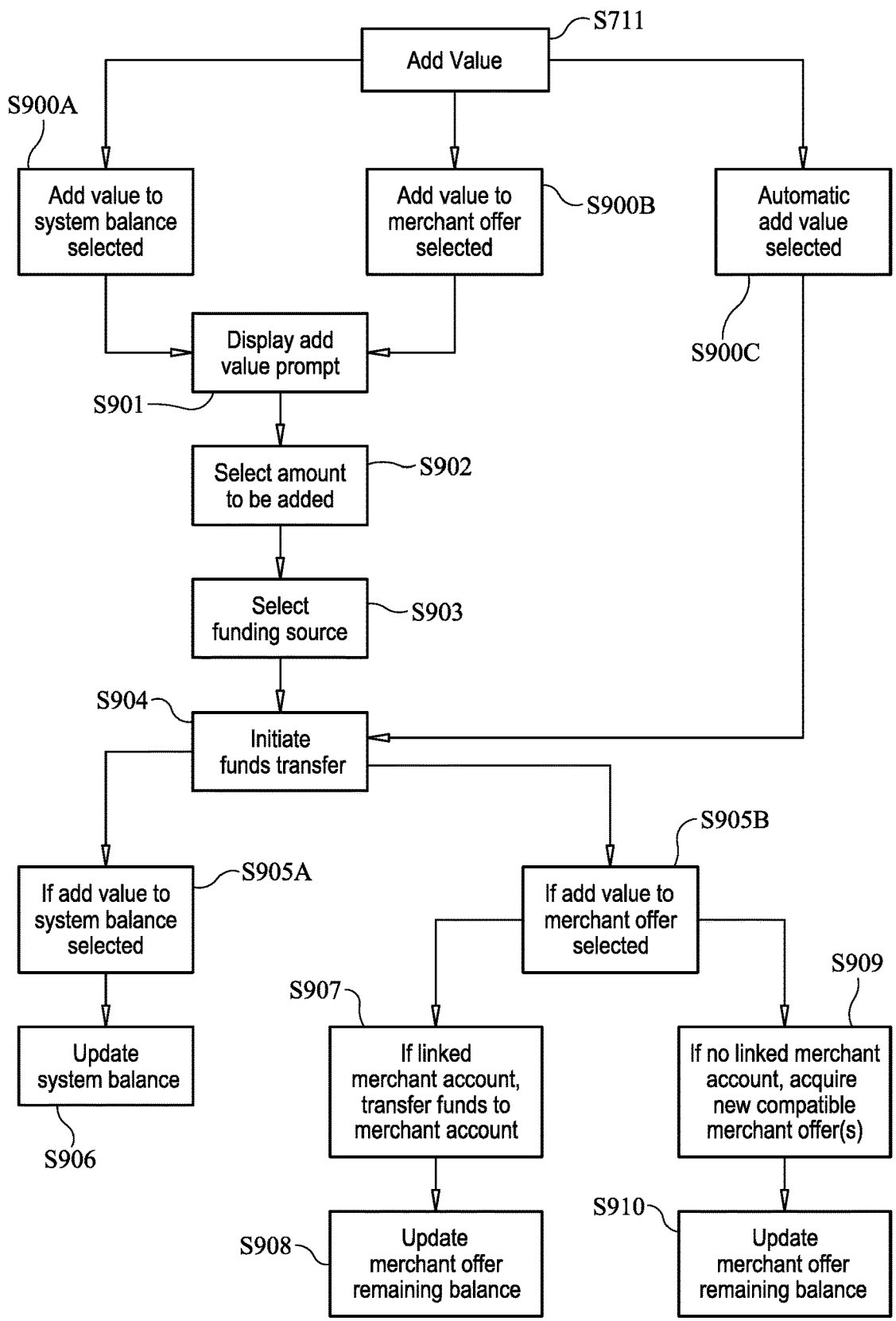
FIG. 28 is another operational flowchart of a preferred embodiment of the merchant offer wallet of the checkout system formed in accordance with the present invention.

As can be seen in the operational flowchart shown in FIG. 28 of the drawings, after the add value process has been initiated in Step S711, one or more of the processor 36 of the user device 10, the processor 14 of the partner system 8 and the processor 64 of the advertisement system 4 determines if the device user 110 selected to add value to the device user's system balance in Step S900A (e.g., by actuating the add system value button 624) or selected to add value to a particular merchant offer 602 in Step S900B (e.g., by actuating one of the add value buttons 610). Thereafter, in Step S901, one or more of the processor 36 of the user device 10, the processor 14 of the partner system 8 and the processor 64 of the advertisement system 4 causes the add value prompt 614 to be displayed on the display 44 of the user device 10. In Step S902, the device user 110 enters a specific amount of funds to add in the amount to add input field 616, for example, by scrolling through present amounts or by entering a numeric value on the user interface 42. In Step S903, the device user 110 specifies the source of the funds to be added by actuating the payment source input field 618. In Step S904, a funds transfer processes is initiated. More specifically, in response to the device user's actuation of the add value button 610, the user interface 42 generates a signal that causes the processor 36 of the user device 10, the processor 14 of the partner system 8 or the processor 64 of the advertisement system 4 to initiate a funds transfer process. Generally, the funds transfer process is performed by a payment processor such as a third-party credit card processing company (e.g., Stripe), a bank or a digital currency exchange (e.g., Coinbase) that transfers the funds to the bank account of the partner system 8.

Once the funds have been transferred, if it is determined that the device user 110 selected to add value to the system balance in Step S900A/S905A, in Step S906, the partner system 8 updates the device user's system balance. If it is determined that the device user 110 selected to add value to a merchant offer 602 in Step S900B/S905B, if no linked merchant account is found in Step S907, one or more of the partner system 8 and the advertisement system 4 acquires one or more new compatible merchant offers in Step S909 and updates the selected merchant offer remaining balance in Step S910. If in Step S907 it is determined that there is a linked merchant account, at least a portion of the funds are transferred to the merchant account and the selected merchant offer remaining balance is updated in Step S908.

If the device user 110 has configured the merchant offer wallet 600 to automatically add value, as determined in Step S900C, the processes bypasses Steps S901-S903 and proceeds to Step S904. For example, as illustrated in the operational flowcharts shown in FIGS. 31 and 33 of the drawings, the device user 110 may configure the merchant offer wallet 600 so that if it is determined that there are insufficient funds to complete a transaction in Step S710A, the processor 36 of the user device 10, the processor 14 of the partner system 8 or the processor 64 of the advertisement system 4 initiates the funds transfer process and automatically transfers funds (e.g., "tops off" the remaining balance) in Step S904 based on the device's user's previous entered payment amounts and payment sources on the add value prompt 614, or entered during the configuration of the merchant offer wallet 600.

If the respective processor finds a compatible merchant offer 602 in Step S801, in Step S802B one or more of the processor 36 of the user device 10, the processor 14 of the partner system 8, the processor 64 of the advertisement system 4 and the POS location computer systems/processor 613 compares the transaction purchase amount to the remaining balance on the selected merchant offer 602. If the respective processor determines that the remaining balance on the selected merchant offer 602 is sufficient to complete the transaction (e.g., the remaining balance is greater than or equal to the purchase price) in Step S710B, the transaction is completed in Step S712.

Figure 29:
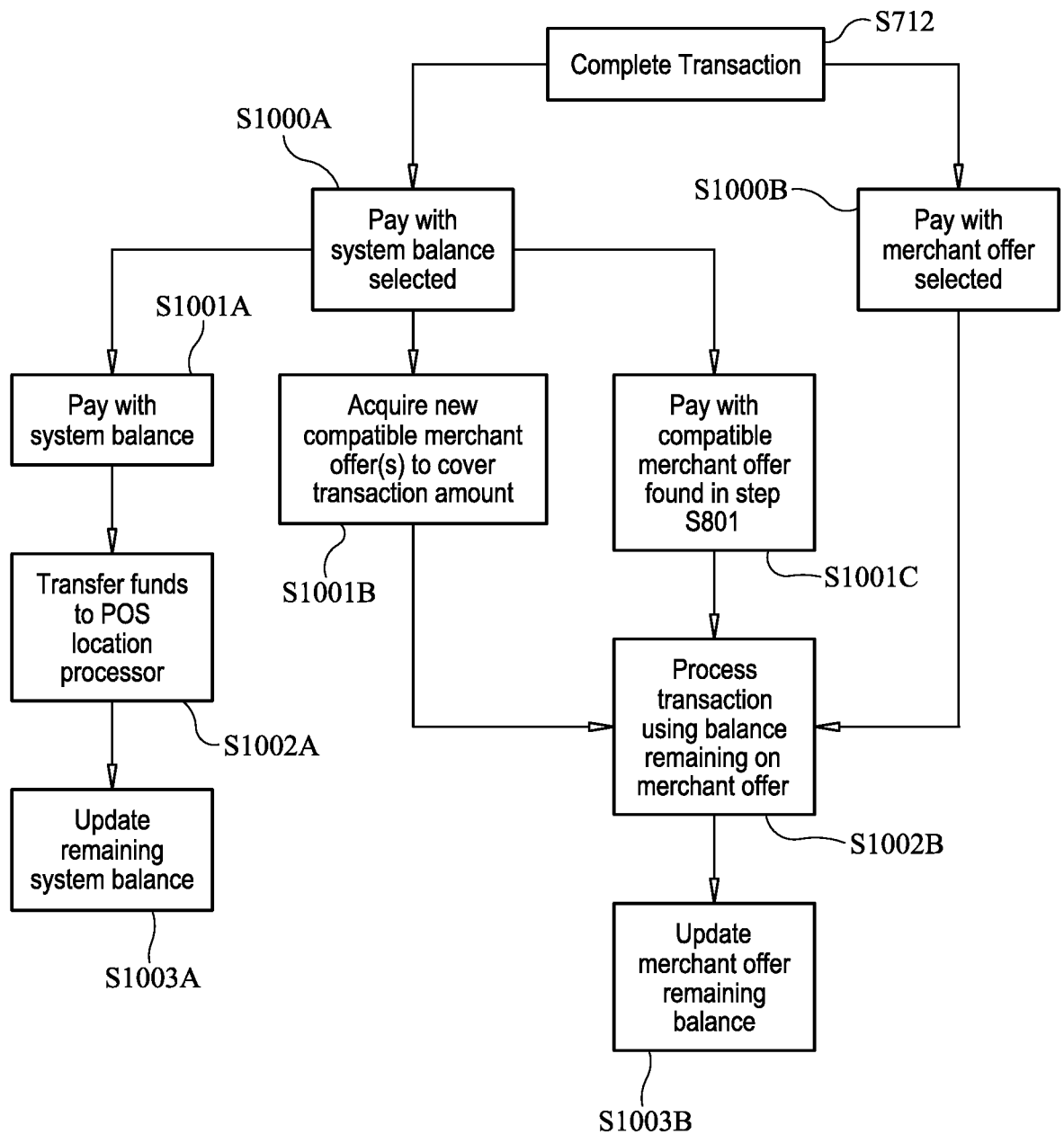
FIG. 29 is another operational flowchart of a preferred embodiment of the merchant offer wallet of the checkout system formed in accordance with the present invention.
Figure 30A:
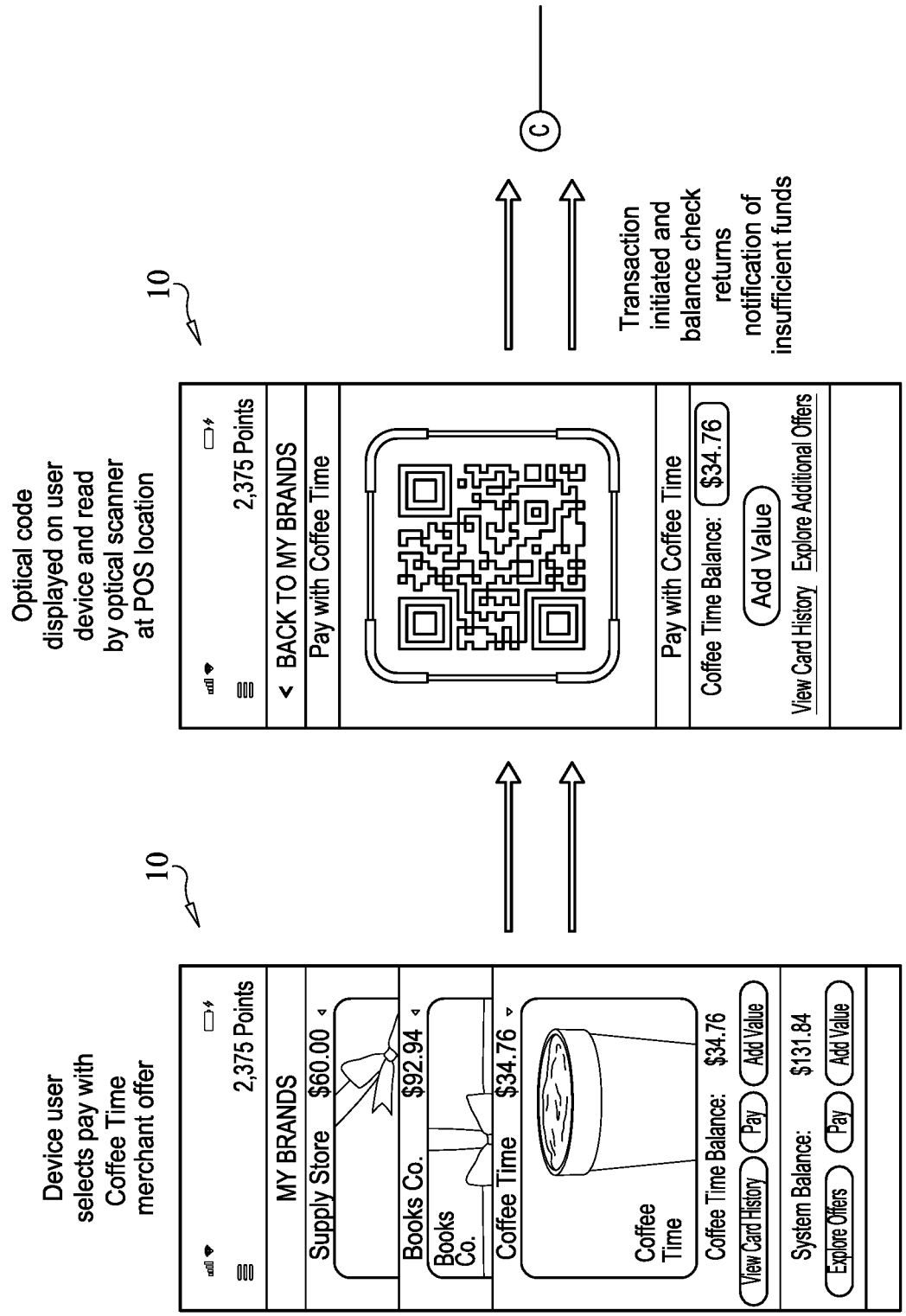
FIGS. 30A and 30B are portions of an exemplary operational flowchart with pictorial illustrations of the merchant offer wallet of the checkout system formed in accordance with the present invention.
Figure 30B:
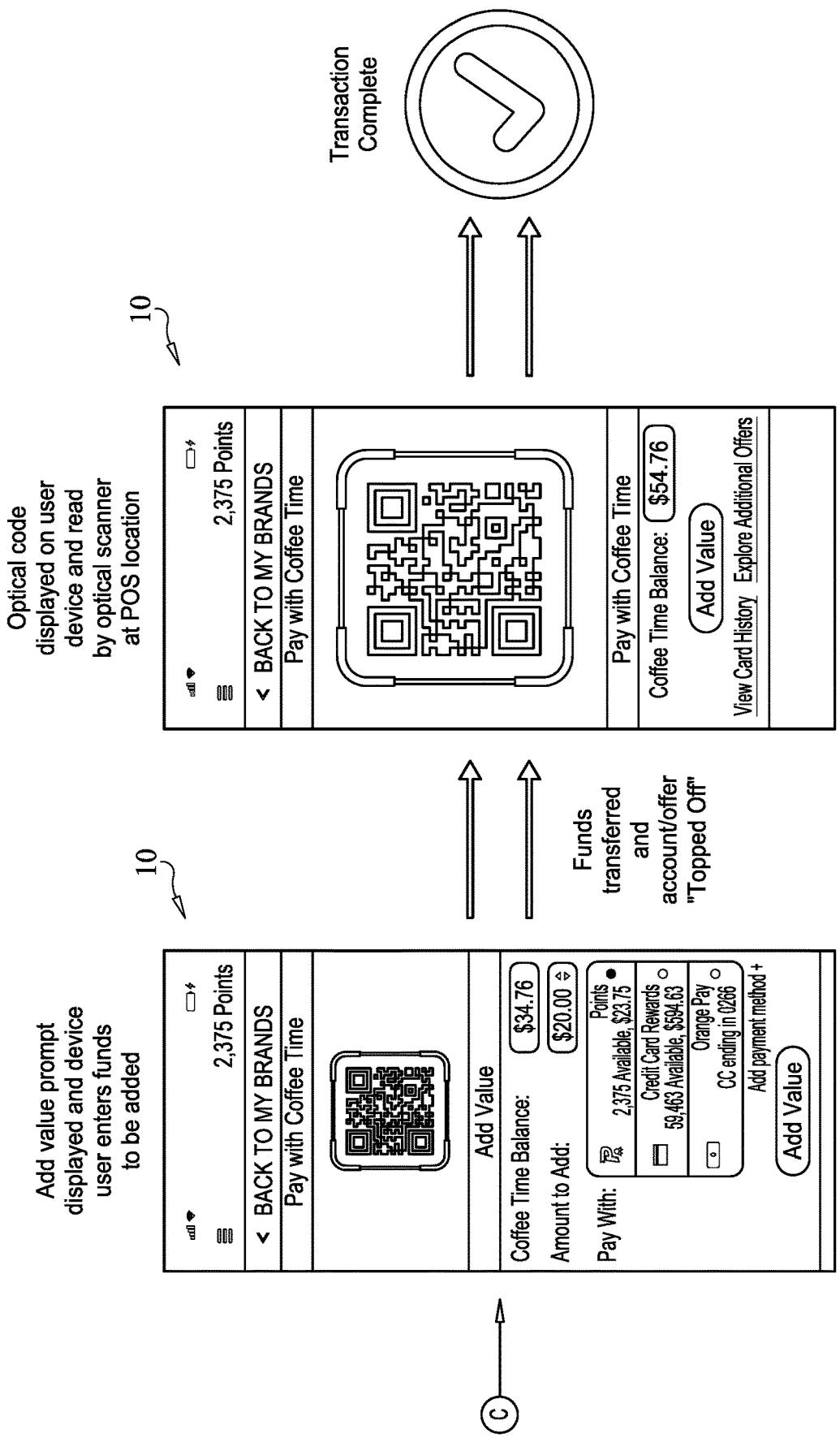

As can be seen in the operational flowchart shown in FIG. 29 of the drawings, after the transaction completion process has been initiated in Step S712, one or more of the processor 36 of the user device 10, the processor 14 of the partner system 8 and the processor 64 of the advertisement system 4 retrieves the device user's selected payment method (Step S703A). If the device user 110 selected to pay with the device user's remaining system balance in Step S704A/S1000A, the partner system 8 may initiate a payment with the device user's remaining system balance (Step S1001A), acquire one or more new compatible merchant offer(s) to cover the transaction amount (Step S1001B) or pay with the one or more compatible merchant offer(s) found in Step S801 (Step S1001C). If payment is to be made with the merchant offers described in Step S1001B and Step S1001C, the transaction is processed using the balance remaining on the merchant offer in Step S1002B and the balance remaining on the merchant offer is updated in Step S1003B. If payment is to be made with the system balance in Step S1001A, funds are transferred from the partner system bank account to the POS location merchant bank account in Step S1002A and the device user's remaining system balance is updated in Step S1003A. If the device user 110 selected to pay with a selected merchant offer 602 in Step S704B/S1000B, the transaction is processed using the balance remaining on the selected merchant offer 602 in Step S1002B and the balance remaining on the selected merchant offer 602 is updated in Step S1003B.

The method formed in accordance with the present invention may utilize all of some of the process steps describe above.

Several exemplary pictorial operational flowcharts showing aspects of the operation of the merchant offer wallet 600 are shown in FIGS. 30-34 of the drawings. As can be seen in the exemplary pictorial operational flowcharts shown in FIGS. 30A and 30B of the drawings, the merchant offers 602 purchased by the device user 110 are displayed on the display 44 of the user device 10 (Step S702B) and the user selects a merchant offer 602 to pay with (Step S704B). Thereafter, an optical code 608 is generated (Step S705) and displayed on the display 44 of the user device 10 (Step S706). The displayed optical code 608 is read by the optical reader 609 at the POS location 611 (Step S707), a transaction is initiated (Step S708), a balance check is performed (Step S709) and the POS location computer systems/processors 613 determine that the remaining balance on the selected merchant offer 602 is insufficient (Step S710A). Upon receiving notification of insufficient funds from the POS location computer systems/processors 613, the add value prompt 614 is displayed on the display 44 of the user device 10 (Step S901) for the device user 110 to "top off" the balance remaining on the selected merchant offer 602. The device user 110 then enters the amount of funds to be added (Step S902), the source of the funds to be added (Step S903) and a funds transfer is initiated (Step S904). The funds are then added to the device user's account and the balance thereof is updated (Steps S905B, S907/S909, S908/S910). The optical code 608 is then displayed again (Step S707) and read by the optical scanner 609 at the POS location 611 (Step S707). If it is determined that the balance is sufficient to complete the transaction (Steps S800B, S802C, S710B), the transaction is completed (Step 712).

Figure 31:
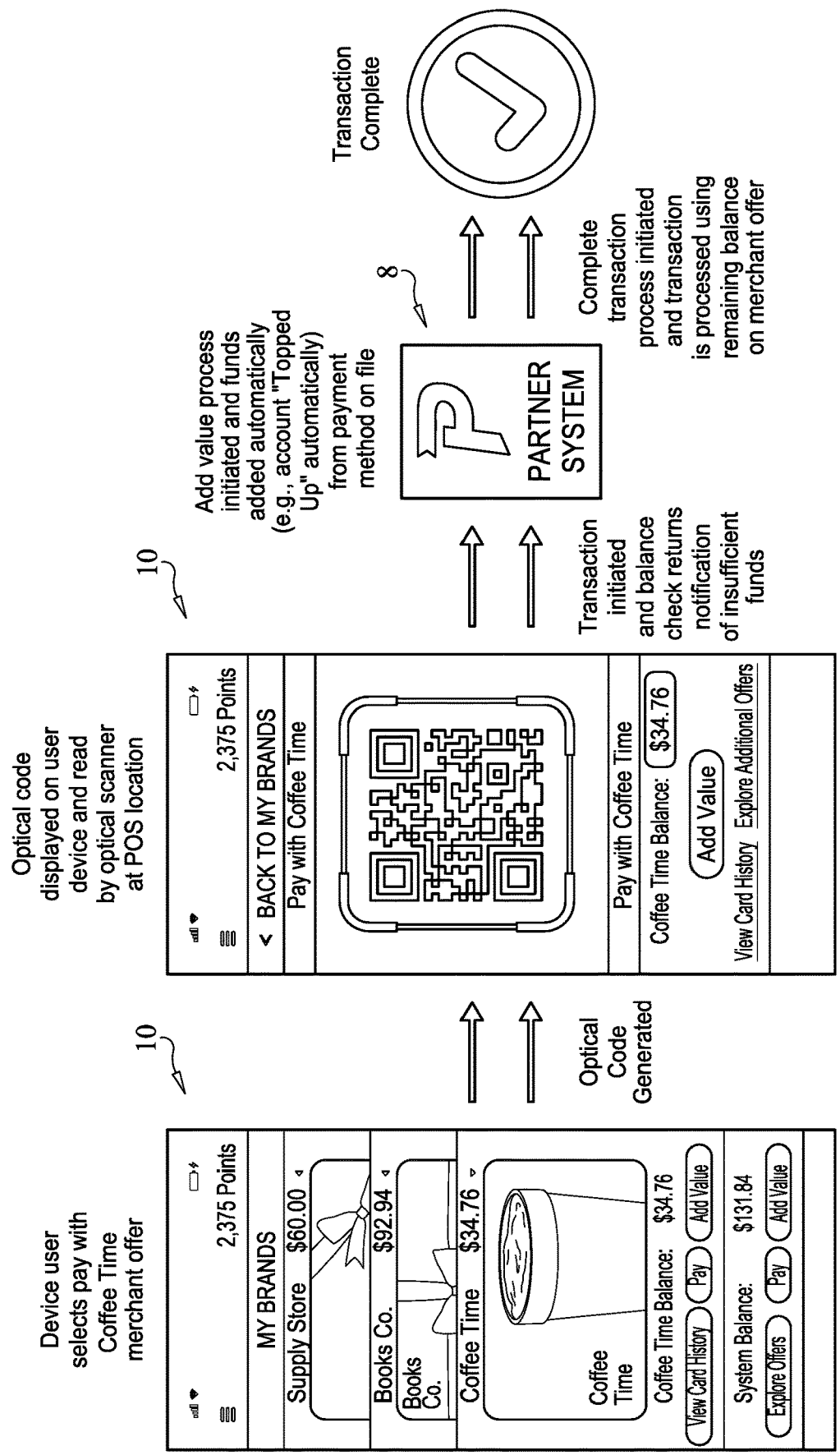
FIG. 31 is another exemplary operational flowchart with pictorial illustrations of the merchant offer wallet of the checkout system formed in accordance with the present invention.

The exemplary pictorial operational flowchart shown in FIG. 31 of the drawings illustrates the operation of the merchant offer wallet 600 when the merchant offer wallet 600 is configured to automatically add value (Step S900C). More specifically, the merchant offers 602 purchased by the device user 110 are displayed on the display 44 of the user device 10 (Step S702B) and the device user 110 selects a merchant offer 602 to pay with (Step S704B). Thereafter, an optical code 608 is generated (Step S705) and displayed on the display 44 of the user device 10 (Step S706). The displayed optical code 608 is read by the optical scanner 609 at the POS location 611 (Step S707), a transaction is initiated (Step S708), a balance check is performed (Step S709) and the POS location computer systems/processors 613 determine that the remaining balance on the selected merchant offer 602 is insufficient (Step S710A). Upon receiving notification of insufficient funds from the POS location computer systems/processors 613, the processor 36 of the user device 10, the processor 14 of the partner system 8 or the processor 64 of the advertisement system 4 initiates the funds transfer process that automatically transfers funds (e.g., "tops up" the remaining balance) in Step S904 based on the device's user's previous entered payment amounts and payment sources on the add value prompt 614, or entered during the configuration of the merchant offer wallet 600. Thereafter, the transaction is completed (Step S712).

Figure 32:
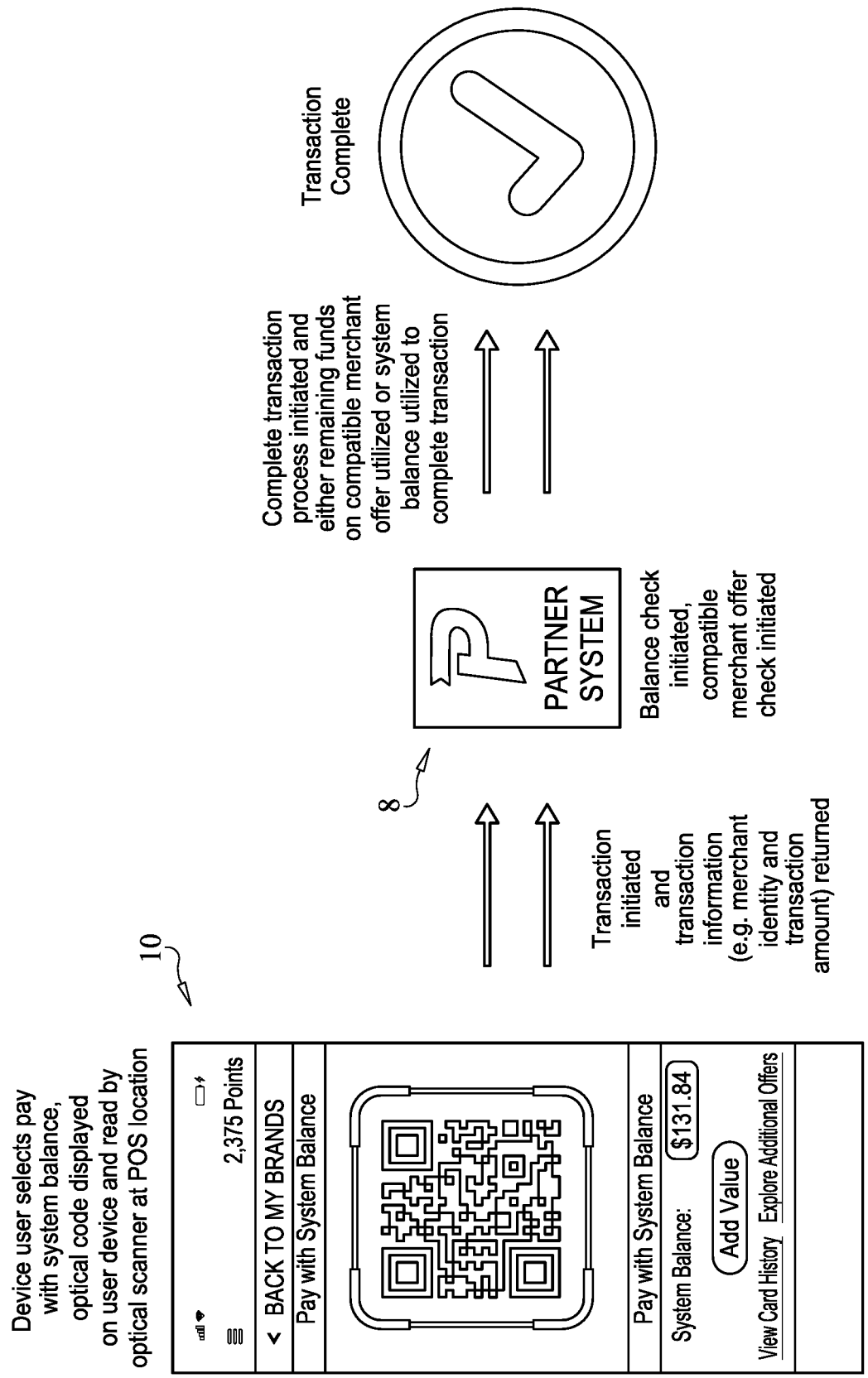
FIG. 32 is another exemplary operational flowchart with pictorial illustrations of the merchant offer wallet of the checkout system formed in accordance with the present invention.

The exemplary pictorial operational flowchart shown in FIG. 32 of the drawings illustrates the operation of the merchant offer wallet 600 when the device user 110 selects to make a purchase utilizing his or her system balance (Step 704A). As can be seen in FIG. 32 of the drawings, the optical code 608 is displayed on the display 44 of the user device 10 (Step S706) and the device user 110 presents the user device 10 at the POS location 611. The optical reader 609 at the POS location 611 reads the optical code 608 displayed on display 44 of the user device 10 (Steps S707) and the POS location computer systems/processor 613 initiates a transaction (Step S708) and returns transaction information (e.g., who the merchant is and the amount of the transaction). A balance check is then performed (Step 709) and it is determined whether the device user 110 has purchased compatible merchant offers (e.g., funds allocated for the particular merchant) (Step S801). If a compatible merchant offer is found and there are sufficient funds (Steps S802B, S710B), the transaction is completed (Step S712) using the compatible merchant offer. If there are insufficient funds remaining on the compatible merchant offer (Step S803B), the device user's remaining system balance is used to complete the transaction. If the device user's remaining system balance is sufficient to complete the transaction (Steps S802A, S810B), the transaction is completed (Step S712) using the device user's remaining system balance. If the device user's remaining system balance is insufficient to complete the transaction (Step S710A), the add value process is initiated (Step S711).

Figure 33:
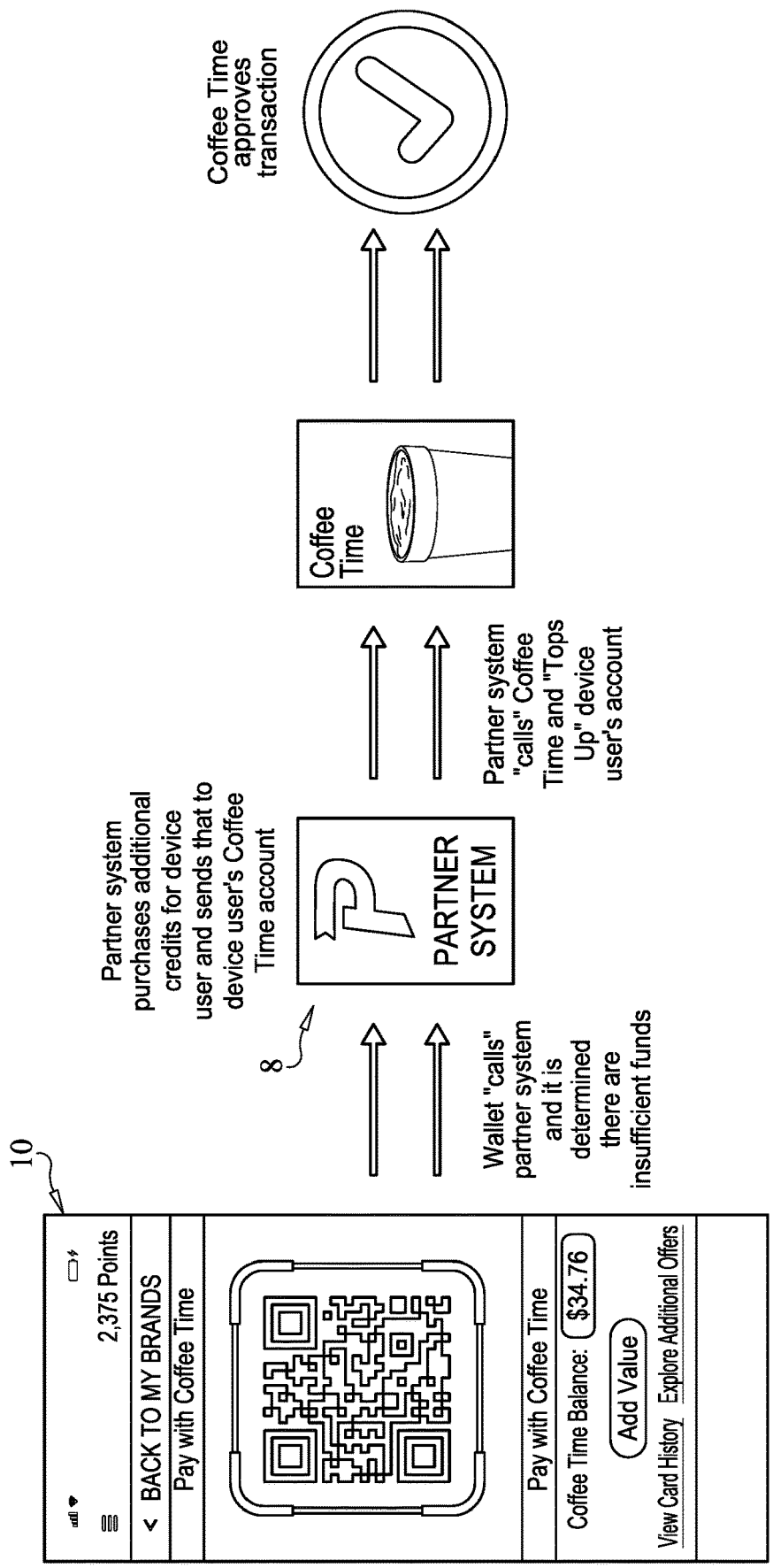
FIG. 33 is another exemplary operational flowchart with pictorial illustrations of the merchant offer wallet of the checkout system formed in accordance with the present invention.

The exemplary pictorial operational flowchart shown in FIG. 33 of the drawings illustrates the operation of the merchant offer wallet 600 when the device user 110 selects to make a purchase utilizing a selected merchant offer 602 and the device user 110 has a linked merchant account. As can be seen in FIG. 33 of the drawings, an optical code 608 is generated (Step S705) and displayed on the display 44 of the user device 10 (Step S706). The displayed optical code 608 is read by the optical scanner 609 at the POS location 611 (Step S707), a transaction is initiated (Step S708), a balance check is performed (Step S709) and the POS location computer systems/processors 613 determine that the remaining balance on the selected merchant offer 602 is insufficient (Step S710A). Upon receiving notification of insufficient funds from the POS location computer systems/processor 613, when the merchant offer wallet 600 is configured to automatically add value (Step S900C), the partner system 8 will transfer funds either from the device user's remaining system balance or from another other specified payment source (Step S904) to the linked merchant account (Step S907) to complete the transaction (Step S712).

Figure 34:
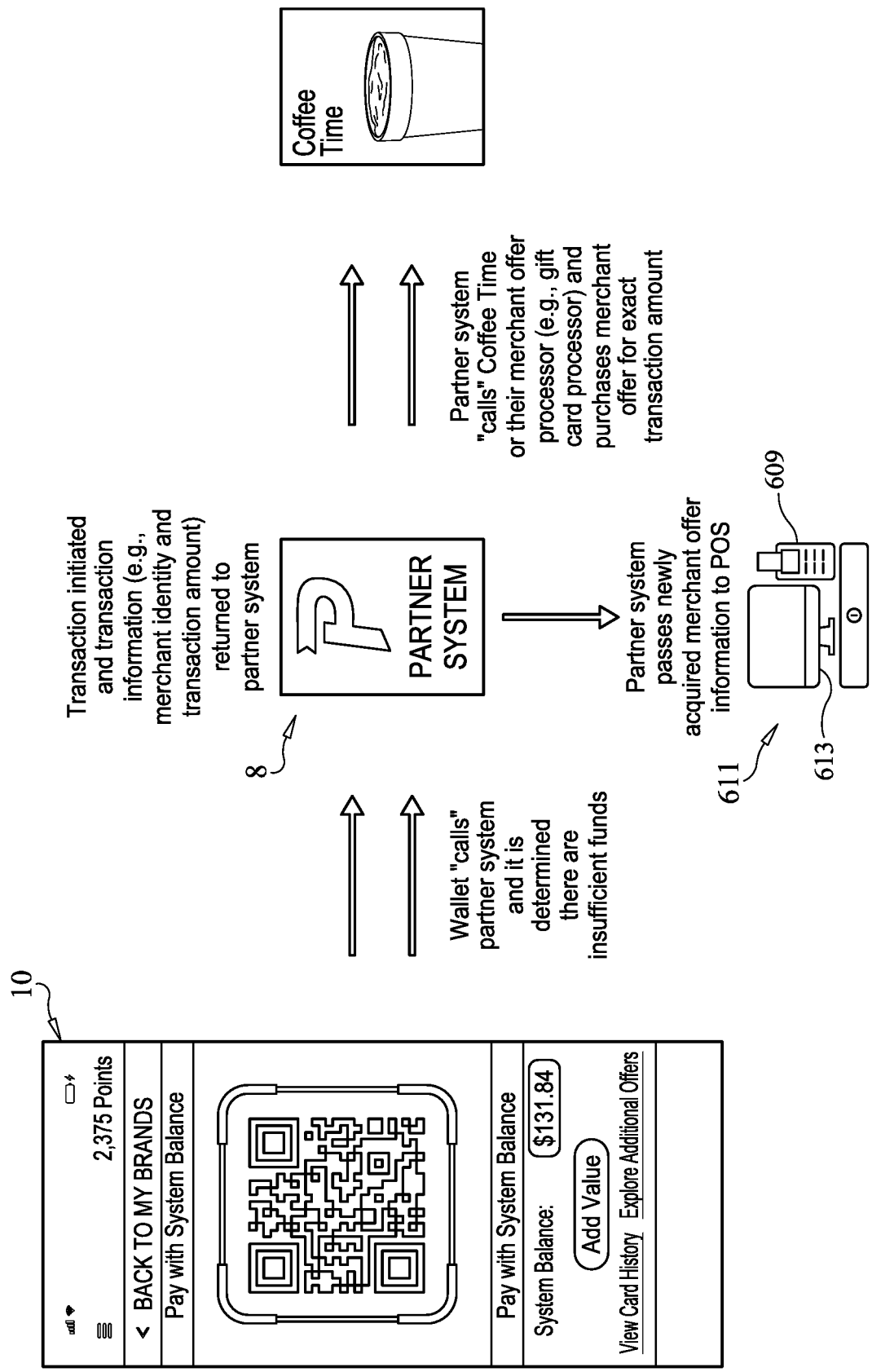
FIG. 34 is another exemplary operational flowchart with pictorial illustrations of the merchant offer wallet of the checkout system formed in accordance with the present invention.

The exemplary pictorial operational flowchart shown in FIG. 34 of the drawings illustrates the operation of the merchant offer wallet 600 when the device user 110 selects to make a purchase utilizing his or her system balance (Step 704A) and the partner system 8 purchases additional merchant offers to complete the transaction. As can be seen in FIG. 34 of the drawings, the optical code 608 is displayed on the display 44 of the user device 10 (Step S706) and the device user 110 presents the user device 10 at the POS location 611. The optical reader 609 at the POS location 611 reads the optical code displayed on the display 44 of the user device 10 (Steps S707) and the POS location computer systems/processor 613 initiates a transaction (Step S708) and returns transaction information (e.g., who the merchant is and the amount of the transaction). A balance check is then performed (Step 709) and it is determined whether the device user 110 has purchased compatible merchant offers (e.g., funds allocated for the particular merchant) (Step S801). If a compatible merchant offer is not found and there are sufficient funds (Steps S802A, S710B), the transaction is completed (Step S712), during which the partner system 8 acquires one or more new compatible merchant offer(s) to cover the transaction amount (Step S1001B) and the transaction in processed using the balance remaining on the newly acquired merchant offers (Step S1002B). Any remaining balance on the newly acquired merchant offers are stored in the memory and displayed in the wallet 600 as a purchased merchant offer 602.

For purposes of an understanding of the disclosure set forth herein, phrases recited herein of the general form "at least one of A, B and C" and "one or more of A, B and C", where A, B and C are elements, components, variables, steps or limitations, such phrases mean: (A), (B), (C), (A, B and C), (A and B), (A and C) or (B and C)

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computerized checkout system for generating personalized advertisements, the system comprising:
a communications network;
an advertisement system operably coupled to the communications network, the advertisement system having a processor and a memory in communication with the processor;
at least one merchant administrator operable by a respective merchant user, the merchant administrator being operably connected to the advertisement system via the communications network, the merchant administrator having a processor, a memory, a display and a user interface for receiving input from the respective merchant user to create one or more merchant campaigns, each merchant campaign comprising a plurality of campaign elements input by the respective merchant user, each of the memory, the display and the user interface being in communication with the processor;
at least one partner system, the partner system being operably connected to the advertisement system via the communications network, the partner system having a processor and a memory in communication with the processor, and a host;
at least one user device operable by a respective device user, the user device being operably connected to the partner system via the communications network, the user device having a processor, a memory, a display and a user interface for receiving input from the respective device user, each of the memory, the display and the user interface being in communication with the processor;

at least one partner system funds account operably coupled to the communications network, the at least one partner system funds account maintaining funds belonging to the respective device user, the respective device user having a remaining funds balance in the partner system funds account corresponding to the respective device user's available funds on the partner system;

a partner application, the partner application being in communication with the host of the at least one partner system and being operable by the respective device user on the user device; and a merchant offer wallet, the merchant offer wallet being operably connected to one or more of the partner system, the advertisement system and the merchant administrator via the communications network, the merchant offer wallet being operable within the partner application by the respective device user via the user interface of the user device;

wherein each of the advertisement system, the at least one partner system, the at least one merchant administrator and the at least one user device is an independent and distinct computer system;

wherein the one or more merchant campaigns are communicated to the advertisement system and at least one of transiently stored and non-transiently stored in the memory thereof;

wherein the memory of the advertisement system contains program instructions generating at least one list of merchant offer advertisements from the one or more merchant campaigns stored in the memory of the advertisement system, each merchant offer advertisement corresponding to a merchant offer from the respective merchant user set forth in the merchant campaign;

wherein the at least one list of merchant offer advertisements is displayed on the display of the user device;

wherein the user interface of the user device receives input from the respective device user corresponding to the device user's selection of one or more of the merchant offer advertisements on the list of merchant offer advertisements displayed on the user device;

wherein, in response to the received input from the device user corresponding to the device user's selection of one or more of the merchant offer advertisements, the advertisement system causes the merchant offer corresponding to the selected merchant offer advertisement to be communicated to one or more of the user device, the partner system and the advertisement system;

wherein the merchant offer wallet retrieves at least one merchant offer from one or more of the user device, the partner system and the advertisement system;

wherein the merchant offer wallet displays at least one retrieved merchant offer on the display of the user device;

wherein the merchant offer wallet displays the remaining funds balance of the respective device user in the partner system funds account on the display of the user device;

wherein the merchant offer wallet receives input from the respective device user, through the user interface of the user device, corresponding to the respective device user's selection of one of the device user's remaining system balance in the partner system funds account and the at least one merchant offer displayed on the display of the user device; and wherein, in response to the received input from the respective device user corresponding to the respective device user's selection of one of the device user's remaining system balance in the partner system funds account and the at least one merchant offer displayed on the display of the user device, one of the partner system, the advertisement system and the user device generates an optical code containing transaction processing information, the optical code being displayed on the display of the user device and being readable by an optical reader at a point of sale location.

2. The computerized checkout system according to claim 1, which further comprises:

at least one point of sale funds account operably coupled to the communications network, the at least one point of sale funds account maintaining the funds of the point of sale location; and at least one transaction module, the at least one transaction module being operably connected to each of the at least one partner system funds account and the at least one point of sale funds account;

wherein the transaction module selectively transfers funds between the at least one partner system funds account and the at least one point of sale funds account.

3. The computerized checkout system according to claim 1, wherein one of the partner system, the user device and the merchant offer wallet contains one or more program instructions for performing the steps of:

retrieving the respective device user's remaining funds balance in the partner system funds account;

displaying the respective device user's remaining funds balance in the partner system funds account on the display of the user device;

retrieving at least one merchant offer from one or more of the user device, the partner system and the advertisement system, each merchant offer having a remaining balance;

displaying at least one retrieved merchant offer on the display of the user device;

adding value to one of the respective device user's remaining funds balance in the partner system funds account and at least one displayed merchant offer;

generating the optical code; and displaying the optical code on the display of the user device.

4. The computerized checkout system according to claim 3, wherein the step of adding value to one of the respective device user's remaining funds balance in the partner system funds account and at least one displayed merchant offer comprises the sub-steps of:

receiving input from the respective device user, through the user interface of the user device, corresponding to the respective device user's selection of one of the respective device user's remaining funds balance in the partner system funds account and the at least one merchant offer displayed on the display of the user device to add value to;

receiving input from the respective device user, through the user interface of the user receiving input from the respective device user, through the user interface of the user device, corresponding to the respective device user's designation of an amount of funds to add;

receiving input from the respective device user, through the user interface of the user receiving input from the respective device user, through the user interface of the user device, corresponding to the respective device user's designation of a source of the designated amount of funds to be added; and initiating a funds transfer for the amount of funds to be added designated by the respective device user from the source of the designated funds to be added designated by the respective device user.

5. The computerized checkout system according to claim 4, which further comprises the sub-steps of:

acquiring one or more compatible merchant offers, each compatible merchant offer of the one or more compatible merchant offers having a remaining balance; and updating the remaining balance of the merchant offer selected by the respective device user by adding the remaining balance of each acquired compatible merchant offer of the one or more acquired compatible merchant offers to the remaining balance of the merchant offer selected by the respective device user.

6. The computerized checkout system according to claim 4, which further comprises the sub-step of:

updating the respective device user's remaining funds balance in the partner system funds account by adding the amount of funds to be added designated by the respective device user.

7. The computerized checkout system according to claim 3, wherein the step of adding value to one of the respective device user's remaining funds balance in the partner system funds account and at least one displayed merchant offer comprises the sub-steps of:

displaying an add value prompt on the display of the user device, the add value prompt including an amount of funds to add input field and a payment source input field, the amount of funds to add input field being selectively actuatable by the respective device user, through the use of the user interface of the user device, to designate an amount of funds to be added to one of the respective device user's remaining funds balance in the partner system funds account and the merchant offer selected by the respective device user, the payment source input field being selectively actuatable by the device user, through the use of the user interface of the user device, to designate a source of the amount of funds to be added;

receiving in the amount of funds to add input field the amount of funds to be added designated by the respective device user;

receiving in the payment source input field the source of the amount of funds to be added designated by the respective device user;

initiating a funds transfer for the amount of funds to be added designated by the respective device user from the source of funds designated by the respective device user; and updating one of the respective device user's remaining funds balance in the partner system funds account and the remaining balance of at least one displayed merchant offer.

8. A computerized checkout system for making a purchase at a point of sale location, the system comprising:

a communications network;

at least one partner system operably coupled to the communications network, the partner system having a processor and a memory in communication with the processor, and a host;

at least one user device operable by a respective device user, the user device being operably connected to the partner system via the communications network, the user device having a processor, a memory, a display and a user interface for receiving input from the respective device user, each of the memory, the display and the user interface being in communication with the processor;

at least one partner system funds account operably coupled to the communications network, the at least one partner system funds account maintaining funds belonging to the respective device user, the respective device user having a remaining funds balance in the partner system funds account corresponding to the respective device user's available funds on the partner system;

a partner application, the partner application being in communication with the host of the at least one partner system and being operable by the respective device user on the user device;

a merchant offer wallet, the merchant offer wallet being operably connected to the partner system via the communications network, the merchant offer wallet being operable within the partner application by the respective device user via the user interface of the user device; and one or more merchant offers, the one or more merchant offers being stored in at least one of the memory of the user device and the memory of the partner system, each merchant offer of the one or more merchant offers having a remaining balance;

wherein each of the at least one partner system and the at least one user device is an independent and distinct computer system;

wherein the merchant offer wallet retrieves at least one merchant offer from one or more of the memory of the user device and the memory of the partner system;

wherein the merchant offer wallet displays at least one retrieved merchant offer on the display of the user device;

wherein the merchant offer wallet displays the remaining funds balance of the respective device user in the partner system funds account on the display of the user device;

wherein the merchant offer wallet receives input from the respective device user, through the user interface of the user device, corresponding to the respective device user's selection of one of the device user's remaining system balance in the partner system funds account and the at least one merchant offer displayed on the display of the user device;

wherein, in response to the received input from the respective device user corresponding to the respective device user's selection of one of the device user's remaining system balance in the partner system funds account and the at least one merchant offer displayed on the display of the user device, one of the partner system and the user device generates an optical code containing transaction processing information, the optical code being displayed on the display of the user device and being readable by an optical reader at a point of sale location.

9. The computerized checkout system according to claim 8, which further comprises:

at least one point of sale funds account operably coupled to the communications network, the at least one point of sale funds account maintaining the funds of the point of sale location; and at least one transaction module, the at least one transaction module being operably connected to each of the at least one partner system funds account and the at least one point of sale funds account;

wherein the transaction module selectively transfers funds between the at least one partner system funds account and the at least one point of sale funds account.

10. The computerized checkout system according to claim 8, wherein one of the partner system, the user device and the merchant offer wallet contains one or more program instructions for performing the steps of:

retrieving the respective device user's remaining funds balance in the partner system funds account;

displaying the respective device user's remaining funds balance in the partner system funds account on the display of the user device;

retrieving at least one merchant offer from one or more of the memory of the user device and the memory of the partner system;

displaying at least one retrieved merchant offer on the display of the user device;

adding value to one of the respective device user's remaining funds balance in the partner system funds account and at least one displayed merchant offer;

generating the optical code; and displaying the optical code on the display of the user device.

11. The computerized checkout system according to claim 10, wherein the step of adding value to one of the respective device user's remaining funds balance in the partner system funds account and at least one displayed merchant offer comprises the sub-steps of:

receiving input from the respective device user, through the user interface of the user device, corresponding to the respective device user's selection of one of the respective device user's remaining funds balance in the partner system funds account and the at least one merchant offer displayed on the display of the user device to add value to;

receiving input from the respective device user, through the user interface of the user receiving input from the respective device user, through the user interface of the user device, corresponding to the respective device user's designation of an amount of funds to add;

receiving input from the respective device user, through the user interface of the user receiving input from the respective device user, through the user interface of the user device, corresponding to the respective device user's designation of a source of the designated amount of funds to be added; and initiating a funds transfer for the amount of funds to be added designated by the respective device user from the source of the designated amount of funds to be added designated by the respective device user.

12. The computerized checkout system according to claim 11, which further comprises the sub-steps of:

acquiring one or more compatible merchant offers, each compatible merchant offer of the one or more compatible merchant offers having a remaining balance; and updating the remaining balance of the merchant offer selected by the respective device user by adding the remaining balance of each acquired compatible merchant offer of the one or more acquired compatible merchant offers to the remaining balance of the merchant offer selected by the respective device user.

13. The computerized checkout system according to claim 11, which further comprises the sub-step of:

updating the respective device user's remaining funds balance in the partner system funds account by adding the amount of funds to be added designated by the respective device user.

14. The computerized checkout system according to claim 10, wherein the step of adding value to one of the respective device user's remaining funds balance in the partner system funds account and at least one displayed merchant offer comprises the sub-steps of:

displaying an add value prompt on the display of the user device, the add value prompt including an amount of funds to add input field and a payment source input field, the amount of funds to add input field being selectively actuatable by the respective device user, through the use of the user interface of the user device, to designate an amount of funds to be added to one of the respective device user's remaining funds balance in the partner system funds account and the merchant offer selected by the respective device user, the payment source input field being selectively actuatable by the device user, through the use of the user interface of the user device, to designate a source of the amount of funds to be added;

receiving in the amount of funds to add input field the amount of funds to be added designated by the respective device user;

receiving in the payment source input field the source of the amount of funds to be added designated by the respective device user;

initiating a funds transfer for the amount of funds to be added designated by the respective device user from the source of funds designated by the respective device user; and updating one of the respective device user's remaining funds balance in the partner system funds account and the remaining balance of at least one displayed merchant offer.

15. A method for making a purchase at a point of sale location with a computerized checkout system, the computerized checkout system comprising a communications network, at least one partner system, at least one partner system funds account, one or more merchant offers, at least one user device operable by a respective device user and a partner application operable by the respective device user on the user device, each of the partner system, the at least one partner system funds account and the user device being operably coupled to the communications network, the communications network facilitating communication between the partner system, partner system funds account and the user device, wherein each of the partner system and the user device includes a processor and a memory in communication with the processor, wherein the at least one partner system includes a host, wherein the partner application is in communication with the host of the at least one partner system, wherein the user device includes a display and a user interface, the user interface of the user device receiving input from the respective device user, wherein the at least one partner system funds account maintains funds belonging to the respective device user, the respective device user having a remaining funds balance in the partner system funds account corresponding to the respective device user's available funds on the partner system and wherein the one or more merchant offers are stored in at least one of the memory of the user device and the memory of the partner system, each merchant offer of the one or more merchant offers having a remaining balance, wherein each of the at least one partner system and the at least one user device is an independent and distinct computer system, the method for making a purchase at a point of sale location comprising the steps of:
- retrieving the respective device user's remaining funds balance in the partner system funds account;
- displaying the respective device user's remaining funds balance in the partner system funds account on the display of the user device;
- retrieving at least one merchant offer from one or more of the memory of the user device and the memory of the partner system;
- displaying at least one retrieved merchant offer on the display of the user device;
- selecting by the respective device user, through the user interface of the user device, one of the respective device user's remaining system balance in the partner system funds account and the at least one merchant offer displayed on the display of the user device;
- generating an optical code in response to respective device user's selection of the respective device user's remaining system balance in the partner system funds account and the at least one merchant offer displayed on the display of the user device, the optical code containing transaction processing information; and
- displaying the optical code on the display of the user device, the displayed optical code being readable by an optical reader at the point of sale location.

16. A method for making a purchase at a point of sale location with a computerized checkout system as defined by claim 15, which further comprises the step of:
- adding value to one of the respective device user's remaining funds balance in the partner system funds account and at least one displayed merchant offer.

17. A method for making a purchase at a point of sale location with a computerized checkout system as defined by claim 16, wherein the step of adding value to one of the respective device user's remaining funds balance in the partner system funds account and at least one displayed merchant offer comprises the sub-steps of:
- displaying an add value prompt on the display of the user device, the add value prompt including an amount of funds to add input field and a payment source input field, the amount of funds to add input field being selectively actuatable by the respective device user, through the use of the user interface of the user device, to designate an amount of funds to be added to one of the respective device user's remaining funds balance in the partner system funds account and the merchant offer selected by the respective device user, the payment source input field being selectively actuatable by the device user, through the use of the user interface of the user device, to designate a source of the amount of funds to be added;
- receiving in the amount of funds to add input field the amount of funds to be added designated by the respective device user;
- receiving in the payment source input field the source of the amount of funds to be added designated by the respective device user;
- initiating a funds transfer for the amount of funds to be added designated by the respective device user from the source of funds designated by the respective device user; and
- updating one of the respective device user's remaining funds balance in the partner system funds account and the remaining balance of at least one displayed merchant offer.

18. A method for making a purchase at a point of sale location with a computerized checkout system as defined by claim 16, wherein the step of adding value to one of the respective device user's remaining funds balance in the partner system funds account and at least one displayed merchant offer comprises the sub-steps of:
- receiving input from the respective device user, through the user interface of the user device, corresponding to the respective device user's selection of one of the respective device user's remaining funds balance in the partner system funds account and the at least one merchant offer displayed on the display of the user device to add value to;
- receiving input from the respective device user, through the user interface of the user device, corresponding to the respective device user's designation of an amount of funds to add;
- receiving input from the respective device user, through the user interface of the user receiving input from the respective device user, through the user interface of the user device, corresponding to the respective device user's designation of a source of the designated amount of funds to be added; and
- initiating a funds transfer for the amount of funds to be added designated by the respective device user from the source of the designated amount of funds to be added designated by the respective device user.

19. A method for making a purchase at a point of sale location with a computerized checkout system as defined by claim 18, which further comprises the sub-steps of:
- acquiring one or more compatible merchant offers, each compatible merchant offer of the one or more compatible merchant offers having a remaining balance; and
- updating the remaining balance of the merchant offer selected by the respective device user by adding the remaining balance of each of the one or more acquired compatible merchant offers to the remaining balance of the merchant offer selected by the respective device user.

20. A method for making a purchase at a point of sale location with a computerized checkout system as defined by claim 18, which further comprises the sub-steps of:
- updating the respective device user's remaining funds balance in the partner system funds account by adding the amount of funds to be added designated by the respective device user.

* * * * *